US012678368B2

(12) United States Patent
Silver et al.

(10) Patent No.: US 12,678,368 B2
(45) Date of Patent: Jul. 14, 2026

(54) SYSTEMS AND METHODS FOR PROVIDING RESUSCITATION GUIDANCE BASED ON PHYSICAL FEATURES OF A PATIENT MEASURED DURING AN ACUTE CARE EVENT

(71) Applicant: ZOLL Medical Corporation, Chelmsford, MA (US)

(72) Inventors: Annemarie Silver, Bedford, MA (US); Paolo Giacometti, North Grafton, MA (US); Frederick J. Geheb, Lenexa, KS (US); Gary A. Freeman, Waltham, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 731 days.

(21) Appl. No.: 16/456,514

(22) Filed: Jun. 28, 2019

(65) Prior Publication Data

US 2020/0000680 A1 Jan. 2, 2020

Related U.S. Application Data

(60) Provisional application No. 62/692,004, filed on Jun. 29, 2018.

(51) Int. Cl.
*A61H 31/00* (2006.01)

(52) U.S. Cl.
CPC ......... *A61H 31/005* (2013.01); *A61H 31/006* (2013.01); *A61H 2201/5084* (2013.01); *A61H 2201/5097* (2013.01)

(58) Field of Classification Search
CPC ................ A61H 31/005; A61H 31/006; A61H 2201/5084; A61H 2201/5097;
(Continued)

(56) References Cited

U.S. PATENT DOCUMENTS 5,533,181 A 7/1996 Bergsneider
6,333,759 B1 12/2001 Mazzilli
(Continued)

FOREIGN PATENT DOCUMENTS

CN 1458852 A 11/2003
CN 1723057 A 1/2006
(Continued)

OTHER PUBLICATIONS

Pickard, Amelia; Radiological assessment of the adult chest: implications for chest compressions; 2006 (https://pubmed.ncbi.nlm.nih.gov/16982125/). (Year: 2006).*
(Continued)

*Primary Examiner* — Kendra D Carter
*Assistant Examiner* — Arielle Wolff
(74) *Attorney, Agent, or Firm* — The Webb Law Firm

(57) ABSTRACT

A system for assisting a user in performing chest compressions includes: at least one input device for providing information representative of a plurality of physical features of a patient; at least one chest compression sensor; a feedback device for providing chest compression feedback for the user; and at least one processor. The at least one processor is configured to: receive and process the information representative of the plurality of physical features of the patient to determine a target chest compression criterion for the patient, receive and process the signals indicative of the chest compressions from the at least one chest compression sensor to calculate at least one chest compression parameter, determine whether the at least one chest compression parameter meets the target chest compression criterion, and cause the feedback device to provide an indication for the user of whether the chest compression parameter meets the target criterion.

48 Claims, 20 Drawing Sheets

(58) Field of Classification Search

CPC .... A61H 2201/5007; A61H 2201/5061; A61H 2201/5089; A61H 2201/5087; A61H 2201/5092; A61H 2230/04; A61H 2230/82; A61H 2230/825; A61H 2230/85; A61H 2230/855; A61H 2230/40; A61H 31/00

See application file for complete search history.

(56) References Cited

U.S. PATENT DOCUMENTS

| | | | | |
|---|---|---|---|---|
| 7,122,014 | B2 | 10/2006 | Palazzolo et al. | |
| 7,805,114 | B1 | 9/2010 | Quintana et al. | |
| 9,364,625 | B2 | 6/2016 | Silver et al. | |
| 9,387,147 | B2 | 7/2016 | Elghazzawi et al. | |
| 10,137,265 | B2 | 11/2018 | Freeman et al. | |
| 2002/0133197 | A1 | 9/2002 | Snyder et al. | |
| 2004/0015191 | A1 | 1/2004 | Otman et al. | |
| 2004/0082888 | A1 | 4/2004 | Palazzolo et al. | |
| 2004/0162585 | A1 | 8/2004 | Elghazzawi et al. | |
| 2006/0056655 | A1 | 3/2006 | Wen et al. | |
| 2006/0116724 | A1 | 6/2006 | Snyder | |
| 2006/0173501 | A1 | 8/2006 | Stickney et al. | |
| 2007/0151366 | A1* | 7/2007 | McDonald | A61M 5/16886 73/861.63 |
| 2007/0219588 | A1* | 9/2007 | Freeman | A61N 1/3993 607/5 |
| 2007/0219686 | A1 | 9/2007 | Plante | |
| 2008/0171311 | A1 | 7/2008 | Centen et al. | |
| 2008/0192114 | A1 | 8/2008 | Pearson et al. | |
| 2008/0300518 | A1* | 12/2008 | Bowes | A61H 31/007 601/41 |
| 2009/0240295 | A1 | 9/2009 | Kellum | |
| 2009/0262987 | A1 | 10/2009 | Ioffe et al. | |
| 2009/0270931 | A1 | 10/2009 | Liden | |
| 2009/0326991 | A1 | 12/2009 | Wei et al. | |
| 2010/0141802 | A1 | 6/2010 | Knight et al. | |
| 2010/0211127 | A1 | 8/2010 | Eerden | |
| 2010/0248679 | A1 | 9/2010 | Oei et al. | |
| 2011/0040217 | A1* | 2/2011 | Centen | A61B 5/0064 601/41 |
| 2011/0117878 | A1 | 5/2011 | Barash et al. | |
| 2011/0172550 | A1 | 7/2011 | Martin et al. | |
| 2012/0074564 | A1 | 3/2012 | Shiota | |
| 2012/0195473 | A1 | 8/2012 | De Haan et al. | |
| 2012/0302910 | A1* | 11/2012 | Freeman | G16H 20/40 128/205.13 |
| 2013/0138168 | A1 | 5/2013 | Quan et al. | |
| 2013/0296719 | A1* | 11/2013 | Packer | A61B 5/1121 600/484 |
| 2014/0201627 | A1 | 7/2014 | Freeman et al. | |
| 2014/0257150 | A1* | 9/2014 | Totman | A61H 31/007 601/41 |
| 2014/0323928 | A1* | 10/2014 | Johnson | A61H 31/005 601/41 |
| 2014/0342331 | A1* | 11/2014 | Freeman | H04N 23/698 434/265 |
| 2015/0087919 | A1 | 3/2015 | Johnson et al. | |
| 2015/0170546 | A1* | 6/2015 | Kirenko | G09B 23/30 434/265 |
| 2015/0231028 | A1* | 8/2015 | Belalcazar | A61M 16/0858 601/43 |
| 2016/0279405 | A1* | 9/2016 | Riley | G16H 50/20 |
| 2017/0079876 | A1* | 3/2017 | Freeman | A61H 31/007 |
| 2017/0266399 | A1 | 9/2017 | Campana et al. | |
| 2017/0273864 | A1 | 9/2017 | Kaufman et al. | |
| 2017/0281462 | A1 | 10/2017 | Freeman et al. | |
| 2018/0021216 | A1* | 1/2018 | Paradis | A61H 31/006 601/41 |
| 2018/0092803 | A1 | 4/2018 | Freeman et al. | |

FOREIGN PATENT DOCUMENTS

| | | | |
|---|---|---|---|
| CN | 1750857 | A | 3/2006 |
| CN | 101001668 | A | 7/2007 |
| CN | 107374934 | A | 11/2017 |
| WO | 2012162048 | A1 | 11/2012 |

OTHER PUBLICATIONS

Chen et al., "Three-dimensional human facial morphologies as robust aging markers", Cell Research, 2015, pp. 574-587, vol. 25.

Jeffcott et al., "Measuring team performance in healthcare: Review research and implications for patient safety", Journal of Critical Care, 2008, pp. 188-196, vol. 23.

Perwass et al., "Single Lens 3D-Camera with Extended Depth-of-Field", Raytrix GmbH, Schauenburgerstr. 116, 24116 Kiel, Germany, 2012, 12 pages.

Swainson et al., "Prediction of whole-body fat percentage and visceral adipose tissue mass from five anthropometric variables", PLoS ONE, 2017, 12 pages, vol. 12:5, e0177175, https://doi.org/10.1371/journal.pone.0177175.

* cited by examiner

SYSTEMS AND METHODS FOR PROVIDING RESUSCITATION GUIDANCE BASED ON PHYSICAL FEATURES OF A PATIENT MEASURED DURING AN ACUTE CARE EVENT

CROSS REFERENCE TO RELATED APPLICATION

This application claims priority to U.S. Provisional Patent Application No. 62/692,004 filed Jun. 29, 2018, and entitled "Systems and Methods for Providing Resuscitation Guidance Based on Physical Features of a Patient Measured During an Acute Care Event," the disclosure of which is hereby incorporated by reference in its entirety.

BACKGROUND

Technological Field

The present disclosure relates to electronic devices that assist acute caregivers by providing guidance and feedback for performing resuscitation activities for a patient, and, in some examples, to systems which determine criteria for performing resuscitation activities based, at least in part, on physical feature(s) of the patient measured during an acute care event.

Background

Cardio-Pulmonary Resuscitation (CPR) is a process by which one or more acute care providers may attempt to resuscitate a patient who may have suffered an adverse cardiac event by taking one or more actions, for example, providing chest compressions and ventilation to the patient. Chest compressions are an important element of CPR because chest compressions help maintain blood circulation through the body and in the heart. Ventilation is also a key part of CPR because ventilations help to provide much needed gas exchange (e.g., oxygen supply and carbon dioxide deposit) for the circulating blood.

CPR may be performed by a team of one or more acute care providers, for example, an emergency medical services (EMS) team made up of emergency medical technicians (EMTs), a hospital team including medical caregivers (e.g., doctors, nurses, etc.), and/or bystanders responding to an emergency event. In some instances, one acute care provider can provide chest compressions to the patient while another acute care provider can provide ventilations to the patient, where the chest compressions and ventilations may be timed and/or coordinated according to an appropriate CPR protocol. When professionals such as EMTs provide care, ventilation may be provided via a ventilation bag that the acute care provider squeezes, for example, rather than by mouth-to-mouth. CPR can be performed in conjunction with electrical shocks to the patient provided by an external defibrillator, such as an automatic external defibrillator (AED) or professional defibrillator/monitor. Such AEDs often provide guidance and instructions (e.g., in the form of audible feedback) to acute care providers, such as "Push Harder," (when the acute care provider is not performing chest compressions according to the desired depth), "Stop CPR," "Stand Back" (because a shock is about to be delivered), and so on. In order to determine the quality of chest compressions being performed, certain defibrillators may obtain information from one or more accelerometers (such as accelerometers that are provided with the CPR D PADZ®, CPR STAT PADZ®, and ONE STEP™ pads made by ZOLL MEDICAL of Chelmsford, Mass.), which can be used to provide data to determine information, such as depth of chest compressions (e.g., to determine that the compressions are too shallow or too deep and to cause an appropriate cue to be provided by the defibrillator). The AEDs can also provide feedback to encourage the acute care providers to perform resuscitation activities according to recommendations or protocols. For example, such AEDs can emit instructions or display icons informing the acute care provider when a chest compression is too shallow or too deep.

However, improved systems for providing guidance, information, and feedback to acute care providers about performance of resuscitation activities would be useful for improving patient care and outcomes. The devices, systems, and techniques discussed herein are intended to provide such benefits.

SUMMARY

According to an aspect of the disclosure, a system for assisting a user in performing chest compressions for a patient during an acute care event includes: at least one input device for providing information representative of a plurality of physical features of the patient measured during the acute care event; at least one chest compression sensor configured to obtain signals indicative of the chest compressions performed for the patient during the acute care event; a feedback device for providing chest compression feedback for the user; and at least one processor. The at least one processor can be communicatively coupled with the at least one input device for providing information representative of the plurality of physical features and with the at least one chest compression sensor. The at least one processor is configured to: receive and process the information representative of the plurality of physical features of the patient to determine a target chest compression criterion for the patient, receive and process the signals indicative of the chest compressions from the at least one chest compression sensor to calculate at least one chest compression parameter, determine whether the at least one chest compression parameter meets the target chest compression criterion, and cause the feedback device to provide an indication for the user of whether the at least one chest compression parameter meets the target chest compression criterion.

According to another aspect of the disclosure, a system for assisting a user in performing chest compressions for a patient during an acute care event includes: at least one input device for providing information representative of at least one physical feature of the patient measured during the acute care event; a feedback device for providing guidance for how the chest compressions should be performed for the patient; and at least one processor. The at least one processor can be communicatively coupled with the at least one device for providing information representative of the at least one physical feature. The at least one processor is configured to: receive and process the information representative of the at least one physical feature of the patient to determine a suggested chest compression technique for the patient, and cause the feedback device to provide an indication of the suggested chest compression technique for the user.

According to another aspect of the disclosure, a method of providing chest compressions to a patient during an acute care event includes: measuring a plurality of physical features of the patient during the acute care event; determining a target chest compression criterion based on the measured plurality of physical features; applying chest compressions to the patient; using at least one chest compression sensor to measure at least one chest compression parameter during the applied chest compressions; and providing feedback guidance for how a user should adjust the applied chest compressions to the patient based on whether the at least one chest compression parameter meets the target chest compression criterion.

According to another aspect of the disclosure, a method of providing chest compressions to a patient during an acute care event includes: measuring a plurality of physical features of the patient during the acute care event; determining a suggested chest compression technique based on the measured plurality of physical features; providing feedback guidance to provide an indication of the suggested chest compression technique for the user; and applying chest compressions to the patient according to the suggested chest compression technique.

According to another aspect of the disclosure, a system for assisting a user in performing ventilations for a patient during an acute care event includes: at least one input device for providing information representative of a plurality of physical features of the patient measured during the acute care event; at least one ventilation sensor configured to obtain signals indicative of ventilations performed for the patient during the acute care event; a feedback device for providing guidance for how the ventilations should be performed for the patient; and at least one processor. The at least one processor can be communicatively coupled with the at least one input device for providing information representative of the plurality of physical features and with the at least one ventilation sensor. The at least one processor is configured to: receive and process the information representative of the plurality of physical features of the patient to determine a target ventilation criterion for the patient, receive and process the signals indicative of the ventilations from the at least one ventilation sensor to calculate at least one ventilation parameter, determine whether the at least one ventilation parameter meets the target ventilation criterion, and cause the feedback device to provide an indication for the user of whether the at least one ventilation parameter meets the target ventilation criterion.

According to another aspect of the disclosure, a method of providing ventilations to a patient during an acute care event includes: measuring a plurality of physical features of the patient during the acute care event; determining a target ventilation criterion based on the at least one measurement; applying ventilations to the patient; using at least one ventilation sensor to measure at least one ventilation parameter during the applied ventilations; and providing feedback guidance for how a user should adjust the ventilations provided to the patient based on whether the at least one ventilation parameter meets the target ventilation criterion.

According to another aspect of the disclosure, a system for assisting a user in providing at least one cardiopulmonary resuscitation (CPR) activity to a patient during an acute care event includes: at least one three-dimensional imaging system for obtaining information representative of at least one physical feature of the patient; at least one of a chest compression sensor or a ventilation sensor for obtaining signals indicative of the at least one resuscitation activity applied to the patient; a feedback device for providing guidance for how the user should apply the at least one resuscitation activity for the patient; and at least one processor. The at least one processor can be communicatively coupled with the at least one three-dimensional imaging system and with the at least one chest compression or ventilation sensor. The at least one processor is configured to: receive and process the information representative of the at least one physical feature from the three-dimensional imaging system to generate a three-dimensional representation of at least a portion of the patient's body, determine a target resuscitation criterion based on the generated three-dimensional representation, receive and process the signals indicative of the at least one resuscitation activity to calculate at least one resuscitation parameter, determine whether the at least one resuscitation parameter meets the target resuscitation criterion, and cause the feedback device to provide an indication of whether the at least one resuscitation parameter meets the target resuscitation criterion.

According to another aspect of the disclosure, a system for assisting a user in providing at least one cardiopulmonary resuscitation (CPR) activity to a patient during an acute care event includes: at least one input device for providing information representative of at least one physical feature of the patient measured during the acute care event; a feedback device for providing information about the at least one resuscitation activity to a user, the patient, and the acute care event to the user; and at least one processor. The at least one processor is communicatively coupled with the at least one device for providing information representative of at least one physical feature of the patient. The at least one processor is configured to: receive and process the information representative of the at least one physical feature measured during an initial period of the acute care event, determine an initial target resuscitation criterion based on the at least one physical feature during the initial period, cause the feedback device to provide an indication for the user about the initial target resuscitation criterion, receive and process the information representative of the at least one physical feature measured during a subsequent period of the acute care event, determine a modified target resuscitation criterion based on the at least one physical feature during the subsequent time period, and cause the feedback device to provide an indication for the user about the modified target resuscitation criterion.

According to another aspect of the disclosure, a computer implemented method for causing a feedback device to provide feedback to a user to assist the user in providing at least one cardiopulmonary resuscitation (CPR) activity to a patient during an acute care event includes: receiving and processing information representative of at least one physical feature of the patient measured during an initial period of the acute care event from at least one device for providing information representative of the at least one physical feature; determining an initial target resuscitation criterion based on the at least one physical feature during the initial period; receiving and processing information representative of the at least one physical feature measured during a subsequent period of the acute care event; determining a modified target resuscitation criterion based on the at least one physical feature during the subsequent time period; and causing the feedback device to provide an indication for the user about the modified target resuscitation criterion.

According to another aspect of the disclosure, a system for providing ventilation treatment to a patient includes: at least one three-dimensional imaging system for obtaining information representative of at least one physical feature of the patient; a ventilation device for providing the ventilation treatment to the patient; and at least one processor. The at least one processor can be communicatively coupled with the at least one three-dimensional imaging system and with the ventilation device. The at least one processor is configured to: receive and process the information representative of the at least one physical feature of the patient to generate a three-dimensional representation of the patient, determine at least one ventilation criterion for the ventilation device based on the generated three-dimensional representation, and cause the ventilation device to provide ventilations based on the at least one ventilation criterion.

According to another aspect of the disclosure, a system for assisting a user in performing drug delivery for a patient during an acute care event includes: at least one input device for providing information representative of a plurality of physical features of the patient measured during the acute care event; a feedback device for providing dosage information for delivery of drugs to the patient; and at least one processor. The at least one processor can be communicatively coupled with the at least one input device for providing information representative of the plurality of physical features. The at least one processor is configured to: receive and process the information representative of the plurality of physical features of the patient to determine a target drug delivery dosage for the patient, and cause the feedback device to provide an indication for the user of the target drug delivery dosage for the patient.

According to another aspect of the disclosure, a system for assisting a user in providing medical care for a patient during an acute care event includes: at least one input device for providing information representative of a plurality of physical features of the patient measured during the acute care event; a user interface for providing acute care treatment information for the patient; and at least one processor. The at least one processor is communicatively coupled with the at least one input device for providing information representative of the plurality of physical features. The at least one processor is configured to: receive and process the information representative of the plurality of physical features of the patient to estimate a weight of the patient, determine at least one treatment parameter for the patient based at least in part on the estimated weight of the patient, and cause the user interface to provide an indication of the at least one treatment parameter for the patient.

Examples of the present invention will now be described in the following numbered clauses:

Clause 1: A system for assisting a user in performing chest compressions for a patient during an acute care event, the system comprising: at least one input device for providing information representative of a plurality of physical features of the patient measured during the acute care event; at least one chest compression sensor configured to obtain signals indicative of the chest compressions performed for the patient during the acute care event; a feedback device for providing chest compression feedback for the user; and at least one processor communicatively coupled with the at least one input device for providing information representative of the plurality of physical features and with the at least one chest compression sensor, the at least one processor configured to: receive and process the information representative of the plurality of physical features of the patient to determine a target chest compression criterion for the patient, receive and process the signals indicative of the chest compressions from the at least one chest compression sensor to calculate at least one chest compression parameter, determine whether the at least one chest compression parameter meets the target chest compression criterion, and cause the feedback device to provide an indication for the user of whether the at least one chest compression parameter meets the target chest compression criterion.

Clause 2: The system of clause 1, wherein the plurality of physical features comprises at least two of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 3: The system of clause 1 or clause 2, wherein the at least one input device for providing information representative of the plurality of physical features of the patient comprises at least one of a user interface for manually inputting at least one measurement of the physical features, a two-dimensional camera, a stereoscopic camera, a three-dimensional sensor, a three-dimensional imaging system, a light-field camera, and a position sensor or marker positioned on the patient.

Clause 4: The system of clause 3, wherein the at least one input device comprises a three-dimensional imaging system for obtaining information representative of the plurality of physical features of the patient, and the processor is configured to generate a three-dimensional representation of at least a portion of the patient's body based on the information obtained from the three-dimensional imaging system.

Clause 5: The system of any of clauses 1-4, wherein the at least one input device for providing information representative of the plurality of physical features of the patient is mounted to at least one of the patient, the feedback device, or the user.

Clause 6: The system of any of clauses 1-5, further comprising a smart phone or computer tablet, wherein the at least one input device for providing information representative of the plurality of physical features of the patient comprises a camera of the smart phone or computer tablet, and the at least one processor comprises a processor of the smartphone or computer tablet.

Clause 7: The system of clause 6, wherein the feedback device comprises a visual display of the smart phone or computer tablet.

Clause 8: The system of any of clauses 1-7, wherein the plurality of physical features is measured during inhalation or during exhalation.

Clause 9: The system of any of clauses 1-8, wherein at least one of the plurality of physical features comprises an anthropometric characteristic of the patient.

Clause 10: The system of clause 9, wherein the anthropometric characteristic of the patient comprises at least one of thoracic shape, ratio between AP distance and lateral width of the thorax, thoracic volume, and overall patient volume.

Clause 11: The system of any of clauses 1-10, wherein the chest compression sensor comprises at least one of a single axis accelerometer, a multi-axis accelerometer, and a gyroscope.

Clause 12: The system of any of clauses 1-11, wherein the feedback device comprises at least one of a computer tablet, a smart phone, a personal digital assistant, a patient monitor device, a defibrillator, and a chest compression guidance device configured to be placed on the patient's chest.

Clause 13: The system of any of clauses 1-12, wherein the feedback device is configured to provide at least one of audio, visual, and haptic feedback.

Clause 14: The system of any of clauses 1-13, wherein the target chest compression criterion and the measured chest compression parameter comprises at least one of compression depth, compression rate, compression release velocity, compression pause, and compression release.

Clause 15: The system of clause 14, wherein the target chest compression criterion for compression depth comprises a depth of from 0.2 inch to 3.5 inches.

Clause 16: The system of clause 14 or clause 15, wherein the target chest compression criterion for compression depth comprises at least one of a depth of: 0.2 inches to 0.75 inches for a patient having an AP distance less than 3 inches; 0.75 inches to 1.25 inches for a patient having an AP distance of 4.0 inches to 5.0 inches; 1.25 inches to 1.75 inches for a patient having an AP distance of 6.0 inches to 8.0 inches; 1.75 inches to 2.25 inches for a patient having an AP distance of 9.0 inches to 11.0 inches; 2.25 inches to 2.75 inches for a patient having an AP distance of 10 inches to 12 inches; or 2.75 inches to 3.5 inches for a patient having an AP distance of 13 inches or greater.

Clause 17: The system of any of clauses 14-16, wherein the target chest compression criterion for chest compression rate comprises a rate of from 100 cpm to 160 cpm.

Clause 18: The system of any of clauses 14-17, wherein the target chest compression criterion for compression rate comprises at least one of a rate of from: 140 cpm to 160 cpm for a patient having an AP distance less than 3.0 inches; 130 cpm to 150 cpm for a patient having an AP distance of 4.0 inches to 5.0 inches; 120 cpm to 140 cpm for a patient having an AP distance of 6.0 inches to 8.0 inches; 110 cpm to 130 cpm for a patient having an AP distance of 9.0 inches to 11 inches; or 100 cpm to 120 cpm for a patient having an AP distance of 12 inches or greater.

Clause 19: The system of any of clauses 14-18, wherein the target chest compression criterion for target chest compression release velocity comprises 150 inches/minute to 600 inches per minute.

Clause 20: The system of any of clauses 14-19, wherein the target chest compression criterion for target chest compression release velocity comprises at least one of: 150-250 inches/minute for a patient having an AP distance less than 3.0 inches; 200-300 inches/minute for a patient having an AP distance of 4.0 inches to 5.0 inches; 250-400 inches/minute for a patient having an AP distance of 6.0 inches to 8.0 inches; or 250-600 inches/minute for a patient having an AP distance of 10 inches or greater.

Clause 21: The system of any of clauses 1-20, wherein the plurality of physical features of the patient comprises an anterior-posterior distance of the patient's thoracic region and at least one of a lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI), and wherein the target chest compression criterion comprises a target chest compression depth for the patient.

Clause 22: The system of clause 21, wherein the indication for the user provided by the feedback device comprises an instruction to increase chest compression depth, to decrease chest compression depth, or to maintain chest compression depth determined based on the determination of whether the chest compression parameter meets the target chest compression criterion.

Clause 23: The system of any of clauses 1-22, wherein the at least one processor determines the target chest compression criterion for the patient based on the plurality of physical features and a value determined from a lookup table and/or calculated by a linear regression formula.

Clause 24: The system of any of clauses 1-23, wherein the at least one processor is further configured to determine a type of patient based on the plurality of physical features, and cause the feedback device to provide an indication of the type of patient to the user.

Clause 25: The system of clause 24, wherein the type of patient comprises a pediatric patient or an adult patient.

Clause 26: The system of clause 24 or clause 25, wherein the type of patient comprises at least one of a neonate, an infant, a small child, a large child, a small adult, an average-sized adult, or a large adult.

Clause 27: The system of any of clauses 1-26, wherein the at least one processor is further configured to: after the chest compressions are performed for a predetermined period of time, receive and process updated information representative of the plurality of physical features of the patient from the at least one device to determine a modified target chest compression criterion, determine whether the at least one chest compression parameter meets the modified target chest compression criterion, and cause the feedback device to provide an indication for the user of whether the at least one chest compression parameter meets the modified target chest compression criterion.

Clause 28: The system of clause 27, wherein the updated information representative of the plurality of physical features comprises updated information regarding an anterior-posterior distance of the patient's cardiothoracic region, and the modified target chest compression criterion comprises a modification of a target chest compression depth based at least in part on the updated information regarding the anterior-posterior distance of the patient's cardiothoracic region.

Clause 29: The system of clause 27 or clause 28, wherein the at least one processor is further configured to compare the initial target chest compression criterion to the modified target chest compression criterion and cause the feedback device to provide an indication for the user when the modified target chest compression criterion differs from the initial target chest compression criterion.

Clause 30: The system of any of clauses 27-29, wherein the at least one processor is configured to maintain a record of past modified target chest compression criteria and recorded chest compression parameters corresponding to each of the past modified target chest compression criterion.

Clause 31: The system of any of clauses 27-30, wherein the predetermined period of time prior to receiving the updated information comprises a period of time determined based on the initial information representative of the plurality of physical features and the target chest compression criterion.

Clause 32: The system of any of clauses 1-31, wherein the at least one processor is further configured to determine a suggested chest compression technique for the patient based on the plurality of physical features of the patient, and to cause the feedback device to provide an indication for the user to perform the suggested chest compression technique.

Clause 33: The system of clause 32, wherein the suggested chest compression technique is based on a change in the at least one of the plurality of physical features of the patient over a predetermined period of time.

Clause 34: The system of clause 32 or clause 33, wherein the suggested chest compression technique comprises at least one of two palm chest compressions, one palm chest compressions, encircled thumb chest compressions, and two finger chest compressions.

Clause 35: The system of any of clauses 32 to 34, wherein the suggested chest compression technique comprises active chest decompressions.

Clause 36: The system of clause 35, wherein the plurality of physical features comprise a sternal anterior-posterior distance and the active chest decompressions as the suggested chest compression technique is based on a reduction in the sternal anterior-posterior distance.

Clause 37: The system of clause 35 or clause 36, wherein the indication to perform active chest decompressions comprises an indication to perform chest decompressions using at least one of a suction cup device, an adhesive device, a hook and loop fastener device, and/an instruction to perform compressions of the patient's sides or abdomen.

Clause 38: The system of any of clauses 1-37, wherein the at least one processor is further configured to determine a percentage of time during a rescue effort in which the measured chest compression parameter does not meet the target chest compression criterion, and to cause the feedback device to provide an indication to the user when the percentage of time exceeds a predetermined value.

Clause 39: The system of clause 38, wherein the indication to the user when the percentage of time exceeds the predetermined value comprises an instruction to begin performing a second chest compression technique different from an initial chest compression technique performed during the predetermined period of time.

Clause 40: The system of clause 39, wherein the initial chest compression technique comprises two palm chest compressions, and the second chest compression technique comprises performing chest compressions with active chest decompressions.

Clause 41: The system of clause 39 or clause 40, wherein the initial chest compression technique comprises one palm chest compressions or two palm chest compressions, and the second chest compression technique comprises two finger chest compressions.

Clause 42: The system of any of clauses 39-41, wherein the at least one processor is configured to receive an acknowledgement from the user when the user commences the second chest compression technique.

Clause 43: The system of any of clauses 1-42, further comprising at least one ventilation sensor configured to measure at least one of tidal volume, minute volume, end-inspiratory pressure, maximum ventilation pressure, and ventilation rate during the acute care event.

Clause 44: The system of clause 43, wherein the ventilation sensor comprises an airflow sensor and/or a pressure sensor positioned in an airflow path of a ventilation unit in fluid communication with the patient's airway.

Clause 45: The system of clause 43, wherein the ventilation sensor comprises at least a first absolute barometric pressure sensors and a second absolute barometric pressure sensor separated by a flow restrictor, for measuring rate of airflow and pressure in the airflow path.

Clause 46: The system of any of clauses 1-45, wherein the target chest compression criterion comprises an initial range for acceptable chest compressions, and wherein the at least one processor is further configured to: after a predetermined period of time, receive and process information representative of a second physical feature of the patient, different from a first physical feature of the plurality of physical features, and determine an updated range for acceptable chest compressions based on the first physical feature and the second physical feature.

Clause 47: The system of clause 46, wherein the at least one processor is further configured to: determine whether the at least one chest compression parameter is within the updated range for acceptable chest compressions, and cause the feedback device to provide an indication for the user of whether the at least one chest compression parameter is within the updated range for acceptable chest compressions.

Clause 48: The system of any of clauses 1-47, wherein the at least one input device for providing information representative of the plurality of physical features of the patient further provides an age or gender of the patient, and wherein the target chest compression criterion is determined based at least in part on the plurality of physical features and the age or gender of the patient.

Clause 49: The system of any of clauses 1-48, wherein the feedback device comprises a defibrillator, and wherein the at least one processor is configured to, as a defibrillation shock is being provided to the patient by the defibrillator, receive and process updated information representative of the plurality of physical features of the patient from the at least one device to determine a modified target chest compression criterion.

Clause 50: The system of clause 49, wherein the at least one processor is configured to: cause the feedback device to provide an instruction to the user to recommence chest compressions after the defibrillator shock is provided; receive and process signals indicative of the recommenced chest compressions from the at least one chest compression sensor to calculate at least one chest compression parameter for the recommenced chest compressions; determine whether the at least one chest compression parameter for the recommenced chest compressions meets the modified chest compression criterion; and cause the feedback device to provide an indication for the user of whether the at least one chest compression parameter for the recommenced chest compressions meets the modified target chest compression criterion.

Clause 51: The system of any of clauses 1-50, wherein the plurality of physical features of the patient comprises an anterior-posterior distance of the patient's thoracic region and at least one of lateral width of the thorax, thoracic circumference, thoracic volume, and thoracic shape, and wherein the target chest compression criterion comprises a target chest compression depth for the patient.

Clause 52: The system of any of clauses 1-51, wherein the plurality of physical features of the patient comprises an anterior-posterior distance of the patient's thoracic region and at least one of a length, volume, or weight of a body region of the patient, and wherein the target chest compression criterion comprises a target chest compression depth for the patient, and, optionally, wherein the body region of the patient comprises at least one of a thoracic region, a hand, an arm, a foot, a leg, a face, or a skull of the patient.

Clause 53: The system of clause 1-51, wherein the plurality of physical features of the patient comprises an anterior-posterior distance of the patient's thoracic region and a feature or characteristic indicative of a total size of the patient, and, optionally, wherein the feature or characteristic indicative of the total size of the patient comprises one or more of patient height, weight, wingspan, body volume, or body-mass index (BMI).

Clause 54: The system of any of clauses 1-53, wherein the processor is configured to process the plurality of physical features to estimate a weight of the patient.

Clause 55: The system of clause 54, wherein the processor is configured to determine a treatment parameter for the patient based, at least in part, on the estimated weight of the patient.

Clause 56: A system for assisting a user in performing chest compressions for a patient during an acute care event, the system comprising: at least one input device for providing information representative of at least one physical feature of the patient measured during the acute care event; a feedback device for providing guidance for how the chest compressions should be performed for the patient; and at least one processor communicatively coupled with the at least one device for providing information representative of the at least one physical feature, the at least one processor configured to: receive and process the information representative of the at least one physical feature of the patient to determine a suggested chest compression technique for the patient, and cause the feedback device to provide an indication of the suggested chest compression technique for the user.

Clause 57: The system of clause 56, wherein the at least one input device provides information representative of a plurality of physical features of the patient measured during the acute care event.

Clause 58: The system of clause 56 or clause 57, wherein the plurality of physical features comprises at least two of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 59: The system of any of clauses 56-58, wherein the at least one input device for providing information representative of the at least one physical feature of the patient comprises at least one of a user interface for manually inputting at least one measurement of the physical feature, a two-dimensional camera, a stereoscopic camera, a three-dimensional sensor, a three-dimensional imaging system, a light-field camera, and a position sensor or marker positioned on the patient.

Clause 60: The system of clause 59, wherein the at least one device comprises a three-dimensional imaging system for obtaining information representative of the at least one physical feature of the patient, and the at least one processor is configured to generate a three-dimensional representation of at least a portion of the patient's body based on the information obtained from the three-dimensional sensor.

Clause 61: The system of any of clauses 56-60, further comprising a smart phone or computer tablet, wherein the at least one device for providing information representative of the at least one physical feature of the patient comprises a camera of the smart phone or computer tablet, and the at least one processor comprises a processor of the smartphone or computer tablet.

Clause 62: The system of clause 61, wherein the feedback device comprises a visual display of the smart phone or computer tablet.

Clause 63: The system of any of clauses 56-61, wherein the at least one physical feature is measured during inhalation or during exhalation.

Clause 64: The system of any of clauses 56-63, wherein the feedback device comprises at least one of a computer tablet, a smart phone, a personal digital assistant, a patient monitor device, a defibrillator, and a chest compression guidance device configured to be placed on the patient's chest.

Clause 65: The system of any of clauses 56-64, wherein the feedback device is configured to provide at least one of audio, visual, and haptic feedback.

Clause 66: The system of any of clauses 56-65, further comprising at least one chest compression sensor configured to obtain signals indicative of the chest compressions performed for the patient during the acute care event, and the at least one processor is configured to: receive and process the information representative of the at least one physical feature of the patient to determine a target chest compression criterion for the patient, receive and process the signals indicative of the chest compressions from the at least one chest compression sensor to calculate at least one chest compression parameter, determine whether the at least one chest compression parameter meets the target chest compression criterion, and cause the feedback device to provide an indication for the user of whether the at least one chest compression parameter meets the target chest compression criterion.

Clause 67: The system of clause 66, wherein the target chest compression criterion and the measured chest compression parameter comprise at least one of compression depth, compression rate, compression release velocity, compression pause, and compression release.

Clause 68: The system of clause 67, wherein the at least one physical feature of the patient comprises a sternal anterior-posterior distance and at least one of a thoracic width or thoracic circumference, and wherein the target chest compression criterion comprises a target chest compression depth for the patient.

Clause 69: The system of clause 68, wherein the indication for the user provided by the feedback device comprises an instruction to increase chest compression depth, to decrease chest compression depth, or to maintain chest compression depth determined based on the determination of whether the chest compression parameter meets the target chest compression criterion.

Clause 70: The system of any of clauses 66-69, wherein the at least one processor is configured to: after the chest compressions are performed for a predetermined period of time, determine a modified suggested chest compression technique based at least in part on whether the at least one chest compression parameter meets the target chest compression criterion, and cause the feedback device to provide an indication of the modified suggested chest compression technique for the user.

Clause 71: The system of any of clauses 66-70, wherein the processor is further configured to determine a percentage of time during a rescue effort in which the measured chest compression parameter does not meet the target chest compression criterion, and to cause the feedback device to provide an indication to the user when the percentage of time exceeds a predetermined value.

Clause 72: The system of clause 71, wherein the indication to the user when the percentage of time exceeds the predetermined value comprises an instruction to begin performing a second suggested chest compression technique different from the suggested chest compression technique performed during an initial period of time.

Clause 73: The system of clause 72, wherein the suggested chest compression technique performed during the initial period of time comprises two palm chest compressions, and the second chest compression technique comprises performing chest compressions with active chest decompressions.

Clause 74: The system of clause 72 or clause 73, wherein the suggested chest compression technique performed during the initial period of time comprises one palm chest compressions or two palm chest compressions, and the second suggested chest compression technique comprises two finger chest compressions.

Clause 75: The system of any of clauses 72-74, wherein the at least one processor is configured to receive an acknowledgement from the user when the user commences the second chest compression technique.

Clause 76: The system of any of clauses 56-75, wherein the processor is further configured to: after the chest compressions are performed for a predetermined period of time, receive and process updated information representative of the at least one physical feature of the patient from the at least one device to determine a modified suggested chest compression technique, cause the feedback device to provide an indication of the modified suggested chest compression technique for the user.

Clause 77: The system of any of clauses 56-76, wherein the suggested chest compression technique is based on a change in the at least one physical feature of the patient over a predetermined period of time.

Clause 78: The system of any of clauses 56-77, wherein the suggested chest compression technique comprises at least one of two palm chest compressions, one palm chest compressions, encircled thumb chest compressions, and two finger chest compressions.

Clause 79: The system of any of clauses 56-78, wherein the suggested chest compression technique comprises active chest decompressions.

Clause 80: The system of clause 79, wherein the at least one physical feature comprises a sternal anterior-posterior distance and the active chest decompressions as the suggested chest compression technique is based on a reduction in the sternal anterior-posterior distance.

Clause 81: The system of clause 80, wherein the indication to perform active chest decompressions comprises an indication to perform chest decompressions using at least one of a suction cup device, an adhesive device, a hook and loop fastener device, and/an instruction to perform compressions of the patient's sides or abdomen.

Clause 82: The system of any of clauses 56-81, wherein the feedback device comprises a defibrillator, and wherein the at least one processor is configured to, as a defibrillation shock is being provided to the patient by the defibrillator, receive and process updated information representative of the at least one physical feature of the patient from the at least one device to determine a modified suggested chest compression technique.

Clause 83: The system of any of clauses 56-82, further comprising at least one ventilation sensor configured to measure at least one of tidal volume, minute volume, end-inspiratory pressure, maximum ventilation pressure, and ventilation rate during the acute care event.

Clause 84: The system of clause 83, wherein the ventilation sensor comprises an airflow sensor and/or a pressure sensor positioned in an airflow path of a ventilation unit in fluid communication with the patient's airway.

Clause 85: A method of providing chest compressions to a patient during an acute care event, the method comprising: measuring a plurality of physical features of the patient during the acute care event; determining a target chest compression criterion based on the measured plurality of physical features; applying chest compressions to the patient; using at least one chest compression sensor to measure at least one chest compression parameter during the applied chest compressions; and providing feedback guidance for how a user should adjust the applied chest compressions to the patient based on whether the at least one chest compression parameter meets the target chest compression criterion.

Clause 86: The method of clause 85, wherein the plurality of physical features comprise at least two of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 87: The method of clause 85 or clause 86, wherein measuring the plurality of physical features of the patient during the acute care event comprises capturing at least one image of the patient with a handheld electronic device and processing, with at least one processor of the handheld electronic device, the at least one captured image to determine at least one measurement of the physical feature.

Clause 88: The method of clause 87, wherein the at least one processor of the handheld electronic device determines the chest compression target criterion based on measurements of the plurality of physical features and the at least one chest compression parameter by processing signals generated by the chest compression sensor.

Clause 89: The method of clause 87 or clause 88, wherein the feedback guidance is provided on a display screen of the handheld electronic device.

Clause 90: The method of any of clauses 85-89, wherein measuring the plurality of physical features of the patient during the acute care event comprises obtaining information representative of the plurality of physical features using a three-dimensional sensor.

Clause 91: The method of any of clauses 85-90, further comprising manually inputting the measurements of the plurality of physical features of the patient on a user interface.

Clause 92: The method of any of clauses 85-91, wherein the plurality of physical features comprise an anterior-posterior distance of the patient's cardiothoracic region and at least one of a width or circumference of the patient's cardiothoracic region, and wherein the target chest compression criterion comprises a target chest compression depth for the patient.

Clause 93: The method of any of clauses 85-92, further comprising: after a predetermined period of time, recording at least one updated measurement for the plurality of physical features of the patient; determining a modified target chest compression criterion based on the updated measurements; and providing feedback guidance for how a user should adjust the applied chest compressions to the patient based on whether the at least one chest compression parameter meets the modified target resuscitation criterion.

Clause 94: The method of clause 93, wherein the at least one updated measurement comprises a sternal anterior-posterior distance.

Clause 95: The method of any of clauses 85-94, wherein the target chest compression criterion and the measured at least one chest compression parameter comprise at least one of compression depth, compression rate, compression release velocity, compression pause, and compression release.

Clause 96: The method of any of clauses 85-95, wherein providing the feedback guidance comprises providing an indication to increase chest compression depth, to decrease chest compression depth, or to maintain chest compression depth based on whether the at least one chest compression parameter meets the target chest compression criterion.

Clause 97: The method of any of clauses 85-96, further comprising determining a suggested chest compression technique based on the measured plurality of physical features, and providing feedback guidance to provide an indication of the suggested chest compression technique for the user.

Clause 98: The method of clause 97, wherein the suggested chest compression technique is based on a change in at least one of the plurality of physical features of the patient over a predetermined period of time.

Clause 99: The method of clause 97 or clause 98, wherein the suggested chest compression technique comprises at least one of two palm chest compressions, one palm chest compressions, encircled thumb chest compressions, and two finger chest compressions.

Clause 100: The method of any of clauses 85-99, wherein the feedback guidance comprises an indication to begin performing a second chest compression technique different from an initial chest compression technique based at least in part on whether the measured chest compression parameter does not meet the target chest compression criterion.

Clause 101: The method of clause 100, wherein the initial chest compression technique comprises two palm chest compressions, and the second chest compression technique comprises performing chest compressions with active chest decompressions.

Clause 102: The method of clause 100 or clause 101, wherein the initial chest compression technique comprises one palm chest compressions or two palm chest compressions, and the second chest compression technique comprises two finger chest compressions.

Clause 103: A method of providing chest compressions to a patient during an acute care event, the method comprising: measuring a plurality of physical features of the patient during the acute care event; determining a suggested chest compression technique based on the measured plurality of physical features; providing feedback guidance to provide an indication of the suggested chest compression technique for the user; and applying chest compressions to the patient according to the suggested chest compression technique.

Clause 104: The method of clause 103, wherein the plurality of physical features comprise at least two of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 105: The method of clause 103 or clause 104, wherein measuring the plurality of physical features of the patient during the acute care event comprises obtaining information representative of the plurality of physical features using a three-dimensional imaging system.

Clause 106. The method of any of clauses 103-105, wherein the suggested chest compression technique is based on a change in at least one of the plurality of physical features of the patient over a predetermined period of time.

Clause 107: The method of any of clauses 103-106, further comprising determining a target chest compression criterion based on the measured plurality of physical features, using at least one chest compression sensor to measure at least one chest compression parameter during the applied chest compressions, and providing feedback guidance for how the user should adjust the applied chest compressions to the patient based on whether the at least one chest compression parameter meets the target chest compression criterion.

Clause 108: The method of clause 107, wherein the target chest compression criterion and the measured at least one chest compression parameter comprise at least one of compression depth, compression rate, compression release velocity, compression pause, and compression release.

Clause 109: The method of clause 108, wherein the plurality of physical features comprise a sternal anterior-posterior distance and at least one of a thoracic width or thoracic circumference, and wherein the target chest compression criterion comprises a target chest compression depth for the patient.

Clause 110: The method of any of clauses 107-109, further comprising: after a predetermined period of time, recording at least one updated measurement for the plurality of physical features of the patient; determining a modified target chest compression criterion based on the updated measurements; and providing feedback guidance for how a user should adjust the applied chest compressions to the patient based on whether the at least one chest compression parameter meets the modified target resuscitation criterion.

Clause 111: The method of any of clauses 107-110, wherein the feedback guidance comprises an indication to begin performing a second chest compression technique different from an initial chest compression technique based at least in part on whether the measured chest compression parameter does not meet the target chest compression criterion.

Clause 112: The method of clause 111, wherein the initial chest compression technique comprises two palm chest compressions, and the second chest compression technique comprises performing chest compressions with active chest decompressions.

Clause 113: A system for assisting a user in performing ventilations for a patient during an acute care event, the system comprising: at least one input device for providing information representative of a plurality of physical features of the patient measured during the acute care event; at least one ventilation sensor configured to obtain signals indicative of ventilations performed for the patient during the acute care event; a feedback device for providing guidance for how the ventilations should be performed for the patient; and at least one processor communicatively coupled with the at least one input device for providing information representative of the plurality of physical features and with the at least one ventilation sensor, the at least one processor configured to: receive and process the information representative of the plurality of physical features of the patient to determine a target ventilation criterion for the patient, receive and process the signals indicative of the ventilations from the at least one ventilation sensor to calculate at least one ventilation parameter, determine whether the at least one ventilation parameter meets the target ventilation criterion, and cause the feedback device to provide an indication for the user of whether the at least one ventilation parameter meets the target ventilation criterion.

Clause 114: The system of clause 113, wherein the plurality of physical features comprises at least one of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 115: The system of clause 114, wherein the thoracic volume of the patient is determined based on at least one of an anterior-posterior distance of the patient's thoracic region, a width of the patient's thoracic region, and a circumference of the patient's thoracic region.

Clause 116: The system of any of clauses 113 to 115, wherein the at least one input device for providing information representative of the plurality of physical features of the patient comprises at least one of a user interface for manually inputting at least one measurement of the physical feature, a two-dimensional camera, a stereoscopic camera, a three-dimensional imaging system, a three-dimensional sensor, a light-field camera, and a position sensor or marker positioned on the patient.

Clause 117: The system of clause 116, wherein the camera, three-dimensional sensor, or three-dimensional imaging system is mounted to at least one of the patient, the feedback device, or the user.

Clause 118: The system of any of clauses 113 to 117, wherein the at least one input device for providing information representative of the plurality of physical features of the patient further provides an age or gender of the patient, and wherein the target ventilation criterion is determined based at least in part on the plurality of physical features and the age or gender of the patient.

Clause 119: The system of any of clauses 113 to 118, wherein at least one of the plurality of physical features comprises a shape of a thorax of the patient.

Clause 120: The system of any of clauses 113 to 119, wherein the ventilation sensor comprises an airflow sensor and/or a pressure sensor positioned in an airflow path of a ventilation unit in fluid communication with the patient's airway.

Clause 121: The system of any of clauses 113 to 120, wherein the feedback device comprises at least one of a computer tablet, a smart phone, a personal digital assistant, a patient monitor device, a ventilator, and a ventilation guidance device configured to be placed in an airflow path between a ventilator and the patient.

Clause 122: The system of any of clauses 113 to 121, wherein the target ventilation criterion and the measured ventilation parameter comprise at least one of tidal volume, minute volume, end-inspiratory pressure, maximum ventilation pressure, and ventilation rate during the acute care event.

Clause 123: The system of any of clauses 113 to 122, wherein the processor is further configured to: after the ventilations are performed for a predetermined period of time, receive and process updated information representative of the physical feature of the patient from the at least one input device to determine a modified target ventilation criterion, determine whether the at least one ventilation parameter meets the modified target ventilation criterion, and cause the feedback device to provide an indication for the user of whether the at least one ventilation parameter meets the modified target ventilation criterion.

Clause 124: The system of any of clauses 113 to 123, wherein at least one of the plurality of physical features of the patient comprises a height of the patient.

Clause 125: The system of any of clauses 113 to 124, wherein the at least one input device for providing information representative of the plurality of physical features of the patient further provides an age or gender of the patient, and wherein the at least one processor is further configured to provide at least one of a suggested endotracheal tube placement depth and a suggested tidal volume based on the height and gender of the patient.

Clause 126: The system of clause 125, wherein the target ventilation criterion is based at least in part on height and gender of the patient.

Clause 127: The system of clause 126, wherein the at least one processor is configured to determine the suggested endotracheal tube placement depth or the suggested tidal volume based on the patient's height and gender and values of estimated trachea length from a lookup table.

Clause 128: The system of any of clauses 113 to 127, wherein the at least one processor is further configured to receive an age of the patient and to determine the target ventilation criterion for the patient based on the plurality of physical features and the age of the patient.

Clause 129: The system of any of clauses 113 to 128, further comprising at least one chest compression sensor configured to obtain signals indicative of the chest compressions performed for the patient during the acute care event, and the at least one processor is configured to: receive and process the information representative of the plurality of physical features of the patient to determine a target chest compression criterion for the patient, receive and process the signals indicative of the chest compressions from the at least one chest compression sensor to calculate at least one chest compression parameter, determine whether the at least one chest compression parameter meets the target chest compression criterion, and cause the feedback device to provide an indication for the user of whether the at least one chest compression parameter meets the target chest compression criterion.

Clause 130: The system of any of clauses 113 to 129, wherein the at least one processor is further configured to determine a suggested chest compression technique for the patient based on the plurality of physical features of the patient, and to cause the feedback device to provide an indication for the user to perform the suggested chest compression technique.

Clause 131: A method of providing ventilations to a patient during an acute care event, the method comprising: measuring a plurality of physical features of the patient during the acute care event; determining a target ventilation criterion based on the at least one measurement; applying ventilations to the patient; using at least one ventilation sensor to measure at least one ventilation parameter during the applied ventilations; and providing feedback guidance for how a user should adjust the ventilations provided to the patient based on whether the at least one ventilation parameter meets the target ventilation criterion.

Clause 132: The method of clause 131, wherein at least one of the plurality of physical features comprises: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 133: The method of clause 131 or clause 132, wherein measuring the plurality of physical features of the patient during the acute care event comprises capturing at least one image of the pediatric patient with a handheld electronic device and processing, with at least one processor of the handheld electronic device, the at least one captured image to determine at least one measurement of the plurality of physical features.

Clause 134: The method of clause 133, wherein the at least one processor of the handheld electronic device determines the ventilation target criterion based on the at least one measurement and determines the at least one ventilation parameter by processing signals generated by the ventilation sensor.

Clause 135: The method of any of clauses 131 to 134, wherein measuring the plurality of physical features of the patient during the acute care event comprises obtaining information representative of the plurality of physical features using a three-dimensional imaging system.

Clause 136: The method of any of clauses 131 to 135, further comprising manually inputting the measurement of the plurality of physical features of the patient on a user interface.

Clause 137: The method of any of clauses 131 to 136, wherein the target ventilation criterion and the measured ventilation parameter comprise at least one of tidal volume, minute volume, end-inspiratory pressure, maximum ventilation pressure, and ventilation rate during the acute care event.

Clause 138: The method of any of clauses 131 to 137, wherein at least one of the plurality of physical features of the patient comprises a height of the patient, the method further comprising determining a recommended endotracheal tube placement depth based at least in part on the patient's height.

Clause 139: The method of clause 138, further comprising inserting the endotracheal tube to the recommended depth, and wherein applying ventilations to the patient comprises applying ventilations to the patient through the inserted endotracheal tube.

Clause 140: The method of clause 138 or clause 139, further comprising providing an input of at least one of age and gender of the patient, wherein the recommended endotracheal tube placement depth is based on the patient's height and gender.

Clause 141: The method of any of clauses 131 to 140, further comprising determining a target chest compression criterion based on at least one of the plurality of physical features, using at least one chest compression sensor to measure at least one chest compression parameter during the applied chest compressions, and providing feedback guidance for how the user should adjust the applied chest compressions to the patient based on whether the at least one chest compression parameter meets the target chest compression criterion.

Clause 142: The method of any of clauses 131 to 141, further comprising determining a suggested chest compression technique based on the measured plurality of physical features, and providing feedback guidance to provide an indication of the suggested chest compression technique for the user.

Clause 143: A system for assisting a user in providing at least one cardiopulmonary resuscitation (CPR) activity to a patient during an acute care event, the system comprising: at least one three-dimensional imaging system for obtaining information representative of at least one physical feature of the patient; at least one of a chest compression sensor or a ventilation sensor for obtaining signals indicative of the at least one resuscitation activity applied to the patient; a feedback device for providing guidance for how the user should apply the at least one resuscitation activity for the patient; and at least one processor communicatively coupled with the at least one three-dimensional imaging system and with the at least one chest compression or ventilation sensor, the at least one processor configured to: receive and process the information representative of the at least one physical feature from the three-dimensional imaging system to generate a three-dimensional representation of at least a portion of the patient's body, determine a target resuscitation criterion based on the generated three-dimensional representation, receive and process the signals indicative of the at least one resuscitation activity to calculate at least one resuscitation parameter, determine whether the at least one resuscitation parameter meets the target resuscitation criterion, and cause the feedback device to provide an indication of whether the at least one resuscitation parameter meets the target resuscitation criterion.

Clause 144: The system of clause 143, wherein the at least one physical feature comprises at least one of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 145: The system of clause 143 or clause 144, wherein the information representative of the at least one physical feature comprises information representative of the at least one physical feature recorded during inhalation and/or information representative of the at least one physical feature recorded during exhalation.

Clause 146: The system of any of clauses 143 to 145, wherein the feedback device comprises at least one of a computer tablet, a smart phone, a personal digital assistant, a patient monitor device, a defibrillator, a ventilator, a chest compression guidance device configured to be placed on the patient's chest, or a ventilation guidance device configured to be placed in an airflow path between a ventilator and the patient.

Clause 147: The system of any of clauses 143 to 146, wherein the at least one processor is configured to cause the feedback device to display at least a portion of the three-dimensional representation of the patient to the user.

Clause 148: The system of any of clauses 143 to 147, wherein the processor is further configured to determine a type of patient based on the generated three-dimensional representation of the patient, and to cause the feedback device to provide an indication of the type of patient to the user.

Clause 149: The system of clause 148, wherein the type of patient comprises a neonate, an infant, a small child, a large child, a small adult, an average-sized adult, or a large adult.

Clause 150: The system of any of clauses 143 to 149, wherein the processor is further configured to determine a suggested chest compression technique for the patient based on the generated three-dimensional representation of the patient, and to cause the feedback device to provide an indication for the user to perform the suggested chest compression technique.

Clause 151: The system of clause 150, wherein the resuscitation activity is chest compressions, and wherein the suggested chest compression technique comprises at least one of two palm chest compressions, one palm chest compressions, encircled thumb chest compressions, or two finger chest compressions.

Clause 152: The system of clause 150 or clause 151, wherein the resuscitation activity is chest compressions and wherein the suggested chest compression technique comprises active chest decompressions.

Clause 153: The system of clause 152, wherein the indication to perform active chest decompressions comprises a suggestion to perform chest decompressions using a suction cup device, an adhesive device, a hook and loop fastener device, and/or an instruction to perform compressions of the patient's sides or abdomen.

Clause 154: A system for assisting a user in providing at least one cardiopulmonary resuscitation (CPR) activity to a patient during an acute care event, the system comprising: at least one input device for providing information representative of at least one physical feature of the patient measured during the acute care event; a feedback device for providing information about the at least one resuscitation activity to a user, the patient, and the acute care event to the user; and at least one processor communicatively coupled with the at least one device for providing information representative of at least one physical feature of the patient, the at least one processor configured to: receive and process the information representative of the at least one physical feature measured during an initial period of the acute care event, determine an initial target resuscitation criterion based on the at least one physical feature during the initial period, cause the feedback device to provide an indication for the user about the initial target resuscitation criterion, receive and process the information representative of the at least one physical feature measured during a subsequent period of the acute care event, determine a modified target resuscitation criterion based on the at least one physical feature during the subsequent time period, and cause the feedback device to provide an indication for the user about the modified target resuscitation criterion.

Clause 155: The system of clause 154, wherein the at least one physical feature comprises at least one of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 156: The system of clause 154 or clause 155, wherein the at least one device for providing information representative of at least one physical feature of the patient comprises at least one of a user interface for manually inputting the physical measurements, a two-dimensional camera, a stereoscopic camera, a light-field camera, a three-dimensional sensor, a three-dimensional imaging system, or a position sensor or marker positioned on the patient.

Clause 157: The system of any of clauses 154 to 156, wherein the feedback device comprises at least one of a computer tablet, a smart phone, a personal digital assistant, a smart watch, a patient monitor device, a defibrillator, a ventilator, a chest compression guidance device configured to be placed on the patient's chest, or a ventilation guidance device configured to be placed in an airflow path between a ventilator and the patient.

Clause 158: The system of any of clauses 154 to 157, wherein a duration of the initial period is selected based on the at least one physical feature of the acute care event and the initial target resuscitation criterion.

Clause 159: The system of any of clauses 154 to 158, wherein the at least one processor is further configured to determine a modified suggested technique for the resuscitation activity based on the at least one physical feature measured during the subsequent period of the acute care event, and to cause the feedback device to provide an indication for the user to perform the modified suggested technique for the resuscitation activity.

Clause 160: The system of clause 159, wherein the resuscitation activity comprises chest compressions, and wherein the modified suggested chest compression technique comprises at least one of two palm chest compressions, one palm chest compressions, encircled thumb chest compressions, or two finger chest compressions.

Clause 161: The system of clause 159, wherein the resuscitation activity is chest compressions and wherein the modified chest compression technique comprises chest compressions and active chest decompressions.

Clause 162: The system of clause 161, wherein the instruction to perform active chest decompressions comprises an instruction to perform chest decompressions using a suction cup device, an adhesive device, a hook and loop fastener device, and/or an instruction to perform compressions of the patient's sides or abdomen.

Clause 163: The system of any of clauses 154 to 162, further comprising at least one of a chest compression sensor and a ventilation sensor communicatively coupled to the at least one processor and configured to obtain signals indicative of the CPR applied to the patient, and wherein the at least one processor is further configured to: receive and process the signals indicative of the CPR applied to the patient during the initial period of the acute care event to calculate at least one resuscitation parameter, determine whether the at least one resuscitation parameter meets the initial target resuscitation criterion, and cause the feedback device to provide an indication for the user of whether the at least one resuscitation parameter meets the initial target resuscitation criterion.

Clause 164: The system of clause 163, wherein the at least one processor is further configured to:

receive and process the signals indicative of the CPR applied to the patient during the subsequent period of the acute care event to calculate at least one resuscitation parameter, determine whether the at least one resuscitation parameter meets the modified target resuscitation criterion, and cause the feedback device to provide an indication for the user of whether the at least one resuscitation parameter meets the modified target resuscitation criterion.

Clause 165: The system of clause 163 or clause 164, wherein the chest compression sensor comprises at least one of a single-axis accelerometer, a multi-axis accelerometer, or a gyroscope, and wherein the ventilation sensor comprises at least one of an airflow sensor and a pressure sensor in an airflow path in fluid communication with the patient's airway.

Clause 166: The system of any of clauses 163 to 165, wherein the at least one physical feature of the patient comprises an anterior-posterior distance of the patient's cardiothoracic region and at least one of a width or circumference of the patient's cardiothoracic region, and wherein the initial target resuscitation criterion and the modified target resuscitation criterion each comprise a target chest compression depth for the patient.

Clause 167: The system of any of clauses 163 to 166, wherein the feedback comprises a summary report for the rescue effort comprising an indication for the initial period comparing the resuscitation parameter measured during the initial period and the initial target resuscitation criterion and an indication for the subsequent period comparing the resuscitation parameter measured during the subsequent period and the modified target resuscitation criterion.

Clause 168: The system of any of clauses 163 to 167, wherein the summary report comprises a graph comparing the resuscitation parameter measured during the initial period and the initial target resuscitation criterion and a graph for the subsequent period comparing the resuscitation parameter measured during the subsequent period and the modified target resuscitation criterion.

Clause 169: A computer implemented method for causing a feedback device to provide feedback to a user to assist the user in providing at least one cardiopulmonary resuscitation (CPR) activity to a patient during an acute care event, the method comprising: receiving and processing information representative of at least one physical feature of the patient measured during an initial period of the acute care event from at least one device for providing information representative of the at least one physical feature; determining an initial target resuscitation criterion based on the at least one physical feature during the initial period; receiving and processing information representative of the at least one physical feature measured during a subsequent period of the acute care event; determining a modified target resuscitation criterion based on the at least one physical feature during the subsequent time period; and causing the feedback device to provide an indication for the user about the modified target resuscitation criterion.

Clause 170: The method of clause 169, wherein the at least one physical feature comprises at least one of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 171: The method of clause 169 or clause 170, wherein a duration of the initial period is selected based on the at least one physical feature of the patient and the initial target resuscitation criterion.

Clause 172: The method of any of clauses 169 to 171, further comprising determining a modified technique for the resuscitation activity based on the at least one physical feature measured during the subsequent period of the acute care event and causing the feedback device to provide an instruction for the user to perform the modified technique for the resuscitation activity.

Clause 173: The method of clause 172, wherein the resuscitation activity comprises chest compressions, and wherein the modified chest compression technique comprises at least one of two palm chest compressions, one palm chest compressions, encircled thumb chest compressions, or two finger chest compressions.

Clause 174: The method of clause 172, wherein the resuscitation activity is chest compressions and wherein the modified chest compression technique comprises performing chest compressions and active chest decompressions.

Clause 175: The method of any of clauses 172 to 174, wherein the instruction to perform active chest decompressions comprises an instruction to perform chest decompressions using a suction cup device, an adhesive device, a hook and loop fastener device, and/or an instruction to perform compressions of the patient's sides or abdomen.

Clause 176: The method of any of clauses 169 to 175, further comprising: receiving and processing signals indicative of CPR applied to the patient during the initial period of the acute care event from at least one resuscitation sensor comprising at least one of a chest compression sensor and a ventilation sensor; calculating at least one resuscitation parameter based on the signals indicative of CPR from the at least one resuscitation sensor; determining whether the at least one resuscitation parameter meets the initial target resuscitation criterion; and causing the feedback device to provide an indication for the user of whether the at least one resuscitation parameter meets the initial target resuscitation criterion.

Clause 177: The method of clause 176, further comprising receiving and processing the signals indicative of the CPR applied to the patient during the subsequent period of the acute care event to calculate at least one resuscitation parameter; determining whether the at least one resuscitation parameter meets the modified target resuscitation criterion; and causing the feedback device to provide an indication for the user of whether the at least one resuscitation parameter meets the modified target resuscitation criterion.

Clause 178: The method of clause 177, further comprising: causing the feedback device to provide a summary report to a user, the summary report comprising an indication for the initial period comparing the resuscitation parameter measured during the initial period and the initial target resuscitation criterion and an indication for the subsequent period comparing the resuscitation parameter measured during the subsequent period and the modified target resuscitation criterion.

Clause 179: The method of clause 178, wherein the summary report comprises a graph comparing the resuscitation parameter measured during the initial period and the initial target resuscitation criterion and a graph for the subsequent period comparing the resuscitation parameter measured during the subsequent period and the modified target resuscitation criterion.

Clause 180: A system for providing ventilation treatment to a patient, the system comprising:

at least one three-dimensional imaging system for obtaining information representative of at least one physical feature of the patient; a ventilation device for providing the ventilation treatment to the patient; and at least one processor communicatively coupled with the at least one three-dimensional imaging system and with the ventilation device, the at least one processor configured to: receive and process the information representative of the at least one physical feature of the patient to generate a three-dimensional representation of the patient, determine at least one ventilation criterion for the ventilation device based on the generated three-dimensional representation, and cause the ventilation device to provide ventilations based on the at least one ventilation criterion.

Clause 181: The system of clause 180, wherein the at least one physical feature comprises at least one of: sternal anterior-posterior (AP) distance, lateral width of the thorax, thoracic circumference, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, height, weight, and body-mass index (BMI).

Clause 182: The system of clause 181, wherein the thoracic volume is calculated based on an anterior posterior distance of the patient's thoracic region, a length of the patient's thoracic region, and at least one of a width of the thoracic region and a circumference of the thoracic region.

Clause 183: The system of any of clauses 180 to 182, wherein the information representative of the at least one physical feature comprises information representative of the at least one physical feature recorded during inhalation and/or information representative of the at least one physical feature recorded during exhalation.

Clause 184: The system of any of clauses 180 to 183, wherein the ventilation parameter comprises at least one of tidal volume, minute volume, end-inspiratory pressure, maximum ventilation pressure, and ventilation rate during the acute care event.

Clause 185: The system of any of clauses 180 to 184, wherein the ventilation device comprises an automatic mechanical ventilator configured to deliver a plurality of ventilations to a patient according to at least one ventilation criterion.

Clause 186: The system of any of clauses 180 to 185, wherein the ventilation device comprises a ventilation unit and wherein the at least one processor causes the ventilation device to provide ventilations based on the at least one ventilation criterion by providing guidance to a user for delivering ventilations according to the at least one ventilation criterion.

Clause 187: The system of clause 186, wherein the ventilation unit comprises a ventilation bag and airflow path in fluid communication with an airway of the patient.

Clause 188: The system of any of clauses 180 to 187, wherein the processor is further configured to: after a predetermined period of time, receive and process updated information representative of the at least one physical feature of the patient from the three-dimensional imaging system to generate an updated three-dimensional representation of the patient; determine at least one modified ventilation criterion based on the updated three-dimensional representation of the patient; and adjust a function of the ventilation device based on the at least one modified ventilation parameter.

Clause 189: The system of clause 188, wherein the predetermined period of time is determined based on the initial generated three-dimensional representation of the patient.

Clause 190: The system of any of clauses 180 to 189, wherein the at least one processor is further configured to receive an age of the patient and to determine the at least one ventilation criterion based, at least in part, on the patient's age.

Clause 191: A system for assisting a user in providing medical care for a patient during an acute care event, the system comprising: at least one input device for providing information representative of a plurality of physical features of the patient measured during the acute care event; a user interface for providing acute care treatment information for the patient; and at least one processor communicatively coupled with the at least one input device for providing information representative of the plurality of physical features, the at least one processor configured to: receive and process the information representative of the plurality of physical features of the patient to estimate a weight of the patient, determine at least one treatment parameter for the patient based at least in part on the estimated weight of the patient, and cause the user interface to provide an indication of the at least one treatment parameter for the patient.

Clause 192: The system of clause 191, wherein the at least one input device for providing information representative of the plurality of physical features of the patient comprises at least one of a two-dimensional camera, a stereoscopic camera, a three-dimensional imaging system, a three-dimensional sensor, a light-field camera, and a position sensor or marker positioned on the patient.

Clause 193: The system of clause 191 or clause 192, wherein the at least one input device comprises the user interface, and wherein the user interface is configured for the user to manually input at least one measurement for each of the plurality of physical features.

Clause 194: The system of any of clauses 191-193, wherein the plurality of physical features comprises at least one of: sternal anterior-posterior (AP) distance, lateral width of a thorax of the patient, thoracic circumference, waist circumference, hip circumference, neck circumference, shoulder width, thoracic shape, height, waist-to-hip ratio, or waist-to-height ratio.

Clause 195: The system of any of clauses 191-194, wherein the at least one processor is configured to process the information representative of the plurality of physical features to estimate a volume of at least a portion of the patient's body.

Clause 196: The system of clause 195, wherein the at least one processor is configured to estimate the weight of the patient based on the estimated volume and an estimated average density of a body of the patient.

Clause 197: The system of clause 196, wherein the estimated average density of the body is from about 900 kg/m3 to about 1050 kg/m3.

Clause 198: The system of clause 196 or clause 197, wherein the estimated average density of the body comprises a predetermined value for a population of individuals.

Clause 199: The system of any of clauses 196-198, wherein the estimated average density of the body is a patient-specific value based on at least one of the plurality of physical features of the patient.

Clause 200: The system of any of clauses 195-199, wherein the estimated volume comprises either a thoracic volume of the patient or an overall volume of the patient.

Clause 201: The system of any of clauses 191-200, wherein the at least one treatment parameter comprises at least one of defibrillator shock energy; ventilation tidal volume; and drug delivery dosage.

Clause 202: The system of any of clauses 191-201, wherein the at least one treatment parameter comprises ventilation tidal volume, and wherein the ventilation tidal volume is calculated based, at least in part, on an ideal body weight of the patient.

Clause 203: The system of any of clauses 191-202, wherein the at least one input device for providing information representative of the plurality of physical features of the patient provides at least one of an age or gender of the patient, and wherein the at least one treatment parameter is determined based at least in part on the plurality of physical features and at least one of the age or gender of the patient.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limit of the disclosure.

DETAILED DESCRIPTION

Figure 1A:
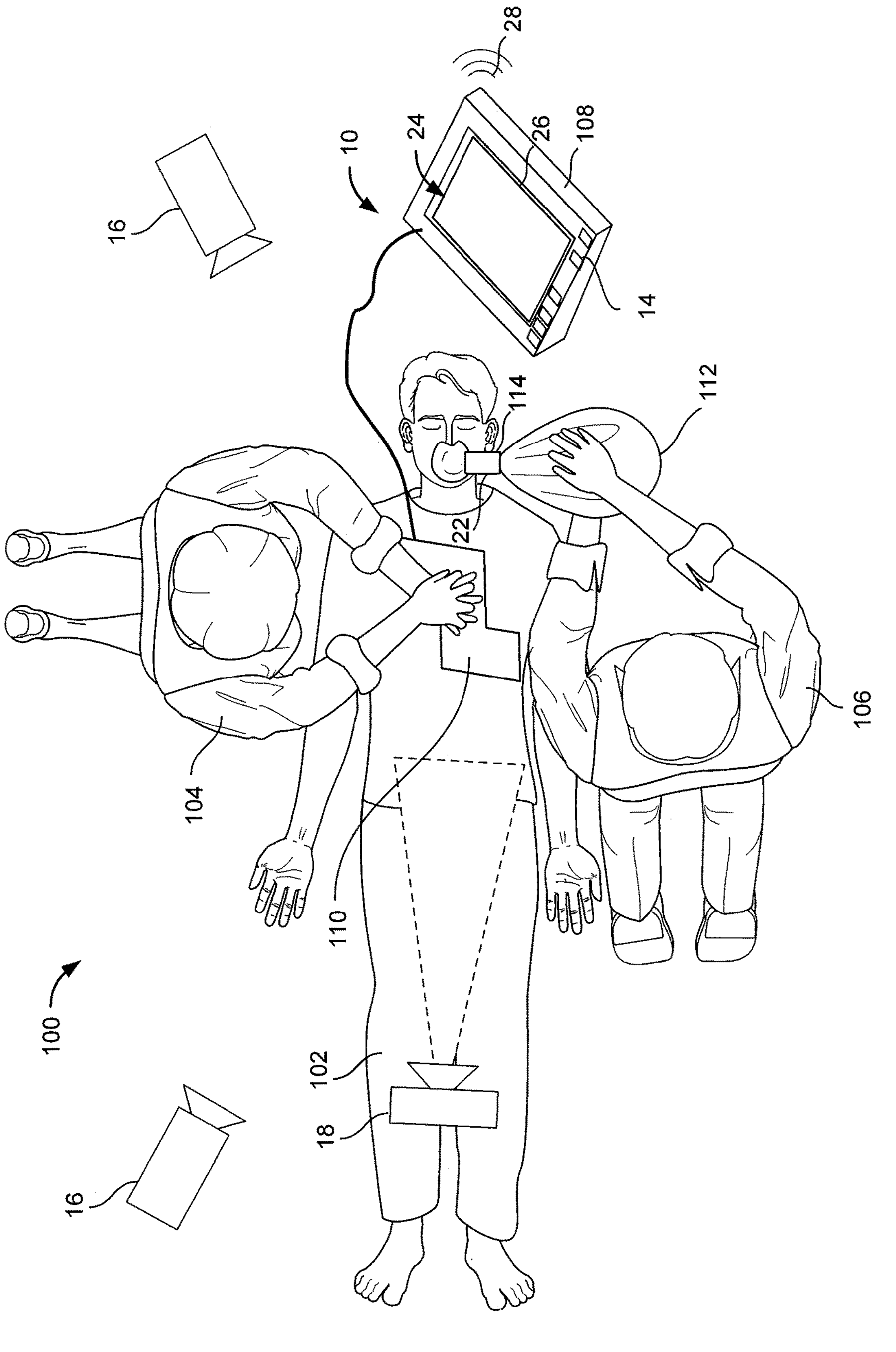
FIG. 1A shows an overhead view of an acute care scene including devices and systems for recording and/or measuring physical features of a patient at the acute care scene and for providing guidance for performing resuscitation activities for a user, such as an acute care provider, in accordance with various examples.

As used herein, the singular form of "a", "an", and "the" include plural referents unless the context clearly dictates otherwise.

As used herein, the terms "right", "left", "top", and derivatives thereof shall relate to aspects of the present disclosure as it is oriented in the drawing figures. However, it is to be understood that embodiments of the present disclosure can assume various alternative orientations and, accordingly, such terms are not to be considered as limiting. Also, it is to be understood that embodiments of the present disclosure can assume various alternative variations and stage sequences, except where expressly specified to the contrary. It is also to be understood that the specific devices and processes illustrated in the attached drawings, and described in the following specification, are provided as examples. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data, and does not actively transmit data to the second unit. As another example, a first unit can be in communication with a second unit if an intermediary unit processes data from one unit and transmits processed data to the second unit. It will be appreciated that numerous other arrangements are possible.

The present disclosure is generally directed to systems, methods, and techniques for providing guidance to care providers or medical professionals, such as acute care providers, for use in an acute care or emergency medical context. "Acute care" can refer to: situations in which a patient receives active, but short-term, treatment for an injury, episode of illness; an urgent or emergency medical condition; or a recovery period following a planned surgical procedure. An "acute care provider" can refer to any individual, including emergency medical technicians (EMTs), doctors, nurses, and caregivers, who provide short-term care for the patient during such "acute care" episodes, conditions, or events.

The devices and systems described herein can be used in a variety of environments including, for example, emergency scenes, ambulances, hospitals, emergency rooms, and out-patient treatment facilities. The individual being treated by the medical professional(s) could be an emergency victim at a rescue scene, such as an individual suffering from a physical event or arrest (e.g., a cardiac arrest, respiratory arrest/distress, and/or traumatic arrest). In other examples, the individual could be a hospital patient, such as a patient receiving treatment at an emergency room. In other examples, the individual could be a hospital resident (e.g., an in-patient resident who has been admitted to a hospital) who receives treatment on a more regular basis. For convenience, any medical professional is described herein as an "acute care provider" and the individual being treated is described herein as a "patient," though it is understood that the "patient" could be an emergency victim, an individual who has suffered trauma but not yet been treated by medical personnel, or any other individual in need of medical treatment or evaluation by medical personnel. The "acute care provider" can refer to individuals that provide treatment for any patient seeking emergency medical assistance, some examples of which are provided herein.

Body habitus varies widely across the human population. Accordingly, during an acute care effort in which cardiopulmonary resuscitation (CPR) is provided, the preferred manner in which quality CPR is applied may also vary depending on the body habitus of the person receiving the treatment. Systems and methods described herein relate to the measurement of physical features of a patient to determine suggested target CPR criteria for treating the patient. For example, a "physical feature" can refer to an aspect of the patient that can be determined by visual inspection or analysis of captured images of the patient rather than by direct measurement of the patient. Such target CPR criteria may be, for example, target chest compression criteria and/or target ventilation criteria. In embodiments described herein, one or more physical features or a plurality of physical features of a patient may be used as inputs into one or more processors for determining the manner in which chest compression and/or ventilation feedback is provided for a caregiver giving CPR. Hence, depending on various physical features (e.g., size, shape, dimensions, height) of the patient, and how such physical features evolve over time (e.g., during CPR), the criteria for CPR feedback may be effectively tailored. Weight may be a physical feature that can be, for example, manually entered by a user.

Patient characteristics, which may include physical aspects that are otherwise indeterminable by visual inspection, can also be used to determine CPR criteria. For example, patient weight can be a physical characteristic used for determining certain CPR criteria. In some examples, as described herein, patient weight can be estimated from patient physical features including, for example, height, waist circumference, thoracic circumference, and other physical features (e.g., which may be determined by visual inspection such as by a three-dimensional scanning technology or other such measurement(s)). That is, it may be possible to estimate patient weight using methods where patient volume is measured or otherwise determined, with the appropriate multiplication factor(s) for density (e.g., volume of fat multiplied by approximate density of fat, volume of muscle multiplied by approximate density of muscle, volume of bone multiplied by approximate density of bone, etc.). In some examples, non-physical patient characteristics, such as age and/or gender, may also be used in addition to physical features to determine target CPR criteria. For example, the manner in which CPR should be applied to a patient (e.g., according to target CPR criteria) may vary if the patient is pediatric or adult, or if the patient is male or female. Or, physical features may effectively be used as a surrogate to infer non-physical features which are then used to determine target CPR criteria.

As an illustrative embodiment, for a relatively large adult patient, the suggested target depth (or rate, or release velocity, amongst others) at which chest compressions are to be applied may be greater than, for example, that of a small child or infant. Such a target depth may lead to effective transport of blood from the heart to the peripheral tissues of the body, while also balancing the risk of traumatic injury to the thorax of the patient. Similarly, larger (or taller) adult patients are expected to have larger lung capacity than, for example, smaller (or shorter) child patients. The suggested target tidal volume for ventilating the patient may vary according to an estimated lung capacity of the patient. The suggested technique with which chest compressions are applied may also depend on one or more physical features of the patient and, at times, the manner in which the physical feature(s) change during the course of the resuscitation event.

Physical features and/or non-physical characteristics of a patient may be manually entered into a CPR feedback system (e.g., patient monitor, defibrillator, CPR device, or other acute care apparatus). Also, or alternatively, one or more sensors or other devices (e.g., three-dimensional sensor or scanning device for generating a three-dimensional representation of various portions of the body of the patient) may be used to automatically measure certain physical dimensions (e.g., anterior-posterior chest distance, side to side chest distance, chest circumference, aspect ratio of the chest/thorax, patient height, facial features, etc.). Such physical measurements may be used as inputs for determining suggested CPR criteria, as discussed herein in further detail.

While several examples described herein relate to providing treatment to people suffering from cardiac arrest, it should be understood that embodiments of the present disclosure relate to acute care provided to those suffering from ailments other than cardiac arrest, such as respiratory distress or other conditions. In various embodiments, depending on the medical issue, chest compressions, ventilations, drug delivery, or other forms of acute care treatment, alone or in combination, may be indicated for a patient.

Systems for Guiding Acute Care Providers in Performing Resuscitation

Figure 1B:
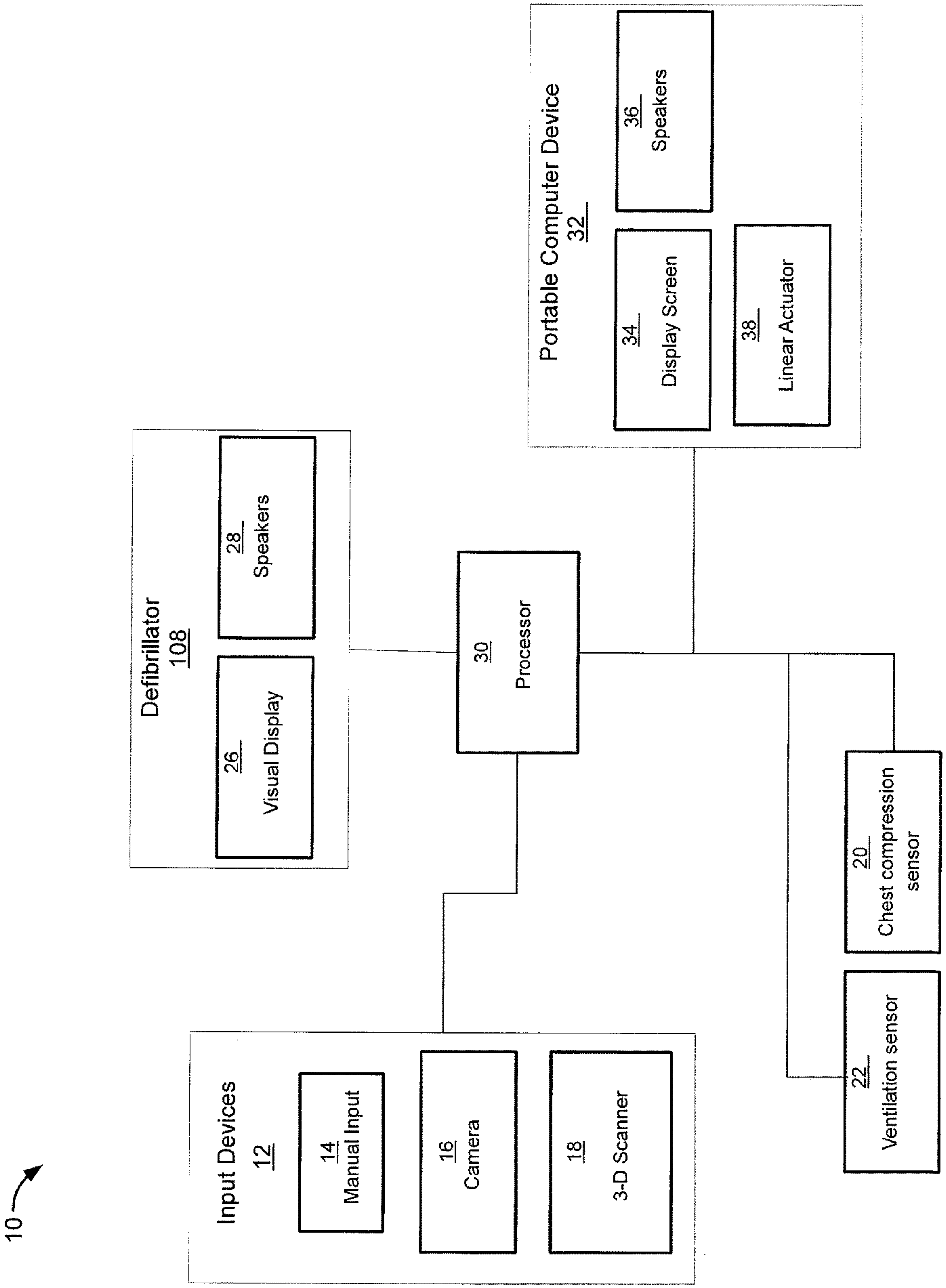
FIG. 1B shows a schematic drawing of electrical components of the system of FIG. 1A according to an example of the disclosure.
Figure 2A:
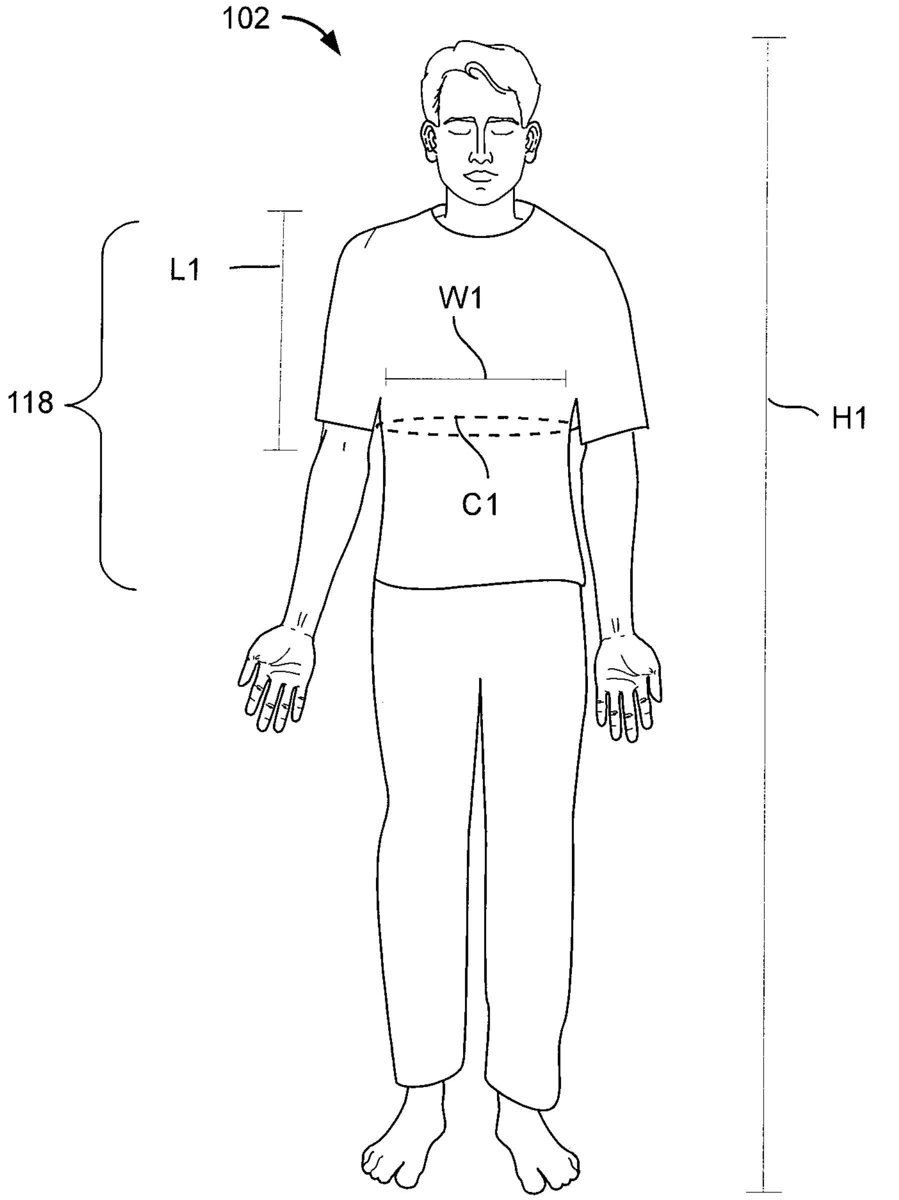
FIG. 2A shows a drawing of an adult patient illustrating physical features of the patient that can be measured in accordance with systems of the present disclosure.
Figure 2B:
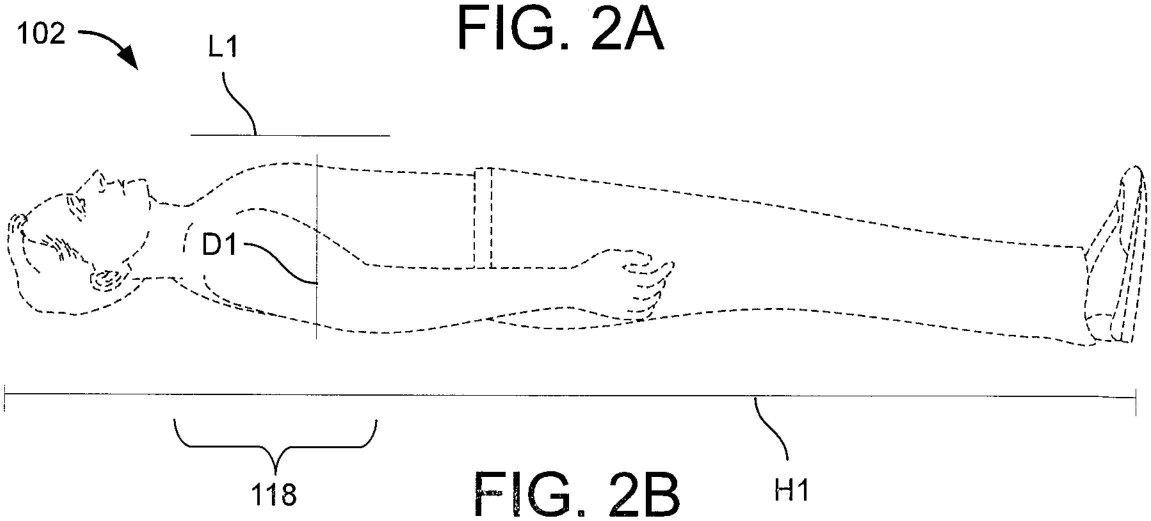
FIG. 2B is a drawing of another view of the adult patient of FIG. 2A.
Figure 3A:
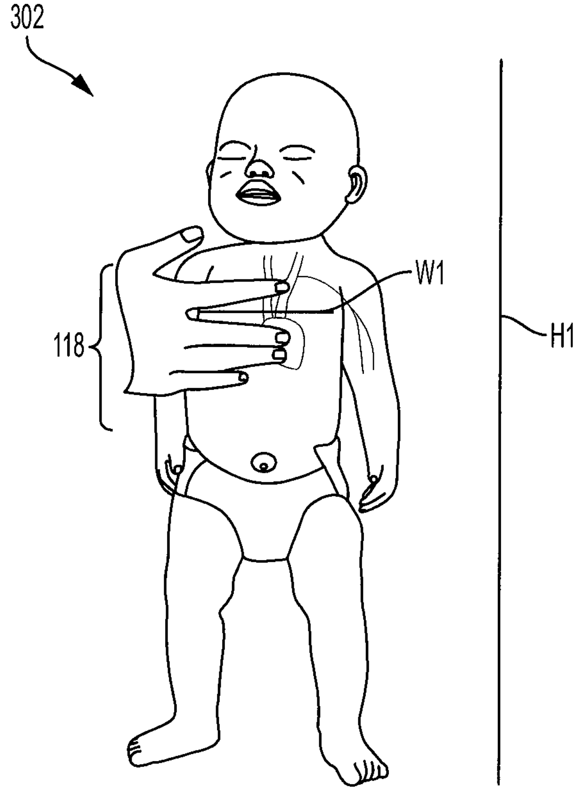
FIG. 3A shows a drawing of an infant patient illustrating physical features of the patient that can be measured in accordance with systems of the present disclosure.
Figure 3B:
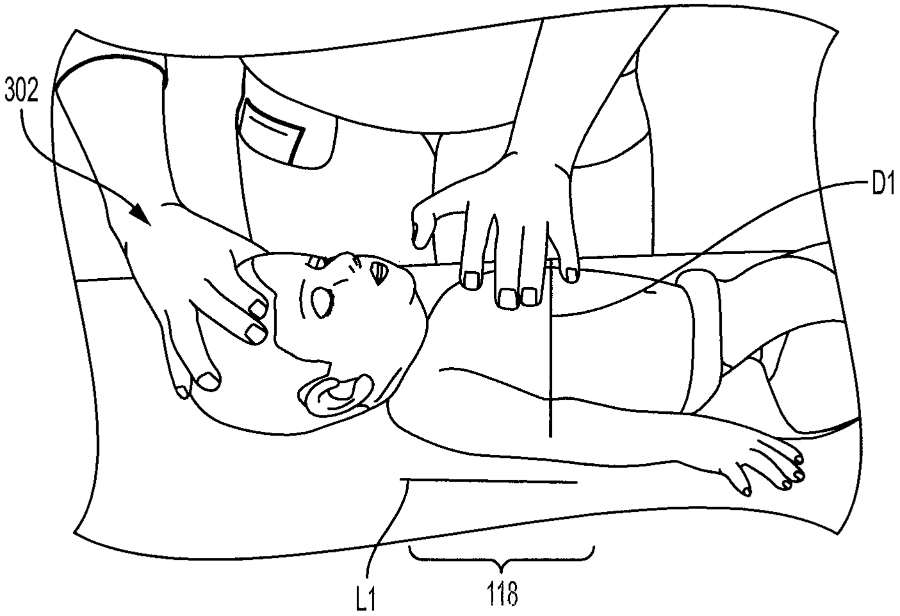
FIG. 3B is another view of the infant patient of FIG. 3A.

A system 10 for guiding and providing feedback for an acute care provider performing resuscitation activities for a patient including, but not limited to, chest compressions and ventilations, is illustrated in FIGS. 1A and 1B. The system 10 can be adapted for use at an emergency scene to record information about the patient including measuring physical features of the patient, process the patient information to determine criteria for performing the resuscitation activities for the patient, and provide feedback and guidance for the acute care provider(s) encouraging the acute care providers to perform the resuscitation activities in accordance with the determined criteria.

FIG. 1A shows exemplary rescue scene 100 with acute care providers 104, 106 present at the scene 100 performing resuscitation activities on an adult patient 102 including elements of the system 10 for providing resuscitation guidance and feedback. Acute care provider 104 is providing chest compressions to the torso of the patient 102. Acute care provider 106 is providing ventilation to the patient using a manual ventilation unit comprising a ventilation bag 112. Although two acute care providers 104, 106 are shown here for purposes of explanation, there may be only one acute care provider at an acute care scene or an acute care team could include three or more acute care providers to help care for the patient 102. Additional acute care providers can perform tasks, such as setting up medical devices or monitoring the physiological condition of the patient (e.g., checking patient vital signs). For example, one of the acute care providers can be responsible for setting up a medical device, such as a patient monitor or defibrillator 108, while the one or more other acute care providers perform other resuscitation activities for the patient 102. For example, the acute care provider setting up the monitor and/or defibrillator 108 can be responsible for attaching electrodes, which can be contained in an electrode package 110, to the patient 102. The defibrillator 108 may be a conventional automated external defibrillator (AED) or may be a professional-style defibrillator, such as the X SERIES, R SERIES, M SERIES, or E SERIES provided by ZOLL Medical Corporation of Chelmsford, Mass., or an automated external defibrillator (AED), including the AED PLUS, or AED PRO from ZOLL Medical Corporation.

In FIG. 1A, the electrode package 110 is shown on the patient 102 in a normal position. The electrode package 110, in this example, is an assembly that combines a therapeutic and/or ECG sensing electrode positioned high on the right side of the patient's torso, a separate therapeutic and/or ECG sensing electrode positioned low on the left side of the patient's torso, and a sensor package located over the patient's sternum. The electrode package 110, which, in this example, is obscured in the figure by the hands of acute care provider 104 may further comprise a motion sensor, such as an accelerometer, laser interferometer, magnetic induction velocity sensor, or proximity sensor, such as a light or capacitance sensor, which can be configured to transmit data to a portable computer device or to the defibrillator 108 to monitor performance of the chest compressions.

In other examples, movement information related to performance of chest compressions can be collected by a separate device resting on the patient's sternum. The device, which may be generally referred to as a "CPR Puck", often comprises a plastic housing including electronic circuitry and, in particular, the motion and/or proximity sensors.

In some examples, once electrodes (e.g., the electrode package 110) are connected to the patient, the defibrillator 108 can monitor the status of the patient to identify patient physiological events and to determine whether a shockable rhythm is present and, if a shockable rhythm is present, provide treatment to the patient. A non-exhaustive list of cardiac patient events that can be detected by an external medical device, such as the defibrillator 108, (e.g., via ECG electrodes and an appropriate analysis algorithm) includes, for example: bradycardia, ventricular tachycardia (VT) or ventricular fibrillation (VF), atrial arrhythmias, such as premature atrial contractions (PACs), multifocal atrial tachycardia, atrial flutter, and atrial fibrillation, supraventricular tachycardia (SVT), junctional arrhythmias, tachycardia, junctional rhythm, junctional tachycardia, premature junctional contraction, and ventricle arrhythmias, such as premature ventricular contractions (PVCs) and accelerated idioventricular rhythm.

In some examples, ventilation to the patient is provided by the ventilation bag 112 connected to the patient through an airflow pathway 114 or by a mechanical ventilator (not shown in the figures). The pathway can comprise a ventilation sensor 22, such as a flow sensor, for measuring airflow to the patient and/or exhalation information. Information collected by the ventilation sensor 22 can be used to determine ventilation parameters including, for example, tidal volume, minute volume, ventilation rate, airway pressure, flow rate in the patient's airway, inspiratory flow rate, and/or expiratory flow rate. The information about ventilation activities performed by the acute care provider can be used to provide feedback to the acute care provider and, in some cases, to confirm that ventilation activities are appropriately synchronized and/or optimized with other resuscitation activities being performed by other acute care providers. In some examples, an electromechanical ventilator can be used to provide ventilation to the patient 102. In other examples, ventilations can be performed or initiated by mechanical ventilation devices, such as belts wrapped around the patient's abdomen or a cuirass. In other embodiments, ventilation can be performed using the RESQCPR™ system, the ResQGARD®, or the ResQPOD®, impedance threshold device (ITD), which are manufactured by ZOLL Medical Corporation.

The system 10 is configured to assist the acute care providers 104, 106 in performing resuscitation activities for the patient 102, such as chest compressions, ventilations, and/or other CPR activities such as drug delivery. The system 10 comprises at least one information input device 12, such as a manual data entry accessory (e.g., a keyboard, touch screen display, mouse, buttons, or other computer accessories). In FIG. 1A, buttons or touchscreen elements of the defibrillator 108 or mobile device can be used as the manual data entry accessory 14 for manually entering information and measurements for the system 10. The input device 12 further comprises a camera 16 and a three-dimensional imaging system 18 or sensor, for providing information representative of at least one physical feature of the patient 102 measured during the acute care event. The system 10 also comprises at least one resuscitation sensor, such as a chest compression sensor 20 or the ventilation sensor 22, configured to obtain signals indicative of a resuscitation activity (e.g., chest compressions or ventilations) performed for the patient during the acute care event. The chest compression sensor 20 can be, for example, an accelerometer-based sensor positioned on the patient's chest. In some examples, the chest compression sensor 20 is enclosed in the electrode package 110 (shown in FIG. 1A). The ventilation sensor 22 can be a pressure sensor or airflow sensor positioned in the patient's airway path 114. The system 10 further comprises a feedback device 24, a function which can be performed, for example, by the defibrillator 108 as shown in FIG. 1A. For example, a visual display 26 and speaker 28 of the defibrillator 108 can be used to provide resuscitation guidance and feedback to the acute care provider(s). The visual display 26 and speakers 28 may also be components of other therapeutic devices or patient monitoring devices, at the rescue scene 100, such as ventilators or cardiac monitors.

The system 10 further comprises at least one processor 30 (shown in FIG. 1B), such as a computer controller, microprocessor, or virtual processor of a computer device, communicatively coupled with the at least one input device 12 and the resuscitation sensor(s) 20, 22. In some examples, the at least one processor 30 is also a component of a medical device, such as the defibrillator 108 (shown in FIG. 1A). In other examples, the at least one processor 30 can be a component of a portable computing device 32, such as a computer tablet, smart phone, cell phone, or laptop computer, present at the rescue scene 100. In other examples, the at least one processor 30 can be a component of a computer terminal or server remote from the rescue scene 10 and in wired or wireless communication with sensors 20, 22, portable computer devices 32, and medical devices (e.g., defibrillator 108), at the rescue scene 100.

As described in further detail in connection with FIGS. 10-12 and 14 which provide flow charts of computer processes performed by the at least one processor 30, the at least one processor 30 is configured to: receive and process information representative of the at least one physical feature of the patient 102 from the input device(s) 12, such as the manual data entry accessory 14, camera 16, and/or three-dimensional imaging system 18 or sensor, to determine target resuscitation criteria for the patient 102; receive and process signals indicative of resuscitation activities performed for the patient 102 by acute care providers 104, 106 from the resuscitation sensors (e.g., chest compression sensor 20 and ventilation sensor 22) to calculate resuscitation parameters for the resuscitation activities being performed; determine whether the resuscitation parameter(s) meets the target resuscitation criteria; and cause the feedback device 24 to provide an indication for the acute care providers 104, 106 of whether the resuscitation parameter(s) meets the target resuscitation criteria.

While not intending to be bound by theory, it is believed that different-sized patients and, in particular, patients having different shaped cardiothoracic regions may benefit from resuscitation activities performed according to different criteria, protocols, or techniques. Therefore, it is believed that adjusting resuscitation criteria based on a patient's physical feature(s) increases effectiveness of resuscitation leading to improved patient outcomes, such as survival and physical condition.

Patient Physical Features

A physical feature of the patient 102 can refer to a quantifiable measurement of the patient, such as a length, width, or height of an external anatomical structure of the patient (e.g., patient's height, length of the patient's arm or leg, lateral width of the patient's thorax, circumference of the patient's thorax or waist, a sternal anterior-posterior (AP) distance of the patient's thorax, overall patient volume, thoracic volume, waist circumference, neck size, shoulder width, skull volume, pupillary distance, eye-nose spacing, finger length, finger width, hand width, hand length, toe length, toe width, foot width, foot length, thoracic shape, body-mass index (BMI), etc.), or to a distance between anatomical structures of the patient (e.g., a distance between the shoulder blades). Physical features described herein may include anthropometric features, which may refer to relationships between measurements of different physical features of a person (e.g., ratio between sternal AP distance and lateral width, ratio between sternal AP distance and thoracic circumference, thoracic shape, thoracic volume, etc.). Weight is a physical characteristic of the patient 102. As described herein, weight can be estimated based on physical characteristic measurements in combination with further data, such as density (described further below). However, weight would be more difficult to determine from information recorded by cameras or three-dimensional sensors at the rescue scene and without relying on estimated density data. If certain physical characteristics, such as weight, cannot immediately be determined by analysis of recorded information, such physical characteristics could be entered manually by the input device 12. In some examples, physical features of the patient 102 comprise overall patient measures, such as height, other physical dimensions, etc. In other examples, the physical feature(s) can comprise an overall measurement (e.g., height, AP distance) in combination with one or more measurements for specific body regions. Patient age or gender, or other non-physical characteristics can also be a relevant factors for determining resuscitation criteria for a patient.

Other non-physical characteristics such as age and gender may be estimated based on analysis of images or three-dimensional scans of the patient, for example, by using certain physical features (e.g., pupillary distance, eye-nose spacing for age) or approximate density (for weight) for such estimation(s). In some embodiments, non-physical patient characteristic information, such as age and gender, may be entered manually by the acute care provider 104, 106 as further input to the plurality of physical features in determining target CPR criteria (e.g., chest compression depth/rate, ventilation tidal volume, ET Tube depth, drug dosage, amongst others).

In some examples, patient height, weight, and gender can be used to calculate an ideal body weight of a patient 102 and/or a body-mass index (BMI) of the patient 102 using equations derived for such calculations. Ideal body weight (IBW) may be correlated with lung volume and, as such, may provide a suitable parameter for estimating certain suggested or target ventilation criteria. As described in following Equation 1, BMI is based on weight and height. As shown in following Equation 2, IBW is based on height and gender. As such, useful information about target ventilation parameters for different sized patients may be determined when height, weight, and, in certain cases, gender of the patient are known. It should be understood that physical features other than height and weight may be used as input to determine target ventilation (or other resuscitation) criteria. For example, thoracic volume, thoracic circumference, AP distance, amongst others, may be indicators of patient girth and, hence, volume of the lungs of the patient. Accordingly, multiple physical features may be used to determine target ventilation parameters/criteria.

$$\text{Body-Mass Index (BMI)}=\text{weight (kg)}/\text{height}^2\ (\text{m}^2). \qquad \text{Equation 1:}$$

Ideal body weight (IBW)

$$\text{IBW Men}=50\text{ kg}+2.3*[\text{height (in)}-60]$$

$$\text{IBW Women}=45.5\text{ kg}+2.3*[\text{height (in)}-60] \qquad \text{Equation 2:}$$

Drawings of different types of patients 102, 302 that can be treated with the system 10 and including physical features which can be recorded, detected, or measured by the system 10 are illustrated in FIGS. 2A-3B. In some examples, the patient 102 is an adult patient (shown in FIGS. 2A and 2B). In other examples, the patient is a pediatric patient 302 (shown in FIGS. 3A and 3B). In some examples, the physical features are overall physical measurements of a patient, such as height (shown by H1 in FIGS. 2A and 3A).

In other examples, the physical feature is a feature of the patient's cardiothoracic region 118. For example, the physical feature(s) can include an anterior posterior (AP) distance D1 of the patient's cardiothoracic region 118, which is a maximum distance between an anterior portion of the patient's chest and a posterior portion of the patient's back; a width W1 of the patient's cardiothoracic region 118; a length L1 of the patient's cardiothoracic region 118 (e.g., a length from a bottom of the patient's neck to a base of the rib cage); and a circumference C1 of the patient's cardiothoracic region 118. As described herein, such measurements can be obtained manually (e.g., a user could determine measurements using a tape measurer or calipers). In other examples, measurements for physical features are determined by analyzing images of the rescue scene and patient obtained by the cameras and/or three-dimensional imaging system. For example, as described herein, images captured by stereoscopic and light-field cameras can be analyzed to determine distance information between objects in captured images. In a similar manner, measurements of physical features can be determined from generated three-dimensional representations of the rescue scene. For example, the three-dimensional representation can comprise location information for objects in the scene and, in particular, location information for various anatomical structures of the patient. Since location information is known, distances between anatomical structures can be determined by mathematic analysis. Information gathered from three-dimensional imaging systems (e.g., sensors, cameras, scanning apparatus) may be used to generate the three-dimensional representation of the patient, and physical measurements can be obtained therefrom.

As will be appreciated by those skilled in the art, patient size may vary greatly based, for example, on factors other than age or gender. Generally speaking, AP distance D1 may vary between about 2 inches to about 6 inches for neonates and infants, and about 8 inches to about 18 inches for large adults. The cardiothoracic width W1 may vary between about 2 inches to 10 inches for small patients (e.g., neonates and children) and about 16 inches to about 24 inches for large adults. The circumference of a patient's cardiothoracic region may vary between about 4 inches to 20 inches for the smallest patients (e.g., neonates and children) and about 40 inches to about 60 inches for large adults. While general ranges are discussed above for these parameters, it should be understood that there may be appreciable variation from person to person in AP distance, cardiothoracic width, circumference, and other dimensional attributes.

In other examples, the physical feature(s) can be a thoracic volume or maximum cross sectional area of the patient's cardiothoracic region, as such physical features may be used as an approximation for lung volume. While ideal body weight (IBW) represented by height and gender may be used as relevant input parameters for determining suggested ventilation criteria (e.g., tidal volume), in some cases (as alluded to above), thoracic volume, cross section area, thoracic circumference, AP distance, or other measurement(s) may also be used as relevant input for ventilation criteria, such as tidal volume. Cardiothoracic volume can be estimated based on AP distance and cardiothoracic length and width. Circumference may also be used to estimate thoracic volume. A maximum cross-sectional area of the thoracic region can be calculated based on circumference.

Resuscitation Criteria for Different-Sized Patients

When giving chest compressions, in general, the suggested chest compression depth for adults is typically about 2.0 inches, and an appropriate range for chest compression depth is between about 2.0 inches and 2.4 inches. Target chest compression rate during chest compressions can be between about 100 compressions per minute (cpm) and 120 cpm, and preferably about 105 cpm for an adult patient. For a pediatric patient, a target compression rate may be from 100 cpm to 120 cpm. However, in accordance with embodiments presented herein, target chest compression depth and rate may differ (e.g., for infants and young pediatrics, target chest compression depth may be lower and target chest compression rate may be higher).

Current guidelines (e.g., American Heart Association guidelines) for resuscitation activities generally do not take into account physical features of the patient in determining resuscitation criteria. Instead, current guidelines typically determine resuscitation criteria based on patient age, such as, for example, pediatric patients (8 years and younger) and adult patients (older than 8 years old). For example, guidelines for chest compressions reveal that target compression depth for an adult patient should be from 2.0 inches to 2.4 inches and target compression rate for the adult patient should be from 100 to 120 compressions per minute; and compression depth for a child (between 1 year and 8 years old) is one third of the anterior-posterior (AP) distance of the child's cardiothoracic region.

For ventilations, target parameters can include ventilation rate and volume. Target ventilation rate may be about 10 ventilation breaths per minute (e.g., approximately 30 compressions for every 2 ventilation breaths) for adults and about 20 ventilation breaths per minute (e.g., approximately 15 compressions for every 2 ventilation breaths) for children and infants. Target parameters can also relate to synchronization or sequences of chest compressions and ventilations. For example, acute care providers may be instructed to provide a number of compressions (e.g., about 15 compressions or about 30 compressions) and then to pause compressions while delivering a specified number of ventilations (e.g., 2 ventilations).

As will be appreciated by those of skill in the art, there is a wide variety of size and shape of both pediatric and adult patients. In some instances, especially large children may be a similar height and weight as a small adult. The recommended target criteria provided by current guidelines do not take into account such differences in patient size. The system 10 is configured to take into account such differences in patient size and shape in determining resuscitation criteria. Further, the system 10 can be configured to update or adjust resuscitation criteria and provide instructions for improving CPR technique during the rescue effort.

For chest compressions, the criteria and parameters can be at least one of compression depth, compression rate, compression release velocity, compression pause, or compression release. In some examples and depending on patient physical features (e.g., height, AP distance, etc.), a suggested target compression depth may be from 0.2 inch to 3.5 inches for an entire population, or from 0.5 inch to 3.0 inches for a smaller subset, or, for an adult patient, from 2.0 inches to 2.4 inches, which is in accordance with current AHA guidelines. In some instances, a range of suggested target compression depths may shift depending on physical features of the patient. For example, for relatively large adults (e.g., AP distance between 12-18 inches, circumference between 50-60 inches), the suggested target chest compression depth may shift from 2.0-2.4 inches to 3.0-3.5 inches, 2.8-3.2 inches, 2.5-3.0 inches, or other suitable ranges of compressions. For relatively small children (e.g., AP distance between 2-10 inches, circumference 10-20 inches), the suggested target chest compression depth may shift in the other direction to 1.0-1.5 inches, 0.5-1.0 inches, 0.2-0.5 inches, etc.

The target compression rate may also vary depending on measured physical features of patients. For example, a suggested target compression rate may vary between 100-160 compressions per minute (cpm) for pediatric patients, which may be indicated by relatively small physical features, examples of which are noted herein. The suggested target compression rate for older patients may be between 100-120 cpm, which may be indicated by comparatively larger physical features. Generally speaking, because the natural heart rate of younger patients is greater than that of older patients, the target compression rate for younger patients may be greater than the target compression rate for older patients. However, it can be appreciated that the target compression rate may differ for different types of patients.

Similarly, the target CCRV (chest compression release velocity) may vary based on measured physical features of patients. For instance, the suggested target CCRV may be between 100-650 inches/minute, where meeting the appropriate CCRV may suitably allow for the natural recoil of the chest for improving venous return of blood to the heart. For example, CCRV may be 150-300 inches/minute for a small child and 250-600 inches/minute (e.g., 250-400 inches/minute, 350-500 inches/minute, or 400-600 inches/minute) for an adult. Accordingly, the target CCRV will vary depending on physical attributes of the patient.

In a simplified example, a physical feature of the patient 102, 302 for determining one or more initial target recommendations for various CPR criteria can be AP distance of the thorax. For instance, target compression depth for a patient having a smaller AP distance may generally be less than target compression depth for a patient having a larger AP distance. However, as discussed further below, a single physical measurement might not be definitive as to what the target CPR criteria should be and may only provide an initial set of CPR criteria, with the need for further refinement. Accordingly, the AP distance of a patient offers a quick, easy-to-measure indication of whether the size/thickness of the patient is large or small, and can be used to set an initial range of recommended target compression depths. Though, measurements of other physical features of the patient can be used in combination with an initial measurement to narrow the ranges of recommended depths once such measurements are available. As described further herein, while the measurement of a single physical feature may be useful to provide an initial indication for suggesting a target compression depth (or other CPR criteria), input of measurements for multiple physical features may allow for greater refinement in the range(s) of target CPR criteria to be output as feedback for the caregiver.

For example, AP distance of the patient can provide an initial recommendation for a target range of compression depth and/or compression rate, or other CPR parameters. In an exemplary implementation, which is for illustrative purposes and not so limiting, the system 10 can be configured to provide the following initial recommendations for target chest compression depth based on AP distance of a patient. For a patient (e.g., an infant or neonate) having an AP distance of less than 3 inches, an initial recommendation for target chest compression depth can be from 0.2 inch to 0.75 inch. For a patient (e.g., a small child) having an AP distance of 4 to 5 inches, an initial recommendation for target chest compression depth can be from 0.75 inch to 1.25 inch. For a patient (e.g., a large child or small adult female) having an AP distance of 6-8 inches, the initial recommendation for target chest compression depth can be from 1.25 inches to 1.75 inches. For a patient (e.g., an average female or large male) having an AP distance of 9-11 inches, the initial recommendation for target chest compression depth can be 1.75 inches to 2.25 inches. For a patient (e.g., a large female or average male) having an AP distance of 12-14 inches, the initial recommendation for target chest compression depth can be from 2.25 inches to 2.75 inches. For a patient (e.g., a large male) having an AP distance of 15 inches or more, the initial recommendation for target chest compression depth can be from 2.75 inches to 3.5 inches. The initial recommendation for target range of CPR parameter(s) may be further refined or confirmed as other information (physical or non-physical) is provided.

The AP distance of the patient can also provide a basis for an initial recommended target range of compression parameters for compression rate and release velocity, which may be further refined or confirmed with more information (physical or non-physical). For example, in an exemplary implementation, for a patient (e.g., an infant or neonate) having an AP distance of less than 3 inches, an initial recommendation for target chest compression rate can be from 150 cpm to 160 cpm and an initial recommendation for target chest compression release velocity can be from 200-300 inches/minute. For a patient (e.g., a small child) having an AP distance of 4 to 5 inches, an initial recommendation for target chest compression rate can be from 140 cpm to 150 cpm and an initial target chest compression release velocity can be from 150-250 inches/minute. For a patient (e.g., a large child or small adult female) having an AP distance of 6-8 inches, an initial recommendation for target chest compression rate can be from 120 cpm to 140 cpm and an initial target chest compression release velocity can be from 250-400 inches/minute. For a patient (e.g., an average female or large male) having an AP distance of 9-11 inches, an initial recommendation for target chest compression rate can be from 110 cpm to 130 cpm and an initial target chest compression release velocity can be from 250-400 inches/minute. For a patient (e.g., a large female or average male) having an AP distance of 12-14 inches, an initial recommendation for target chest compression rate can be from 100 cpm to 120 cpm and an initial target chest compression release velocity can be from 250-600 inches/minute. For a patient (e.g., a large male) having an AP distance of 15 inches or more, an initial recommendation for target chest compression rate can be from 100 cpm to 120 cpm and an initial target chest compression release velocity can be from 250-600 inches/minute.

As noted herein, other physical features, such as measures of the circumference of the thorax, height, lateral width of the patient may also be used either alone or in combination with AP distance to confirm or otherwise determine a recommended target range for compression depth. For example, other measured physical features or non-physical characteristics (e.g., age, gender) of the patient may be useful as a confirmation of the patient type, where a single physical measurement is not enough. As discussed further below, the type of patient may vary widely for a given AP distance (or other physical feature), hence, it may be advantageous to provide multiple measurements of physical features or non-physical characteristics as inputs to a feedback system which then results in an output of appropriate CPR criteria.

In some examples, a target chest compression depth can be based on AP distance in combination with one or more of the following physical features: lateral width of the thorax, thoracic circumference, overall patient volume, thoracic volume, waist circumference, neck circumference, shoulder width, skull volume, pupillary distance, eye-nose spacing, finger length, finger width, hand width, hand length, toe length, toe width, foot width, foot length, thoracic shape, and height.

In other examples, the target chest compression depth can be based on AP distance in combination with one or more physical features for the patient's thorax. Physical features for the patient's thorax can include one or more of: lateral width of the thorax, thoracic circumference, thoracic volume, and thoracic shape.

In other examples, the target chest compression depth can be based on AP distance in combination with a length, volume, and/or weight of a body region of the patient. The body region of the patient can be any convenient body region which can be easily identified and measured using the manual or automatic measurement techniques disclosed herein. For example, the body region can be a hand, an arm, a foot, a leg, a face, or a skull of the patient.

In other examples, the target chest compression depth can be based on AP distance in combination with a physical feature or physical characteristic representative or indicative of a total size of the patient. For example, the physical feature or physical characteristic representative of total patient size can be one or more of patient height, patient weight, patient wingspan, body volume, waist-to-height ratio, or body-mass index (BMI).

Patient weight can also be used to provide a general indication to distinguish between smaller and larger patients. However, as noted, multiple physical measurements may be used as input to determine target CPR criteria to give feedback to acute care providers. For example, patient weight may be used as a physical characteristic to provide an initial target chest compression depth. In an exemplary implementation, for a patient (e.g., an infant or neonate) weighing less than 20 lbs., an initial target chest compression depth can be from 0.2 inch to 0.75 inch. For a patient (e.g., a small child) weighing 20 lbs. to 50 lbs., an initial target chest compression depth can be from 0.75 inch to 1.25 inches. For a patient (e.g., a large child or small female adult) weighing 50 lbs. to 100 lbs., an initial target chest compression depth can be from 1.25 inches to 1.75 inches. For a patient (e.g., an average adult female or small adult male) weighing 100 lbs. to 150 lbs., an initial target chest compression depth can be from 1.75 inch to 2.25 inches. For a patient (e.g., a large adult female or average adult male) weighing 150 lbs. to 50 lbs., an initial target chest compression depth can be from 0.75 inch to 1.25 inches. For patient (e.g., a large male) weighing 200 lbs. or more, an initial target chest compression depth can be from 2.75 inch to 3.5 inches.

When the resuscitation activity is providing ventilations, ventilation criteria and ventilation parameters can be at least one of tidal volume, minute volume, end-inspiratory pressure, maximum ventilation pressure, or ventilation rate during the acute care event. Target ventilation criteria for patients may be based in part on patient age. For example, ventilation parameters such as tidal volume or ventilation rate can be determined based on whether the patient is a pediatric patient (neonate, small child, or adolescent) or adult. In accordance with the present disclosure, target ventilation criteria can also be based on one or more physical features of the patient, such as patient's height. An exemplary table illustrating correspondence between patient height and tidal volume for an adult male patient is shown in Table 1. The values for the table can be determined experimentally by considering, for example, patient outcome data from previous rescue efforts. In other examples, values in the table can be determined from anatomical modeling of the lungs and respiratory system. In some embodiments, ventilation rate for adults is generally approximately 8-12 breaths per minute regardless of patient height/weight but, in various instances, the target ventilation rate may fall outside of this range.

TABLE 1

| Height | Tidal volume (mL) |
|---|---|
| 60 inches to 63 inches | 300-400 |
| 64 inches to 66 inches | 350-450 |
| 67 inches to 69 inches | 400-500 |
| 69 inches to 72 inches | 400-500 |
| 72 inches to 75 inches | 450-550 |
| 76 inches or more | 500-600 |

Ventilation tidal volume can also be calculated based on an equation based on ideal body weight (IBW), which is determined by gender and height. For example, ventilation parameters can be correlated to the patient's ideal body weight (IBW) (as calculated by Equation 2, shown above), according to Equation 3.

$$\text{Usable tidal volume target}=(6 \text{ to } 8 \text{ mL/kg})\times \text{IBW} \quad \text{Equation 3:}$$

As noted above, for various embodiments, improved optimization of target resuscitation criteria can be achieved by determining resuscitation criteria based on a plurality of physical features of the patient. For example, rather than only considering height, weight, or physical feature dimensions (e.g., sternal anterior-posterior (AP) distance, thoracic circumference, lateral width of the thorax, overall patient volume, thoracic volume, waist circumference, neck size, shoulder width, skull volume, facial feature spacing, etc.) individually, resuscitation parameters may be determined based on two or more of these features in combination. One reason that determining target resuscitation criteria based on a plurality of physical features of the patient can be useful is due to differences in positioning of organs, such as the heart and lungs, and other anatomical structures (e.g., soft tissue, sternum, or spine) between a child and an adult. For example, a child may have a small heart and lungs, compared with a similarly sized (e.g., similar height and weight) adult. Accordingly, optimal target resuscitation criteria such as compression depth may be different for patients with similar anterior-posterior diameters. Thus, using one or more physical features, such as height, skull, volume, facial feature spacing such as eye spacing or eye-nose spacing, hand or foot feature measurements (e.g., finger or toe length/width, hand or foot length/width) as a surrogate for age when combined with AP distance can result in more accurate target resuscitation criteria (e.g., compression depth feedback). For various embodiments, physical features described in the reference article "Standards in Pediatric Orthopaedics: Tables, Charts, and Graphs Illustrating Growth," by Robert N. Hensinger, published by Raven Press, 1986 or the reference article "Three-dimensional human facial morphologies as robust aging markers," by Weiyang Chen et al., Cell Research (2015) Vol 25, No 5, 25:574-587, may be used as a surrogate to estimate non-physical characteristics of the patient, such as age or gender. In some examples, when an imaging tool (e.g., camera, three-dimensional imaging system) is used to measure physical features, a reference object or scale may be positioned in the field of view so that measurements of particular features (e.g., parts of a hand) may be accurately measured. As an example, it may be preferable to take an image of the hand or foot of a patient to measure physical features that are used as input to determine target resuscitation criteria. Optimal target resuscitation criteria can also be based on non-physical characteristics of the patient, such as age and gender. For example, as described above, younger patients may have a faster heart rate and require a faster chest compression rate than older patients, regardless of patient size. Target ventilation parameters, such as tidal volume, may also be dependent, at least in part, on patient gender.

Figure 4A:
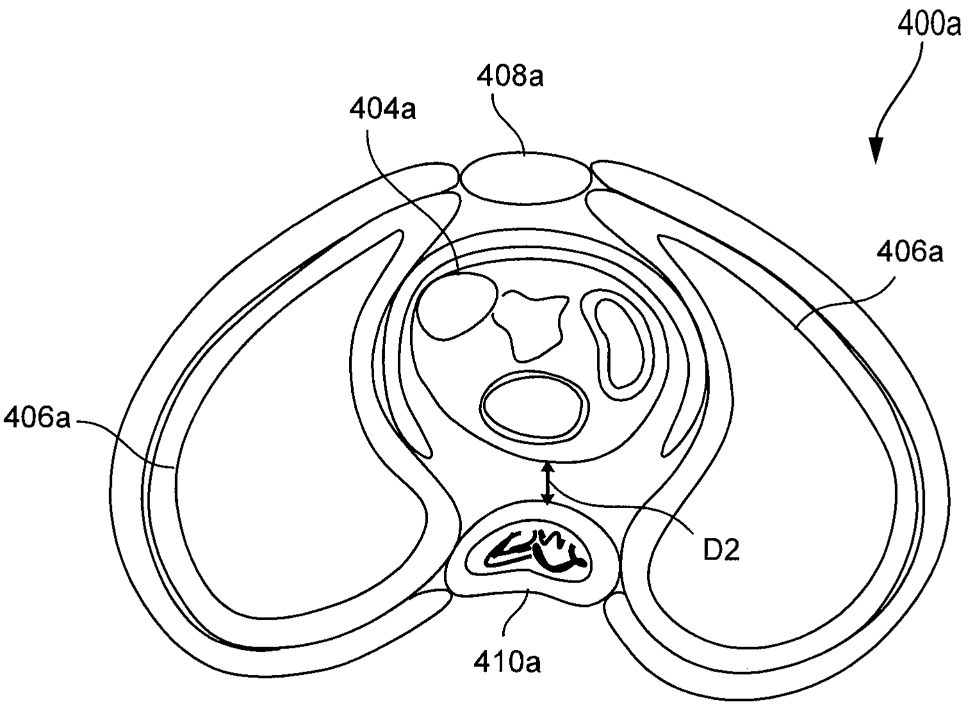
FIGS. 4A and 4B are schematic drawing comparing a transverse cross section of a cardiothoracic region of a pediatric patient, such as a small child, and a transverse cross section of a cardiothoracic region of an adult patient.

To illustrate these differences, drawings comparing a cross section 400*a* of the cardiothoracic region of an adult patient (FIG. 4A) and a cross section 400*b* of a cardiothoracic region of a pediatric patient (FIG. 4B) are shown. The cross section 400*a* of the adult patient includes the heart 404*a*, lungs 406*a*, sternum 408*a*, and spine 410*a*. In an uncompressed state, the heart 404*a* is spaced apart from the spine 410*a* by a distance D2. During the downward stroke of a chest compression, the heart 404*a* is moved in a downward direction towards the spine 410*a*, decreasing the intrathoracic volume and compressing the heart and the great vessels to move blood in a forward direction.

Figure 4B:
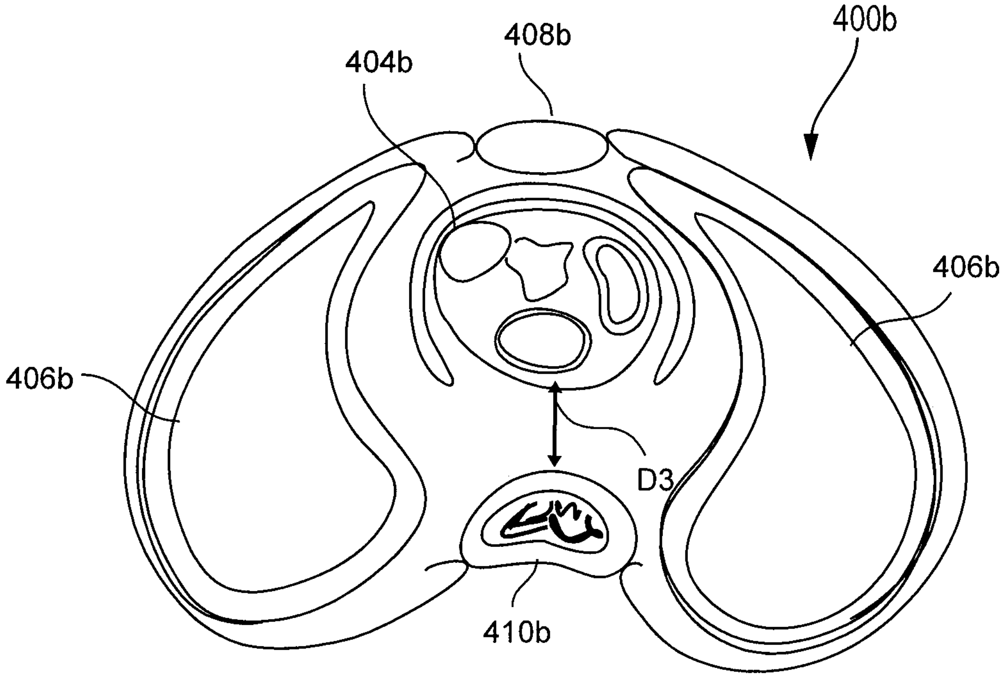

By way of comparison, the cross section 400*b* of the pediatric patient is shown in FIG. 4B. The organs (heart 404*b* and lungs 406*b*) of the pediatric patient may be smaller than the adult. Accordingly, a distance D3 between the heart and the spine may be larger than for an adult patient having a similarly shaped chest. In that case, compression depth may be increased to account for the smaller relative size of the heart within the thoracic cage for pediatric (ages 0-7) patients. Such differences between a pediatric patient and an adult patient would not be appreciated if only one physical feature were considered. However, when multiple physical features, such as patient height or other physical features such as skull volume or circumference or facial feature separation and weight are considered together, a narrower range of acceptable target resuscitation criteria can be determined for the patient. Additional patient characteristics such as estimated or actual patient age or gender may also augment the multiple physical features to further refine the range of acceptable target resuscitation criteria.

In some examples, even greater optimization of target resuscitation criteria can be achieved with a more detailed consideration of a plurality of physical features relating to a size and shape of the patient's cardiothoracic region. Such a consideration of the size and shape of the cardiothoracic region can be useful because cardiothoracic region size, shape, and configuration can vary greatly even for patients having similar height and weight.

As noted above, AP distance is one physical feature of a patient's cardiothoracic region which can be relevant for determining a target depth for chest compressions. Generally, chest compression depth corresponds to AP distance.

Figure 5A:
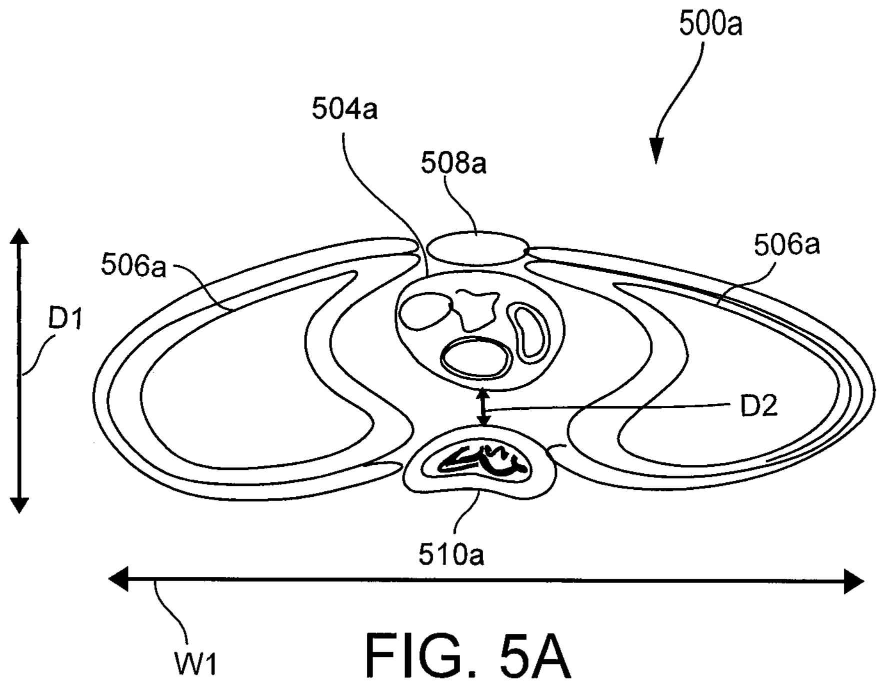
FIGS. 5A and 5B are schematic drawings comparing a transverse cross section of a cardiothoracic region of a flat chested patient as compared to a barrel chested patient.

Deeper chest compressions may be required for patients with especially large chest cavities. Therefore, considering AP distance in combination with physical features, physical characteristics (e.g., weight), gender, and/or other information can provide a more accurate target criteria for chest compressions and other resuscitation activities. However, AP distance alone may not be sufficient to fully characterize a shape of a patient's cardiothoracic region in all circumstances. For example, some patients are flat-chested, while others have a rounder or barrel-shaped chest. A drawing of a cross section 500*a* of a cardiothoracic region of a flat-chested patient is shown in FIG. 5A. The cross section 500*a* includes the patient's heart 504*a*, lungs 506*a*, sternum 508*a*, and spine 510*a*. The distance D1 represents the AP distance for the patient's cardiothoracic region. D2 is the distance between the heart 504*a* and spine 510*a*. During a chest compression, the heart 504*a* moves the distance D2 and compresses against the spine 510*a*.

Figure 5B:
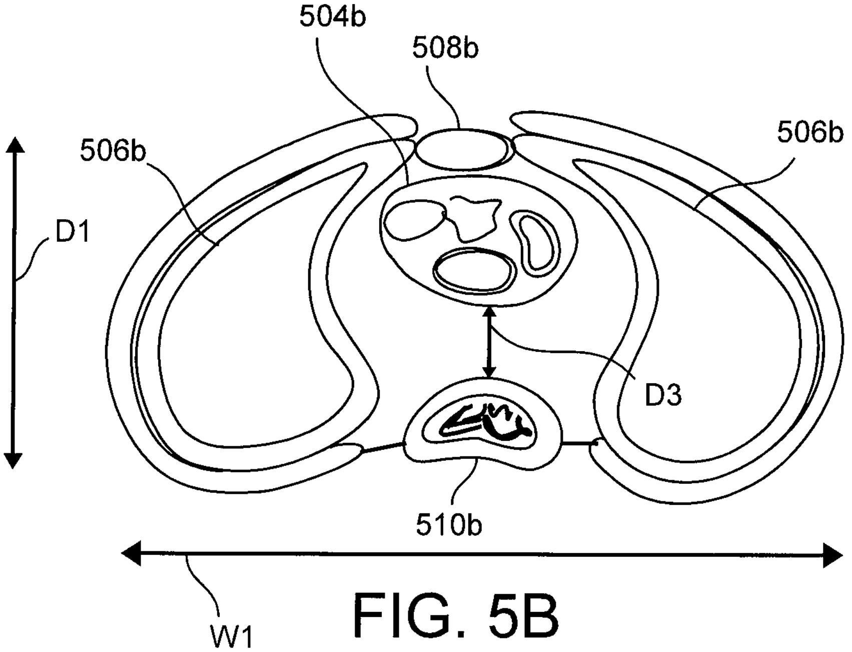

A drawing of a cross section 500*b* of a cardiothoracic region of a barrel chested patient is shown in FIG. 5B. The flat-chested patient and the barrel-chested patient have a similar AP distance (shown by D1 in FIGS. 5A and 5B). However, the distance D3 between the heart 504*b* and spine 510*b* of the barrel-chested patient 502*b* is greater than the distance D2 for the flat chested patient due to the curvature of the barrel-shaped patient's chest. As a result, deeper chest compressions may be needed for the barrel chested patient to ensure that the heart 504*b* moves the full distance D3 and compresses against the spine 510*b* to push blood from the heart during the compression.

In order to more fully characterize a shape of the patient's cardiothoracic region to determine target resuscitation criteria, other physical features can be considered in combination with AP distance. For example, a width W1 or circumference of the cardiothoracic region can be used in combination with AP distance to more fully characterize a shape of the patient's cardiothoracic region. Thoracic volume measured based on a three-dimensional scan/image of the patient can also be used to determine and characterize a shape of the thoracic region. Table 2 shows exemplary target chest compression depths for adult patients with similar height and weight based on AP distance D1 in combination with thoracic width W1. As shown in the illustrative example of Table 2, the target chest compression depth values may vary from 1.5 inches to 3.8 inches. However, since AP distance (D1) and thoracic width (W1) are both being considered, the system can provide a more exact recommended chest compression depth or, at least, a narrower range of recommended depths.

TABLE 2

| | | AP Distance (inches) | | |
|---|---|---|---|---|
| | | 5-9 | 10-14 | 15+ |
| Thoracic Width (inches) | 12-14 | 1.5-2.0 inches | 2.0-2.4 inches | 2.3-2.8 inches |
| | 15-17 | 2.0-2.4 inches | 2.3-2.8 inches | 2.5-3.0 inches |
| | 18-20 | 2.3-2.8 inches | 2.5-3.0 inches | 2.7-3.2 inches |
| | 21-23 | 2.5-3.0 inches | 2.7-3.2 inches | 3.0-3.5 inches |
| | 24-26 | 2.7-3.0 inches | 3.0-3.5 inches | 3.3-3.8 inches |
| | 27+ | 3.0-3.5 inches | 3.3-3.8 inches | 3.3-3.8 inches |

Determining Patient Type

In some examples, the at least one processor 30 of the system 10 can also be configured to determine a type of patient based at least in part on the measured physical feature(s) of the patient. For example, the at least one processor 30 may process information from the input device 12 to determine a gender of the patient. In simplest examples, gender may be manually entered for the system 10 using, for example, the manual data entry accessory 14. Alternatively, information about patient physical features (e.g., patient height, thoracic dimensions) can be considered to determine the patient's predicted gender. In more sophisticated examples, image processing techniques may be applied to images of the rescue scene 100 captured by cameras 16 associated with the system 10 to estimate or predict a gender of the patient. For example, facial image processing techniques may be applied to captured images to estimate patient gender. In other examples, anthropometric relationships between portions of the patient's body could be used to predict gender. For example, the at least one processor 30 could be configured to determine a ratio of hip circumference vs. waist circumference for the patient ("waist to hip ratio"). The at least one processor could also determine a ratio of waist circumference vs. height ("waist to height ratio"). The determined ratio(s) could be compared to known ratios for males and females to predict the patient's gender.

In a similar manner, the at least one processor 30 can be configured to automatically distinguish between an adult patient and a pediatric patient based on measurements of physical features provided by the system 10. For example, the at least one processor 30 could be configured to determine whether the patient is most likely to be pediatric or adult based on the patient's height and weight. In other examples, the at least one processor 30 can be configured to distinguish between a neonate, an infant, a small child, a large child, a small adult, an average-sized adult, or a large adult based on a measured patient's height and/or weight.

Determining Suggested Techniques for Resuscitation Activities

In some examples, the at least one processor 30 can also be configured to cause the feedback device to provide an indication regarding a suggested chest compression technique for the patient based on at least one physical feature of the patient. Further, in some instances, the at least one processor 30 may be configured to suggest a first chest compression technique based on initially received physical features of the patient, monitor progress of the rescue effort and/or changes in physical features of the patient over the course of the rescue effort, or determine how well CPR criteria have been met, and, after a predetermined period of time, provide an instruction to switch from a previously provided chest compression technique to a new technique. For example, an acute care provider may commence chest compressions performing a first or initial chest compression technique. For most adult patients, the first or initial technique would be conventional two palm chest compressions. If, following a predetermined period, the system 10 determines that the applied chest compressions are not effective and/or are not being performed properly, the at least one processor 30 may cause the feedback device 24 to provide an instruction to the acute care provider to perform a different chest compression technique, such as active compression decompressions, one palm chest compressions, or to perform automated mechanical chest compressions. In some cases, if manual chest compressions are ineffective, it may be preferable to switch to an automated mechanical chest compression system, such as the AutoPulse™ resuscitation system provided by ZOLL Medical Corporation or the Lucas™ chest compression system provided by Physio- Control Corporation, which will offer a more consistent pattern of chest compressions in comparison to manually applied compressions.

Chest compression techniques can include, for example, two palm chest compressions, one palm chest compressions, two finger chest compressions, and encircled thumb chest compressions. Generally, a determination of which chest compression technique to apply is based on patient size and/or age. For example, Table 3 shows a correlation between patient weight and chest compression technique that could be used by the at least one processor 30 to provide an initial recommendation for the chest compression technique.

TABLE 3

| Patient Weight | Compression Technique |
|---|---|
| Less than 10 lbs. | Two-finger compressions |
| 10 lbs. to 25 lbs. | Two-finger or encircled thumb compressions |
| 25 lbs. to 50 lbs. | One-palm compressions |
| 50 lbs. or more | Two-palm compressions |

A determination of a suggested or preferred chest compression technique could also be based on a level of skill or experience of an acute care provider or user. For example, bystanders and other untrained individuals may be more comfortable performing two palm chest compressions, since the two palm technique is often taught to lay persons during CPR training. However, if the system 10 determines that a certain chest compression technique is not being performed well and/or is not resulting in a desired improvement for the patient, the system 10 may recommend that the acute care providers or user begin performing another type of chest compressions.

Two palm chest compressions are generally performed for adults and older children. For example, current guidelines specify that two palm chest compressions can be performed for patients 8 years of age and older. In some examples, patient height and/or weight may be used to determine whether two palm chest compressions are appropriate for a patient. For example, the system may be configured to recommend providing two palm chest compressions for patients over 50 lbs. (22.7 kg).

Figure 6A:
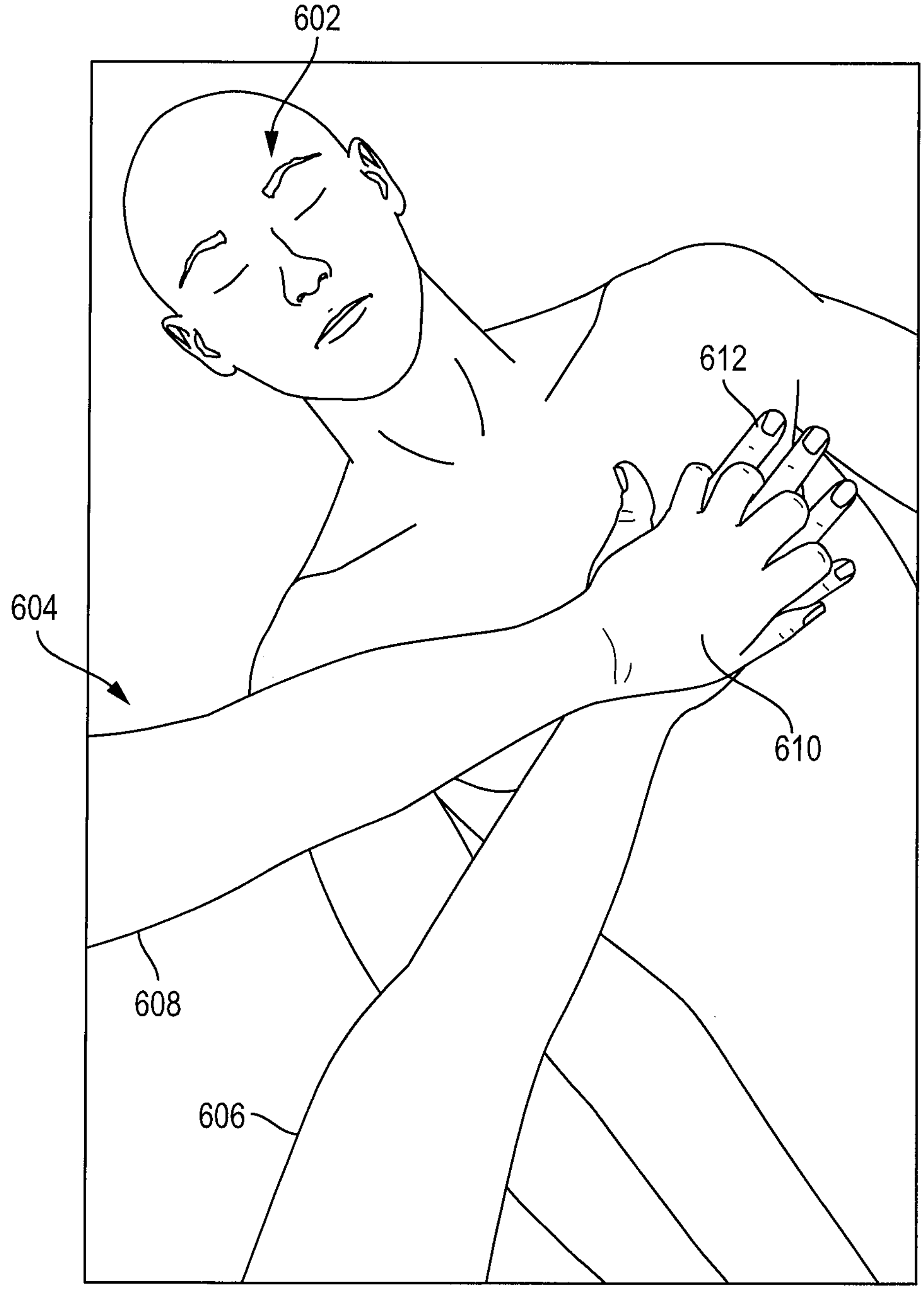
FIG. 6A is a drawing of an acute care provider performing two palm chest compressions for a patient using a resuscitation guidance system according to an embodiment of the disclosure.

FIG. 6A shows an acute care provider 604 performing two palm chest compressions to a patient 602. As shown in FIG. 6A, the acute care provider 604 positions himself/herself (e.g., kneeling) adjacent to the patient's torso with arms 606, 608 stretched toward the patient 602. A heel of the acute care provider's bottom hand 612 is placed on the sternum of the patient 602 several inches above the xiphoid process. The acute provider's top hand 610 is placed over the lower hand 612. In some cases, the acute care provider 604 may lock his/her fingers together to maintain positioning. The acute care provider 604 performs the compression by leaning forward so that his or her body weight pushes the patient's chest in a downward direction. The acute care provider 604 releases the compression by removing the hands from the chest, so that the chest can expand via the natural recoil of the chest wall. Compressions are repeatedly performed at a compression rate of from about 100 to 120 compressions per minute, depending on patient size and age.

Figure 6B:
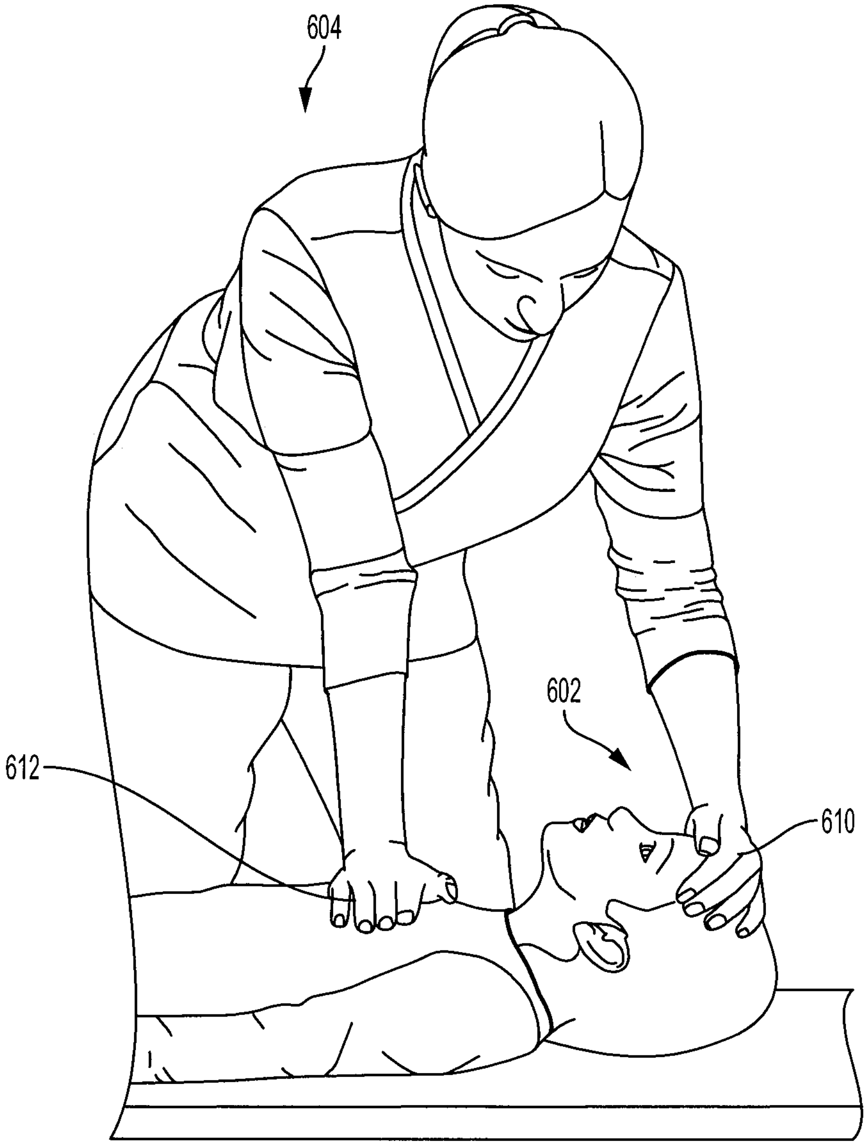
FIG. 6B is a drawing of an acute care provider performing one palm chest compressions for a patient using a resuscitation guidance system according to an embodiment of the disclosure.

One palm chest compressions are generally performed for young children, especially if the acute care provider is large in size, to avoid injuring the patient 602 due to compression force. For example, one palm compressions may be performed for children from 1 to 8 years of age. The system 10 may be configured to recommend one palm chest compressions for children weighing from 25 lbs. to 50 lbs. (11.3 kg to 22.7 kg). FIG. 6B shows an acute care provider 604 performing one hand chest compressions to the patient 602. With a firsthand 610, the acute care provider 604 holds the patent's head. The acute care provider's second hand 612 is placed on the sternum in a similar position to the bottom hand 612 in two-palm chest compressions. A target depth for one palm chest compressions may be about one-third of AP distance. Therefore, for a normal sized child having an AP distance of 3 inches, target compression depth may be about 1 inch. Target compression rate may be 120-160 compressions per minute because pediatric patients typically have faster heart rates than adult patients. However, it can be appreciated that other target compression depths and rates may be appropriate depending on the physical features or other characteristics of the patient.

Figure 6C:
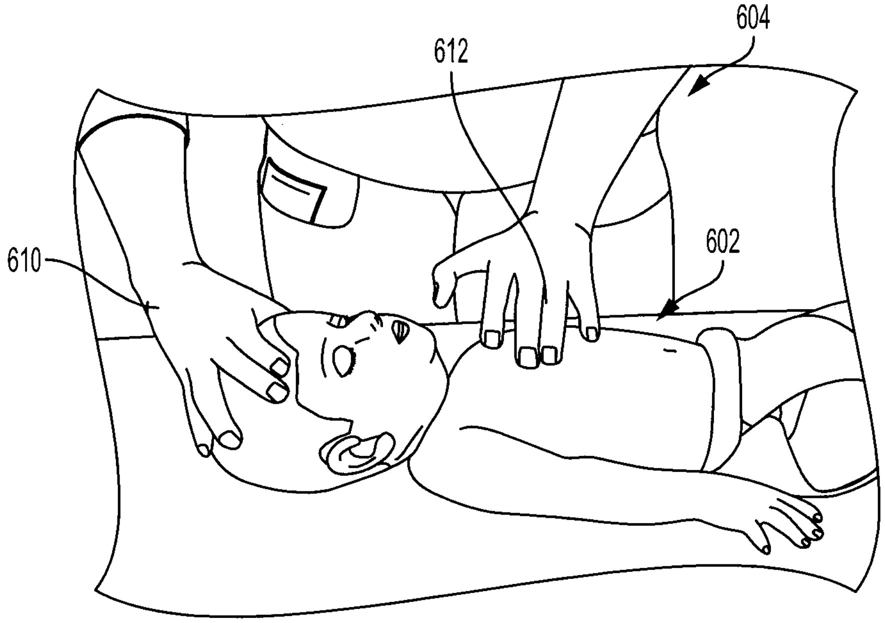
FIG. 6C is a drawing of an acute care provider performing two finger chest compressions for an infant patient using a resuscitation guidance system according to an embodiment of the disclosure.

Two finger chest compressions and encircled thumbs chest compressions are generally performed for infants and neonates (e.g., patients that are less than 1 year old and/or weigh less than 25 lbs. (22.3 kg)). FIG. 6C shows the acute care provider 604 performing two finger chest compressions for an infant patient 602. As shown in FIG. 6C, the acute care provider 604 optionally places a firsthand 610 on the patient's forehead, in a similar manner to the one palm chest compression described herein. Alternatively, the first hand 606 may be placed underneath the patient's back or elsewhere, rather than the forehead. The second hand 612 is positioned over the patient's chest. The acute care provider 604 presses two fingers (e.g., the middle and ring fingers) against the infant patient's chest to perform the compressions. In some embodiments, target compression depth for an infant patient may be between about 0.25 inch and 0.75 inch, depending on the patient's size and age. Target compression rate for pediatric patients may be from about 120 to 160 compressions per minute.

Figure 6D:
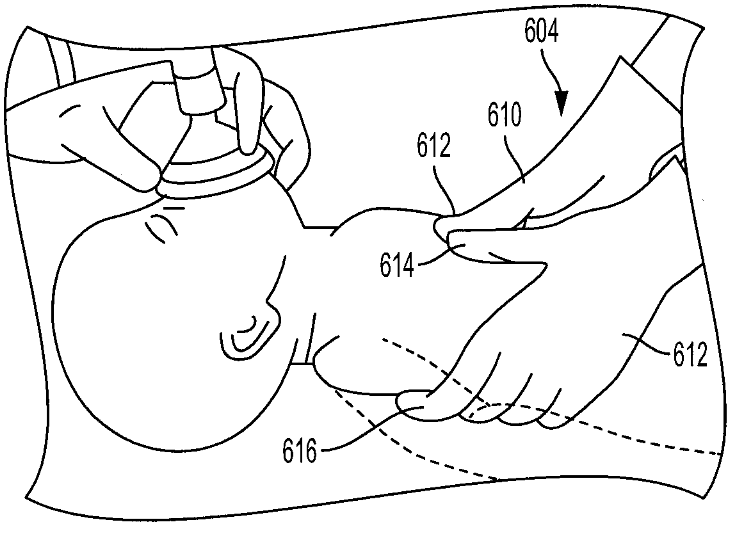
FIG. 6D is a drawing of an acute care provider performing encircled thumbs chest compressions for an infant patient using a resuscitation guidance system according to an embodiment of the disclosure.

FIG. 6D shows an acute care provider 604 performing encircled thumb chest compressions for a patient 602. In order to perform the encircled thumb chest compressions, the acute care provider 604 wraps his/her hands around the infant patient's cardiothoracic region, such that the thumbs 614 of the hands 610, 612 rest against the patient's chest and the fingers 616 rest against the patient's back. In some instances, the acute care provider 604 may hold the patient 602 in a substantially upright position while performed encircled thumb chest compressions. In other examples, the patient 602 may be lying against a solid flat surface, as shown in FIG. 6D. In order to perform the compressions, the acute care provider 604 moves his/her fingers 616 towards the thumbs 614 thereby compression the patient's chest and back towards each other. Target compression depth for the encircled thumb chest compressions should be similar to two-finger chest compressions (e.g., about 0.25 inch to 0.75 inch). Target compression rate for pediatric patients may be from about 120 compressions per minute to 160 compressions per minute.

Active Decompressions and Thoracic Remodeling

The at least one processor 30 can also be configured to provide an instruction to the acute care provider to begin applying active decompressions for the patient at an appropriate time. For example, the at least one processor 30 can be configured to continuously or periodically monitor physical features of the patient, such as AP distance, as chest compressions are being performed. If the physical feature, such as AP distance, changes substantially (e.g., decreases by about 20% or more) over the course of the acute care event (e.g., due to chest remodeling from repeated forces being applied to the chest), it may indicate that a shape of the patient's chest and/or resiliency of the chest cavity has changed and that active decompressions are needed to maintain blood flow. That is, as a result of the chest effectively becoming more flat, it may be preferable to adjust the target chest compression depth to a lower value and also to provide active chest decompressions, to assist blood flow to and from the heart.

Figure 7A:
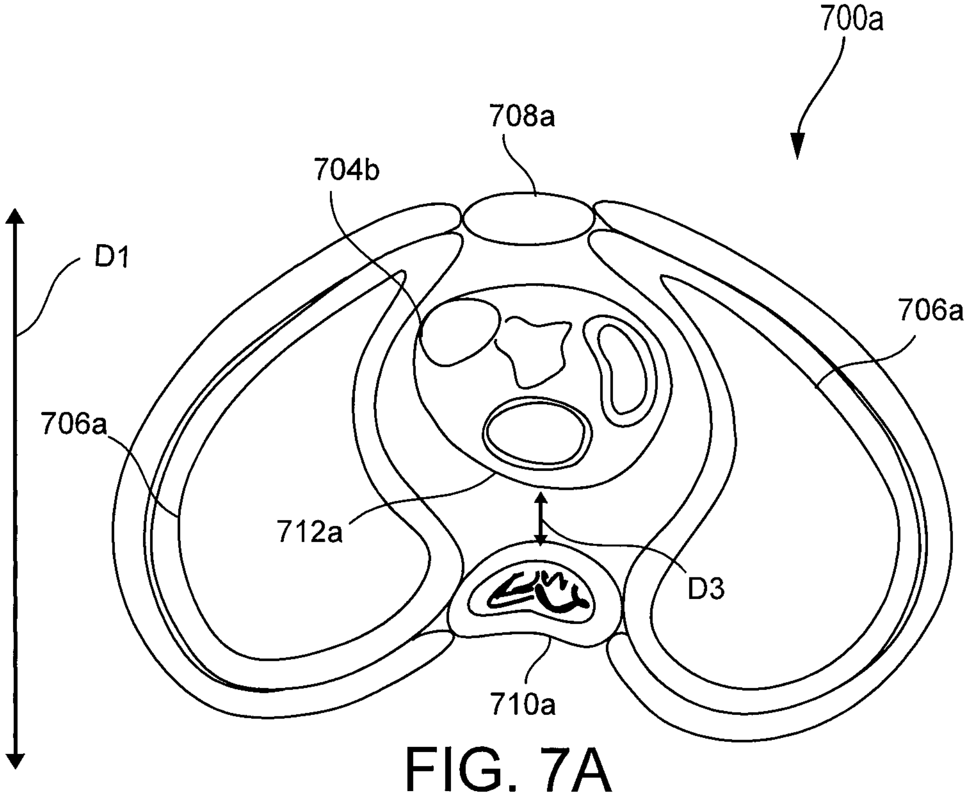
FIGS. 7A and 7B are drawings showing a cross section of a patient prior to and following chest compressions illustrating remodeling or changes in a shape of the patient's thorax caused by the chest compressions.
Figure 7B:
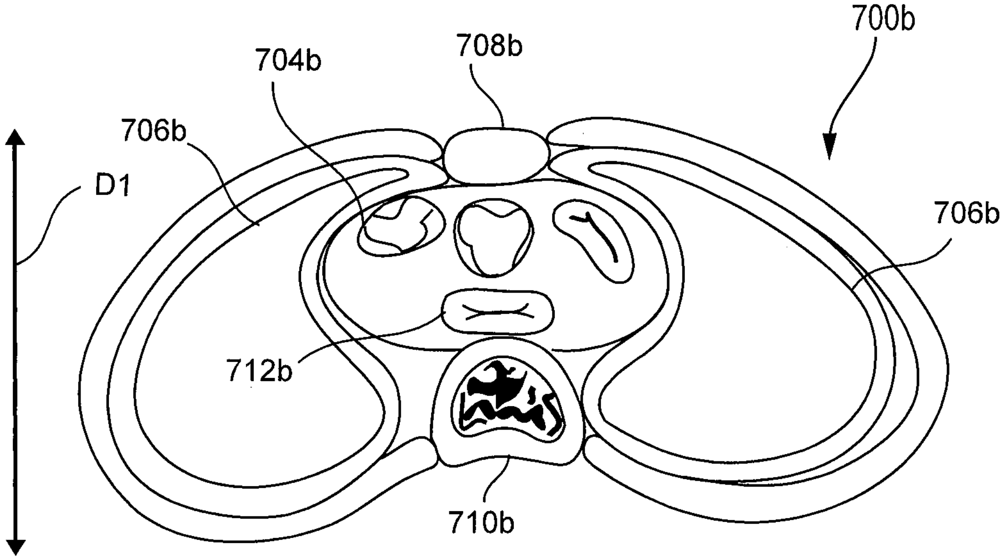

In general, active decompressions refers to applying a force to the patient's chest to pull or otherwise force the chest back to an expanded state between compressions, which has the benefit of lowering intrathoracic pressure so as to enhance venous return of blood from peripheral tissues back to the heart. One scenario in which active decompressions can be especially beneficial is following remodeling of the chest caused by chest compressions. Applying chest compressions to the patient's chest can reposition certain anatomical structures (e.g., ribs, soft tissue, etc.) and/or reduce resiliency of such structures. For example, when the chest is fully expanded, as shown in FIG. 7A, the heart is spaced apart from the sternum by a distance D2 and the mitral valve 712 is fully opened. In this position, blood is drawn into the heart and can be recirculated by each chest compression. Desirably, the chest returns to this expanded state (shown in FIG. 7A) upon full release of the chest between chest compressions. However, following prolonged compressions, the chest may remain in a partially collapsed or compressed state, as shown in FIG. 7B, even after the acute care provider releases the chest between compressions. In the compressed state of FIG. 7B, the heart 704 is pressed against the sternum and the mitral valve 712 can be closed or partially closed, meaning that only a small amount of blood is drawn into the heart between compressions. Since blood is not being effectively delivered to the heart between compressions, the amount of blood circulated by each chest compression is substantially reduced. Active decompressions can be performed not only to create a negative intrathoracic pressure within the chest cavity, but also to counteract the loss of resiliency of the chest cavity and to ensure that the chest returns to the expanded state between compressions.

Figure 7C:
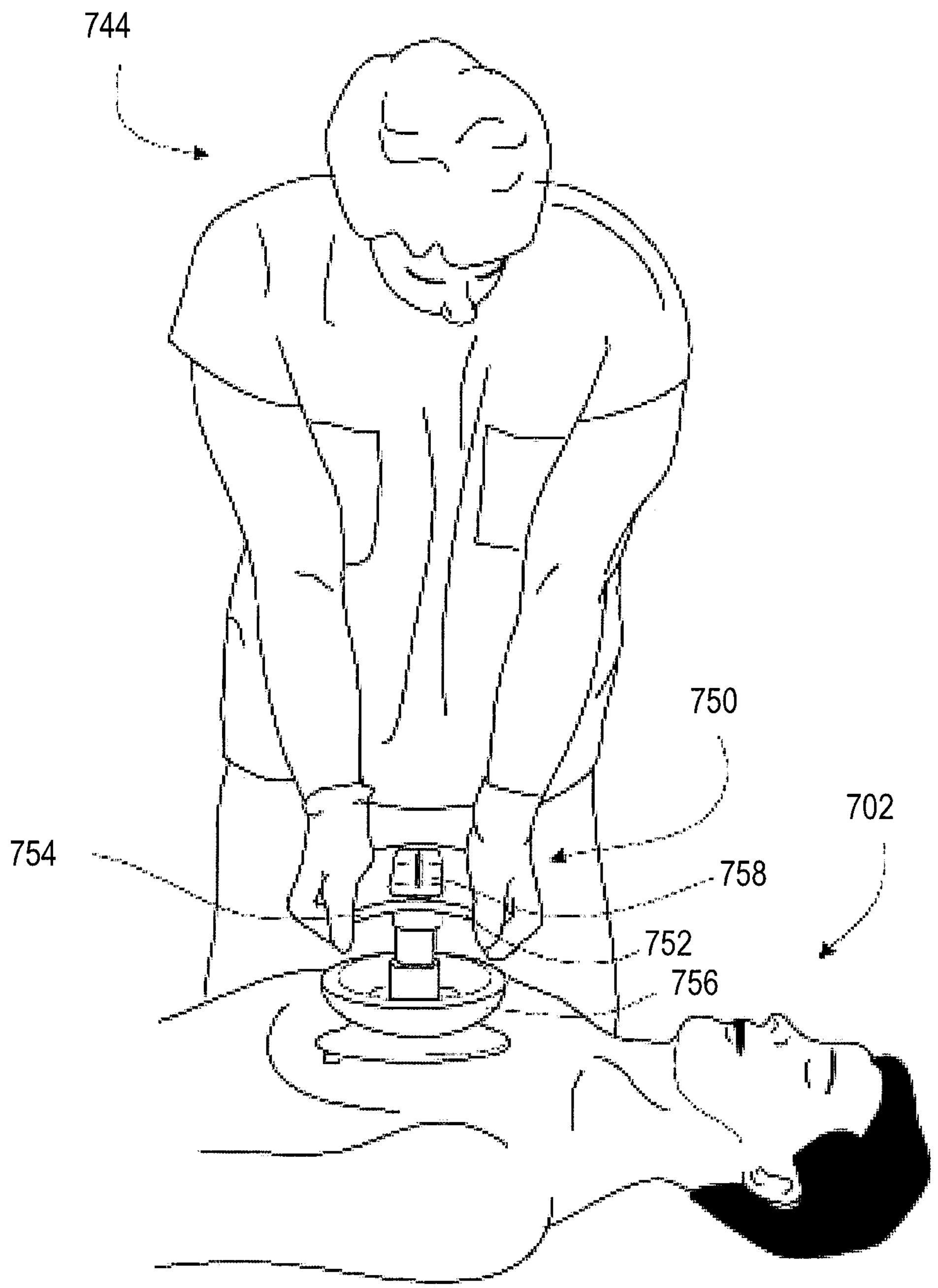
FIG. 7C shows an acute care provider applying active compression decompression (ACD) therapy to a patient using an ACD) device in accordance with an embodiment of the present disclosure.

As shown in FIG. 7C, active decompressions can be performed using a suction device, such as a plunger device 750, which attaches to a chest of the patient 702. The suction device 750 comprises a handle comprising a grip portions 752, 754 for the acute care provider's hands, connected to a dome-shaped suction cup 756 placed on the patient's chest. The device 750 can further comprise a depth indicator 758 positioned on the grip portions 752, 754 of the handle. In use, an acute care provider 744 grasps the grip portions 752, 754 of the handle and, during a compression portion of the compression cycle, pushes the handle in a downward direction until the indicator 758 shows that a target compression depth has been achieved. Once the target depth is achieved, the acute care provider 744 pulls the grip portions 752, 754 in an upwards direction, during the decompression phase of the compression cycle. As a result of a suction force between the suction cup 756 and the patient's chest, pulling the grip portions 752, 754 in the upwards direction causes the chest to move to its expanded state, thereby drawing blood into the heart.

An exemplary plunger or suction cup device which can be used with the resuscitation feedback and guidance system 10 to deliver active decompression for a patient is the ResQPUMP™ provided with the ResQCPR™ system by ZOLL Medical Corporation. The ResQPUMP™ system includes a suction system that forces the chest back to the expanded state between compressions by applying a lift force of up to 10 kg to the patient's chest during decompressions. An exemplary device for providing active decompressions for a patient including a suction cup configured to adhere to the patient's chest is also disclosed in United States Patent Appl. Pub. No. 2017/0079876 to Freeman, entitled "Chest Compliance Directed to Chest Compressions," and may be implemented in embodiments of the present disclosure. Other devices that can be attached or adhered to the chest and which can be lifted upwards to perform active chest decompressions include, for example, devices using a hook and loop fastener (e.g., Velcro®) for connecting the device to the patient, and devices including an adhesive material for mounting the device to the patient's chest and coupling the device thereto so as to be able to pull the chest upward during decompression.

In other examples, active decompressions can be performed by applying compressions to other regions of the patient's body between chest compressions. For example, the feedback device 24 of the system 10 can instruct the acute care provider to squeeze sides of the patient's cardiothoracic region together to force the chest back to the expanded state. In a similar manner, compressions applied to the patient's abdomen between chest compressions may exert sufficient force on the chest cavity, causing the chest cavity to return to its expanded state between chest compressions as well as enhance venous return of blood back to the heart. Or, the feedback device may provide an instruction or suggestion for automated mechanical chest compressions to be applied to the patient, particularly if manual compressions are inadequate.

In some examples, the system 10 can be configured to continuously or periodically obtain measurements representative of the physical feature of the patient to determine when remodeling is occurring. For example, the system 10 can be configured to monitor the patient's AP distance D1 (shown in FIGS. 7A and 7B) over the course of the acute care event. When it is determined that the AP distance upon full release of the chest has decreased by a substantial amount (e.g., by 10% to 20%) from an initial (e.g., prior to commencement of chest compressions) AP distance, the at least one processor 30 may cause the feedback device 24 to provide an indication to the user that remodeling has occurred and/or to provide a further indication to the acute care provider that it may be preferable to apply active decompressions.

When active compression decompression (ACD) therapy is suggested as an adjustment in technique for the acute care provider (e.g., via display screen, audio speaker, or other suitable form of feedback device), once it is confirmed that ACD therapy is being provided, the type of feedback may be modified accordingly to ACD-type feedback. ACD therapy may be confirmed, for example, via a manual input or detection via appropriate sensor(s) (e.g., motion sensor, accelerometer, force sensor) by waveform analysis. Exemplary feedback techniques for ACD therapy are disclosed in U.S. Appl. Pub. No. 2018/0092803, entitled, "Active Compression Decompression Cardiopulmonary Resuscitation Chest Compression Feedback," and may be incorporated in embodiments of the present disclosure.

In some examples, the at least one processor 30 can also be configured to modify or adjust target chest compression criteria for compression depth and/or rate to account for changes in AP distance caused by prolonged application of chest compressions or remodeling. For example, the decreased AP distance caused by cardiothoracic remodeling means that the chest does not travel as far between compressions. Similarly, the heart may be positioned closer to the spine, meaning that it travels a shorter distance before contacting the spine and beginning to compress. In view of such changes, the target compression depth and target release velocity may be reduced to account for the fact that the chest does not travel as far between compressions. In some examples, the at least one processor 30 can be configured to decrease the target criteria for compression depth and release velocity based on a linear relationship between compression depth and/or release velocity and AP distance. In other examples, the relationship between depth and/or release velocity can be non-linear and determined based, for example, on experimental data about chest compression efficiency and/or from patient outcome data.

Exemplary Electrical Components of the Resuscitation Guidance System

Having described how the system 10 can be used at the rescue scene 100 for providing guidance to a user in performing resuscitation activities for a patient, electrical components of the system will now be described in detail. A schematic drawing of electrical components of an embodiment of the system is shown in FIG. 1B.

Physical Feature Measurement Input Devices

As described herein, the system 10 includes at least one input device 12, such as the manual data entry accessory 14, camera 16, and/or three-dimensional imaging system 18 or sensor, for providing information representative of the at least one physical feature of the patient measured during the acute care event. Generally, the input device 12 is a computer device, medical device, or imaging device present at the acute care scene, which records or receives information representative of physical features of the patient. For example, as previously described, the input device 12 can be a data input accessory such as the manual data entry accessory 14. The input device 12 can also comprise three-dimensional imaging systems such as cameras and scanners, such as the camera 16 and/or a three-dimensional imaging system 18 for recording information about the rescue scene 100 and patient 102 (shown in FIG. 1A). The information from the input device 12 can be processed to determine the measurements for the at least one physical feature of the patient. In some instances, one or more of the input devices 12 are positioned on or mounted to a medical device at the rescue scene 100, such as the defibrillator 108 (shown in FIG. 1A). For example, the camera 16 can be connected to the defibrillator 108 or patient monitor positioned adjacent to the patient and configured to periodically or continually obtain images of the patient 102 during the rescue effort. In other examples, the input device 12 can be a handheld device, such as a handheld digital camera or smart phone, carried by the acute care provider. In other examples, the input device 12 can be worn by the user. For example, the input device 12 could be a digital camera clipped to the acute care provider's clothing or attached, for example, to a brim of a hat or visor.

The manual data entry accessory 14 can be electronically coupled to the at least one processor 30 and configured to allow a user, such as the acute care provider, to manually enter data about the patient 102 and rescue effort. For example, data can include measurements of the physical features of the patient 102. Measurements can be obtained manually using conventional measurement devices, such as a tape measurer and/or calipers. Once measurements are manually obtained, the acute care provider can manually enters the measurements into the system 10 using the manual data entry accessory 14. In some instances, the data input accessory comprises a user interface for guiding the user or acute care provider through a process of obtaining measurements of the patient 102. For example, the user interface may display an instruction such as "Measure circumference of chest with tape measurer" or "Measure AP distance with calipers." The user interface can also display data entry fields allowing the acute care provider to manually enter measured values.

The camera 16 can be a conventional digital camera for capturing two-dimensional images of the rescue scene 100. Although designs differ from different vendors, as is known in the art, a camera, such as the camera 16, usually comprises a charge-coupled device (CCD) or complementary metal-oxide-semiconductor (CMOS) imaging sensor, a lens, a multifunctional video control chip, and a set of discrete components (e.g., capacitor, resistors, and connectors). An image is recorded by the imaging sensor and can be processed by the video control chip. Captured images can also be processed by, for example, a three-dimensional information and/or image processing module configured to identify anatomical structures, distances, and physical objects contained in the captured images. Captured images can be stored on computer memory associated with the input device 12 and/or with the at least one processor 30.

In some examples, cameras for capturing images of the rescue scene 100 and patient 102 can include one or more of a digital camera, RGB camera, digital video camera, red-green-blue sensor, and/or depth sensor for capturing visual information and static or video images of the patient and acute care scene. The camera 16 can also comprise multiple image capture features for obtaining stereo images of the acute care scene. The stereo-image can be processed to determine depth information for objects in the acute care scene.

In other examples, the camera 16 can be a wide angle or fish-eye camera, a three-dimensional camera, a light-field camera, or similar devices for obtaining images. A light-field or three-dimensional camera can refer to an image capture device having an extended depth of field. Advantageously, the extended depth of field means that during image processing, a user can change focus, point of view, or the perceived depth of field of a captured image after the image has been recorded. As such, it has been suggested that an image captured using a light-field or three-dimensional camera contains all information needed to calculate a three-dimensional form of a recorded scene. See Christian Perwass, et al. "Single Lens 3D-Camera with Extended Depth-of-Field", Raytrix GmbH, Schauenburgerstr. 116, 24116 Kiel, Germany (2012), which describes an implementation of a light-field 3D camera that may be implemented in embodiments of the present disclosure.

The camera 16 is desirably positioned so that numerous images of the patient can be obtained. In some instances, images are automatically captured continually or at predetermined intervals over the course of the rescue effort. In other examples, the acute care provider 104, 106 may capture digital images of the rescue scene 100 and patient 102 before beginning a resuscitation activity by, for example, holding an electronic device comprising a camera, such as a smart phone or similar handheld electronic device, in proximity to the patient and capturing an image by pressing an appropriate button or touching a specified region of a touch screen of the handheld device.

The three-dimensional imaging system 18 or sensor can also be used to obtain three-dimensional information related to positioning of objects, sizes of objects, and distances between objects at the rescue scene. Three-dimensional information can comprise distance or depth information about how far away physical objects are from the three-dimensional imaging system 18, as well as size/dimensions information for objects and individuals present at the rescue scene. Three-dimensional information and/or images from a three-dimensional imaging system 18 or sensor can be processed to produce a three-dimensional representation of the acute care scene. The three-dimensional representation can comprise position information for different anatomical structures of the patient 102 including, for example, hands, feet, elbows, knees, shoulders, neck, head, eyes, mouth, chest, sternum, and other anatomical structures of the patient.

In some embodiments, the three-dimensional imaging system 18 may be configured to project a grid of markers so as to capture high resolution patient anatomical features. For example, a camera using technology similar to that of the Kinect motion sensing input device provided by Microsoft Corporation may be employed. Such cameras may include a depth sensor employing an infrared laser projector combined with a monochrome CMOS sensor which allows for 3D video data to be captured under ambient light conditions. It can be appreciated that any suitable three-dimensional imaging systems may be used. A three-dimensional representation may be generated by a 3D surface imaging technology with anatomical integrity, for instance the 3dMDthorax System (3dMD LLC, Atlanta GA).

The three-dimensional imaging system 18 can comprise one or more of a digital camera, RGB camera, digital video camera, red-green-blue sensor, and/or depth sensor for capturing visual information and static or video images of the rescue scene. In some examples, the three-dimensional imaging system 18 can comprise both optical and depth sensing components as with the Kinect motion sensing input device by Microsoft, or the Apple TrueDepth 3D sensing system which may include an infrared camera, flood illuminator, proximity sensor, ambient light sensor, speaker, microphone, 7-megapixel traditional camera, and dot projector (which projects up to 30,000 points on an object during a scan).

In some examples, the three-dimensional imaging system 18 is positioned to substantially correspond to the acute care provider's field of view. In other examples, the three-dimensional imaging system 18 can include multiple cameras. For examples, cameras can be positioned adjacent to each of the acute care provider's eyes to generate a three-dimensional representation of the patient as the caregiver is looking at them. Alternatively, the three-dimensional imaging system 18 may be mounted on a tripod facing the patient, either mounted on or built into a resuscitation device such as an AED or a defibrillator or ventilator, or handheld by the caregiver such as using an iPhoneX provided by Apple Corporation, which has a built-in three-dimensional imaging system 18.

Although designs differ from different vendors, a camera usually comprises a charge-coupled device (CCD) or complementary metal-oxide-semiconductor (CMOS) imaging sensor, a lens, a multifunctional video control chip, and a set of discrete components (e.g., capacitor, resistors, and connectors). An image is recorded by the imaging sensor and can be processed by the video control chip. The processed image can be provided to the image processing module of the controller for further processing and to identify objects contained in the captured images. The image processing module may also prepare certain images or three-dimensional representations for transmission from the device to other electronic devices by the communications interface. In some examples, images or three-dimensional representations can be transmitted to the remote electronic device in substantially real-time. In other examples, obtained images or three-dimensional representations can be stored locally on the three-dimensional imaging system 18, for example in the computer readable memory associated with the controller. The stored images can be transmitted by the communications interface to the remote electronic device as a batch download at predetermined intervals.

The three-dimensional representation of the patient is analyzed by the image processing module and may calculate the volume of a specified region of the patient, for instance the thoracic volume, or may calculate the overall volume of the patient.

Based on calculated volume and the average density of the human body (e.g., between about 900 $kg/m^3$ to about 1050 $kg/m^3$, generally about 985 $kg/m^3$), the patient's weight may be estimated as the product of the two. As an example, the average density of the human body, after maximum inhalation of air, may change from approximately 985 $kg/m^3$ to approximately 945 $kg/m^3$. On average, the density of fat may be estimated as approximately 0.9 g/mL. The density of muscle may be estimated as approximately 1.1 g/mL.

Based on an analysis of the shape of the patient or other anthropometric features and the relative densities of the various body constituents, a more accurate average density can be used for calculating estimated patient weight, for instance as described by reference Swainson M G, Batterham A M, Tsakirides, C, Rutherford Z H, Hind K (2017) *Prediction of whole-body fat percentage and visceral adipose tissue mass from five anthropometric variables*. PLoS ONE 12(5): e0177175, https://doi.org/10.1371/journal-.pone.0177175, which may be implemented in embodiments of the present disclosure (hereinafter "Swainson"). Swainson describes calculating or otherwise estimating average density using the following anthropometric measurements. Waist Circumference ("WC") was measured at the midway point between the iliac crest and the lowest rib to the nearest 0.1 cm. Hip Circumference ("HC") was measured at the widest part of the buttocks to the nearest 0.1 cm, in order to calculate a waist-to-hip ratio ("WHR") by the simple division of WC/HC. Subsequently, waist-to-height ratio (WHtR) was calculated by WC/Height. An index of WC/$Height^{0.5}$ ("WHT0.5R") was also calculated/estimated. The WHT0.5R index has been proposed as a superior predictor of cardio-metabolic risk compared to the WHR or WHtR ratios. Swainson further describes that percent fat mass (% FM) can be calculated from these ratios as follows:

$$\% FM=99.7*WHtR-24.7 \quad \text{Equation 4:}$$

Swainson describes that a relatively accurate estimate of patient weight may be determined based on the calculated % FM and the relative densities of the various body tissues. For instance, measurements of certain parts of the body are well correlated with the relative amounts of fat, muscle, and other tissues of the body. Once the relative amounts of various bodily tissues are estimated, then the weight of those bodily tissues may be calculated by using density as a multiplication factor.

For example, an estimated body weight may be calculated using the following equation:

$$\text{Estimated Weight}=\text{Total Body Volume}*(\% \text{ FM}*\text{fat density}+(1-\% \text{ FM})*\text{average non-fat tissue, bone and cartilage density}) \quad \text{Equation 5:}$$

As discussed previously, fat density is generally about 0.9 g/mL and average non-fat tissue density is about 1.1 g/mL.

Therefore, by substituting these accepted density values, the following equation for estimated weight can be used.

$$\text{Estimated Weight}=\text{Total Body Volume}*(\%\ FM*0.9\ \text{g/mL}+(1-\%\ FM)*1.1\ \text{gr/mL} \qquad \text{Equation 6:}$$

According to further embodiments, anthropometric measurements of the patient may be used to determine or otherwise suggest treatment quantities, such as defibrillation shock energy, ventilation tidal volume and drug dosage, without directly knowing the patient's weight but rather using measurable patient features to estimate the patient's weight and then determine the approximate treatment parameter. For example, the estimated patient weight can be used to determine or set treatment parameters for the patient and/or operating parameters for a therapeutic medical device, such as a defibrillator, ventilator, or other medical device. In some examples, estimated patient weight may be used to determine defibrillation shock energy (e.g. at 3 joules/kilogram patient weight), drug dosages (cc/kg), ventilation tidal volume (mL), etc. As will be appreciated by those skilled in the art, the defibrillation shock energy, ventilation tidal volume, and/or drug delivery dosage may be greater for patients having relatively large volume and/or weight (overall or thoracic). Conversely, shock energy, ventilation tidal volume, and/or drug dosage is often lower for patients having comparatively smaller volumes and/or weight (overall or thoracic). Hence, once patient size and/or weight is estimated, e.g., via the three-dimensional representation and density analysis, then the feedback device or user interface may provide suggestions (e.g., visual or audio indications) for the user corresponding to the patient size and/or weight as to the defibrillation energy and/or drug dosage that should be administered. In some examples, operating parameters for a therapeutic medical device, such as the defibrillator, ventilator or other medical device, may be automatically updated based on the calculated patient treatment parameters. As discussed previously, measured or provided physical features and/or physical characteristics of a patient can also be used for determining patient treatment parameters for ventilation. For example, ventilation tidal volume (mL) can be calculated based on patient Ideal Body Weight, using Equation 3, listed previously. As shown in Equation 2, Ideal Body Weight is calculated from patient height and gender. In some examples, ventilation tidal volume can also be calculated or adjusted based on estimated patient weight.

In addition, optimal target resuscitation criteria such as compression depth may be different for patients with similar anterior-posterior distances. Thus, using one or more additional physical features such as height, skull, volume, facial feature spacing such as eye spacing or eye-nose spacing, hand or foot feature measurements (e.g., finger or toe width, finger or toe length, hand or foot width, hand or foot length) as a surrogate for age when combined with AP distance can result in more accurate target resuscitation criteria (i.e. compression depth feedback).

The at least one processor 30 can be configured to determine distance values for physical features based on the generated three-dimensional representation. Regardless of where the three-dimensional imaging system/sensor is positioned, as long as the three-dimensional representation of the patient is adequately captured, relevant physical features can be determined therefrom. For example, based from the three-dimensional representation of the patient, the at least one processor may determine the AP distance of the thorax, the thoracic circumference, the lateral width of the chest, the height, and other relevant physical features of the patient. As discussed herein, the three-dimensional representation of the patient may be substantially continuously or otherwise regularly updated as the patient undergoes CPR treatment. As a result, based on changing physical features (e.g., due to remodeling) over time, the target CPR criteria, recommended CPR technique, and associated feedback for the acute care provider may also change.

Additionally, the at least one processor 30 can track movement of the anatomical structures over time to monitor changes in physical features of the patient 102, which occur over the course of the rescue effort. Further, in some examples, information about the rescue scene 100 collected by the three-dimensional imaging system 18 or sensor can also be used to identify and track a location of objects in the rescue scene 18. For example, the at least one processor 30 can analyze the generated three-dimension representation to identify and provide feedback concerning patients, bystanders, therapeutic medical devices, monitoring devices, medical supplies, as well as environmental objects, such as a street or driveway, trees, buildings, power lines, automobiles, trucks, trains, and other objects present at the acute care scene, which may impact how and where treatment is provided to a patient. Examples of uses for cameras in emergency acute care events are disclosed, for example, in United States Patent Publication No. 2014/0342331, entitled "Cameras for Emergency Rescue," which may be implemented in embodiments of the present disclosure.

In some examples, the input device 12, such as the camera 16 or three-dimensional imaging system 18, includes both image-capture and depth-sensing capabilities. For example, the input device 12 could be a Kinect motion-sensing input device by Microsoft, the Intel RealSense D415 camera, or the Apple TrueDepth 3D sensing system employing vertical-cavity surface emitting lasers (VCSELs) such as those provided by Finisar (Sunnyvale, CA). The Apple TrueDepth 3D sensing system may further comprise an infrared camera, flood illuminator, proximity sensor, ambient light sensor, speaker, microphone, 7-megapixel traditional camera, and/or dot or grid projector (which projects into the field of view as many as 30,000 dots or comparably dense grid during a scan in order to effectively track real 3D objects that are detected in the field of view).

Resuscitation Sensors

With continued reference to FIG. 1B, the system 10 also comprises the resuscitation sensors, such as the chest compression sensor 20 or the ventilation sensor 22. The resuscitation sensors 20, 22 are configured to obtain signals representative of resuscitation activities performed by the acute care provider for the patient.

For example, the chest compression sensor 20 can be configured to measure chest compression parameters, such as compression depth, compression rate, compression release velocity, compression pause, or compression release. A variety of different types of chest compression sensors are known for recording information about compressions performed for a patient. As previously described, a common chest compression sensor is an accelerometer-based "CPR Puck" comprising a housing and single axis or multi-axis accelerometer. The "CPR Puck" is configured to be placed on a patient's sternum during compressions. For example, the "CPR Puck" could be positioned below the acute care provider's hands. In some examples, the "CPR Puck" includes a grip for the acute care provider to grasp to maintain hand positioning during the compressions. In other examples, as shown in FIG. 1A, the CPR Puck is enclosed in the electrode pack 110. An acceleration waveform captured by the accelerometer(s) during chest compressions is processed to determine compression parameters. Rate can be determined by identifying inflection points or changes of direction in the acceleration waveform indicating when the acute care provider releases the patient's chest between compressions. Compression velocity or release velocity can be determined by integration of the measured acceleration. Depth is determined by double integration of the measured acceleration. An exemplary system and method for determining chest compression parameters from a measured accelerometer signal is disclosed in U.S. Pat. No. 7,122,014 to Palazzolo et al. entitled "Method for Determining Depth of Chest Compressions During CPR," and may be implemented in embodiments of the present disclosure.

Generally, an acute care provider should fully release the chest between compressions to ensure that the thoracic cavity expands and blood is drawn into the heart between compressions. In order to confirm compression release, the "CPR Puck" can include a release sensor, such as a capacitance touch sensor, light sensor, or pressure sensor, for confirming that the acute care provider releases the chest between compressions. For example, a light sensor can be any device that is used to detect light. Exemplary light sensors include photocells or photoresistors that change resistance when light shines on it, charged coupled devices (CCD) that transport electrically charged signals, photomultipliers that detect light and multiply it, and the like. The light sensor can be configured to detect when it is covered by the acute care provider's hands and when the hands are raised from the sensor indicating full release of the chest compression. Capacitive sensing is a technology based on capacitive coupling between conductive or has a dielectric different than that of air and the sensor. When the acute care provider's hand(s) approaches or touches the capacitive sensor, the touch is identified by a change in capacitance. The level of capacitance and/or degree of change in capacitance can be used by the processor or device to determine proximity of the rescuer's hand(s) to the capacitor sensor pad. An exemplary device for assisting an acute care provider in performing CPR including a proximity sensor for determining whether full release from compression has occurred is disclosed in U.S. Pat. No. 9,387,147 to Elghazzawi et al. entitled "System for Assisting Rescuers in Performing Cardio-Pulmonary Resuscitation (CPR) on a Patient," and may be implemented in embodiments of the present disclosure.

Another resuscitation parameter that can be monitored to assess a quality of chest compressions delivered to the patient is compression pause or compression fraction. During delivery of chest compressions, pauses between or during chest compressions should be minimized so that adequate blood perfusion is maintained throughout the rescue effort. Compression pause tracks an amount of time between compressions during the compression cycle. In a similar manner, compression fraction tracks the percentage of time during the rescue effort when chest compressions are being provided to the patient. During a rescue effort, compressions can be interrupted or delayed by tasks such as providing rescue breaths, pulse checks, and heart rhythm analysis. It has been determined that patient outcomes are substantially improved when any such interruptions are minimized. Information and feedback about compression pause and compression fraction can be determined from the acceleration waveform captured by the CPR Puck.

The ventilation sensor 22 is configured to measure ventilation parameters including tidal volume, minute volume, end-inspiratory pressure, maximum ventilation pressure, and ventilation rate during the acute care event. For example, the ventilation sensor 22 can be configured to monitor ventilations provided to a patient using a manual ventilation unit comprising a ventilation bag, such as the ventilation bag 112 shown in FIG. 1A. One example of a ventilation sensor 22 that can be positioned in the airflow path is an airflow sensor comprising a differential pressure sensor. Such a differential pressure sensor may be attached to a venturi mechanism in the airflow path. A differential pressure sensor may also be provided in coordination with a beam that substantially bisects an air flow path inside sensor. Taps from the differential pressure sensor may extend from discrete sides of the beam, so that the presence and volume of airflow may be determined by the difference in pressure measured between the taps. The beam may be positioned and shaped so as to provide more accurate readings, in known manners. In some embodiments, a differential pressure sensor may include absolute barometric pressure sensors separated by a flow restrictor, for measuring rate of airflow and pressure in the airflow path. In other examples, ventilation sensors 22 can be strain gauges or strain sensors provided on the ventilation bag 112 configured to determine how frequently the bag is being squeezed, and by extension a rate of assisted ventilation being provided to the patient. Exemplary ventilation sensors that can be used with the system 10 are described, for example, in U.S. Pat. No. 9,364,625 to Silver et al. entitled "Wireless Ventilator Reporting" and U.S. Patent Appl. Pub. No. 2017/0266399 to Campana et al. entitled "Flow Sensor for Ventilation," and may be implemented in embodiments of the present disclosure.

Feedback Devices

The system 10 further comprises the at least one feedback device 24 for providing information, instructions, and guidance for performing the resuscitation activities to a user. In some instances, the feedback comprises specific instructions to the user to perform an action. For example, an audio, visual, and/or haptic indicator may emit a sound, light up, or vibrate instructing the acute care provider to perform an action, such as to begin a chest compression, release a chest compression, compress a ventilation bag, or release a ventilation bag. In other examples, feedback comprises quantitative information about resuscitation activities being performed or which have been performed for the patient. For example, feedback could comprise displaying measured numerical values for different resuscitation parameters. Feedback may also comprise graphs and other visual reports summarizing changes in resuscitation parameters over time.

A number of different types of feedback devices can be used with the system 10 for providing feedback to the acute care provider. In some examples, the feedback device 24 can be a portable electronic or computer device 32, such as a tablet, smart phone, smart watch, or personal digital assistant configured to provide guidance for the acute care provider encouraging the acute care provider to provide the resuscitation activity in accordance with the target resuscitation criteria. The portable computer device 32 can comprise components for visual feedback (e.g., a display screen 34, LED indicators, etc.), audio feedback (e.g., speakers 28), and haptic feedback (e.g., a linear actuator 38). In some cases, the portable computer device 32 can also include other electronic components of the system 10. For example, the input device 12 could be a touch screen display and user interface of the portable computer device 32. In a similar manner, the at least one processor 30 of the system 10 can be a processor of the portable computer device 32 in wired or wireless communication with the sensors 20, 22 and other electrical components of the system 10.

Information about resuscitation activities performed for the patient 102 can also be displayed on the visual display 34 of the portable computer device 32 or defibrillator 108 to provide additional guidance for performing resuscitation activities. Information about the patient, such as identifying information (e.g., name, gender, known allergies) and physiological information (e.g., ECG waveform, heart rate, ventilation parameters, etc.) can also be displayed on the visual display along with the resuscitation guidance. In some examples, the feedback device 24 can also provide summary reports following cessation of resuscitation activities and/or following the rescue effort so that acute care providers can review their performance over the course of the rescue effort. In some embodiments, the summary review may include targets for compression and ventilation parameters based on the targets that were used, and which may have changed (e.g., based on patient physical characteristics), during the resuscitation.

In some cases, visual feedback can be provided as numerical values on the visual display 34. For example, a measured numerical value for a resuscitation parameter could be displayed on the visual display adjacent to a target resuscitation criteria value for the parameter so that the acute care provider can see whether he or she is matching the target criteria value. In other examples, feedback can include indications or instructions encouraging the acute care provider to adjust how a resuscitation activity is being performed. For example, the feedback device 24 can be configured to provide an instruction for the acute care provider to increase rate and/or depth, decrease rate and/or depth, or maintain rate and/or depth determined based on the measured resuscitation parameter and target resuscitation criteria. As another example, the feedback device 24 may provide a display that shows the measured numerical value(s) of the relevant resuscitation parameter(s) (e.g., chest compression depth, chest compression rate, ventilation tidal volume, ventilation rate, etc.). If the numerical value(s) are outside of the target criteria, then the display may provide an indication that the acute care provider is not performing according to the current target CPR criteria (e.g., target range for chest compression depth, chest compression rate, ventilation tidal volume, and/or ventilation rate). Such an indication may be provided, for example, as a message on the display, color change of the displayed numerical value, highlight of the displayed numerical value, or other suitable indication that a measured numerical value is out of range. The feedback device may include audio or haptic feedback as well, such as audio and/or vibrating metronome(s) that can be activated to assist the acute care provider in achieving appropriate rates. By providing such indication(s), the acute care provider may be made aware that the associated CPR criteria is not being met and, hence, may alter the manner in which the CPR treatment is applied.

In other examples, the feedback device 24 comprises a therapeutic or monitoring medical device at the acute care scene, such as the defibrillator 108 (shown in FIG. 1A), a mechanical ventilator, or patient monitor, such as a heart rate or ECG monitor. Information and instructions for performing resuscitation activities may be displayed on a screen of the medical device or emitted from speakers of the medical device. For example, an instruction or reminder such as "BEGIN COMPRESSION" or "FULLY RELEASE" could be displayed on the screen instructing the acute care provider to provide chest compressions at the target rate and depth.

In other examples, the feedback device 24 can be a dedicated electronic device for providing feedback about a specific resuscitation activity. For example, a "CPR Puck" device can comprise feedback components, such as a haptic feedback component (e.g., a linear actuator or vibrating motor configured to vibrate when activated) or a visual feedback component (e.g., LED lights that are illuminated to inform an acute care provider when to begin and/or release a compression). A ventilation sensor 22 connected to the patient's airflow path could also include feedback components for guiding the acute care provider in providing ventilations at the target volume and rate. For example, the ventilation sensor 22 can include LED indicator lights or a speaker mounted to a housing of the ventilation sensor 22. The indicator lights or speaker could be configured to provide an indication to the acute care provider when ventilations are being provided too quickly or when ventilation volume meets or does not meet a target criteria. In some examples, the indicator lights or speaker light up or emit a sound to instruct the acute care provider to compress or release the bag once the target ventilation volume is obtained.

Resuscitation Feedback Displays

In some examples, the resuscitation feedback and guidance are provided to the acute care provider in the form of a visual display comprising visual indicators, such as gauges, numerical values, and text, which convey information about the patient, resuscitation activities, and rescue effort. The visual display can be provided on a portable computer device, such as the portable computer device 32 (examples shown in FIG. 1B), such as a smart phone, smart watch, tablet, or on a screen 26 of a medical device, such as a screen of the defibrillator 108 (shown in FIG. 1A). For example, a visual display can comprise information about the rescue effort (e.g., duration of rescue effort or time until a resuscitation activity ceases), the rescue scene (e.g., location information, environmental hazards), and/or patient (e.g., patient age/weight, down time, known allergies or medications taken).

In some instances, the information is derived from the manual data input or keyboard 14 and resuscitation sensors 20, 22. Information can also be derived from images captured by the input devices, such as the camera 16 and three-dimensional imaging systems 18, present at the rescue scene. For example, captured images/video can be processed and analyzed to determine resuscitation quality parameters including chest compression depth, chest compression rate, and others. The visual display can also include information from other sources, such as patient monitors, therapeutic medical devices, and physiological sensors, connected to the patient.

Figure 8A:
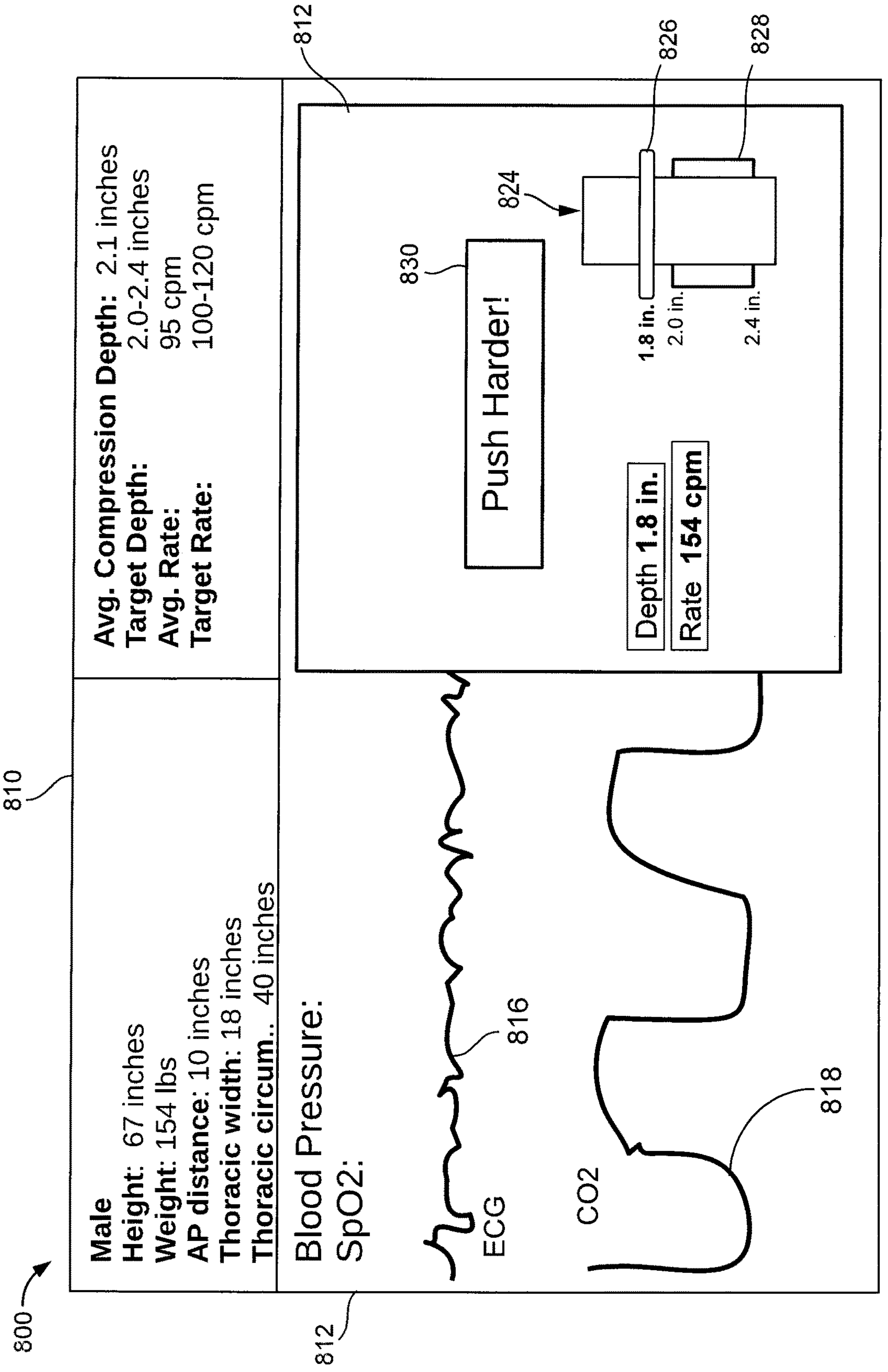
FIG. 8A is a display of a portable medical device including indicators providing resuscitation guidance for an acute care provider according to an embodiment of the disclosure.

An exemplary visual display 800 for the system 10 which can be used to provide resuscitation guidance and feedback for an acute care provider is shown in FIG. 8A. The display 800 includes a patient information section 810, a physiological condition section 812, and a resuscitation guidance section 814. The patient information section 810 comprises information about physical features of the patient. For example, information about the patient's height, weight, gender, AP distance, chest (e.g., thoracic) width, chest circumference, or other measurements could be displayed in the information section 810. The patient information could be entered manually into the system 10 by one of the acute care providers at the rescue scene. In other examples, as described herein, physical features of the patient can be determined from information captured by the three-dimensional imaging system, such as camera(s) and/or three-dimensional scanner. In some instances, the patient information section 810 could also include an image or graphical representation of the patient and/or of a portion of the patient's body. For example, a portion of the generated three-dimensional representation of the patient could be shown on the display 800. Messages or notifications could be displayed along with the three-dimensional representation overlaying or adjacent to portions of the patient's body to which to messages or notifications pertain.

In some examples, the physiological information section 812 of the display 800 comprises visual indications representative of patient physiological measurements. For example, the physiological information section 812 can comprise graphs or waveforms for different physiological parameters of the patient relevant to the rescue effort and/or to the resuscitation activity being performed by the acute care provider. For example, as shown in FIG. 8A, an ECG waveform 816 and a carbon dioxide waveform 818 are illustrated. The physiological information section 812 can further comprise numerical values representative of physiological measurements of the patient. For example, a numerical value for blood pressure, pulse oxygen ($SpO_2$), and other parameters of interest for the patient can be displayed in the physiological information section 812.

The resuscitation guidance or feedback section 814 of the display 800 may comprise measured resuscitation parameters and target resuscitation criteria for resuscitation activities being performed for the patient. For example, as shown in FIG. 8A, the display 800 includes a compression depth icon 824 including an indicator 826 displaying a compression depth and a target range indicator 828 representative of a lower bound (e.g., 2.0 inches) and an upper bound (e.g., 2.4 inches) for the target depth range. The acute care provider may be instructed to continue to apply pressure to the chest until the indicator 826 is maintained within the area identified by the target range indicator 828. When the indicator 826 is positioned within the area of the indicator 828, the compression depth has been maintained within the target depth range and the acute care provider can be instructed to release the compression.

The numerical value corresponding to each compression depth may be provided on the display, with resolution of at least one tenth (example shown in FIG. 8A as 1.8 inches), along with the numerical value for the chest compression rate. When the acute care provider is not performing according to the current target CPR criteria (e.g., criteria being 2.0-2.4 inches for depth and 100-120 cpm for rate, which may be a default criteria), the numerical values themselves may change color or be highlighted so as to alert the person performing chest compressions that the particular parameter is out of range. In FIG. 8, a depth of 1.8 inches is outside of a target compression depth range of 2.0-2.4 inches, and a rate of 154 cpm is outside of a target compression rate range of 100-120 cpm. However, in keeping with embodiments disclosed herein, based on measured physical features of the patient, the CPR criteria may differ from a default criteria. For example, a relatively small pediatric patient may have physical features that correspond to a target compression depth range of 1.5-2.0 inches and a target compression rate range of 140-160 cpm; in such a case, a depth of 1.8 inches and a rate of 154 cpm is within the target criteria. Hence, the feedback device would provide an indication (visual, audio, haptic) that the CPR parameter(s) are within range; or rather, the feedback device would simply provide the CPR parameter(s) on display, yet not provide an express indication that the CPR parameter(s) are not within range (e.g., no conspicuous message, color change, or highlighting indicating that the rescuer should change the manner in which CPR is applied would be provided).

The resuscitation guidance section 814 can also comprise text instructions guiding the user through different aspects of the resuscitation activity. For example, a text instruction 830 to "FULLY RELEASE" or reminder to release may be displayed when the compression reaches the target depth. Text instructions for the user to "BEGIN COMPRESSIONS" or "STOP COMPRESSIONS" could also be displayed to the acute care provider at an appropriate time, for example, to initiate compressions at the start of a CPR interval or to cease compressions for a brief period for ECG shock analysis to occur. In some examples, the feedback section 814 can also include numerical values illustrative of a quality of chest compressions over time. For example, as shown in FIG. 8A, a numerical value for average compression depth and average compression rate (compressions per minute) can be displayed. Target criteria ranges for the depth and rate can be displayed adjacent to the average values for comparison. When the system 10 is configured to periodically update measurements of physical features of the patient, the display 800 can further comprise a countdown timer 836 indicating a time remaining until the target criteria are updated.

Figure 8B:
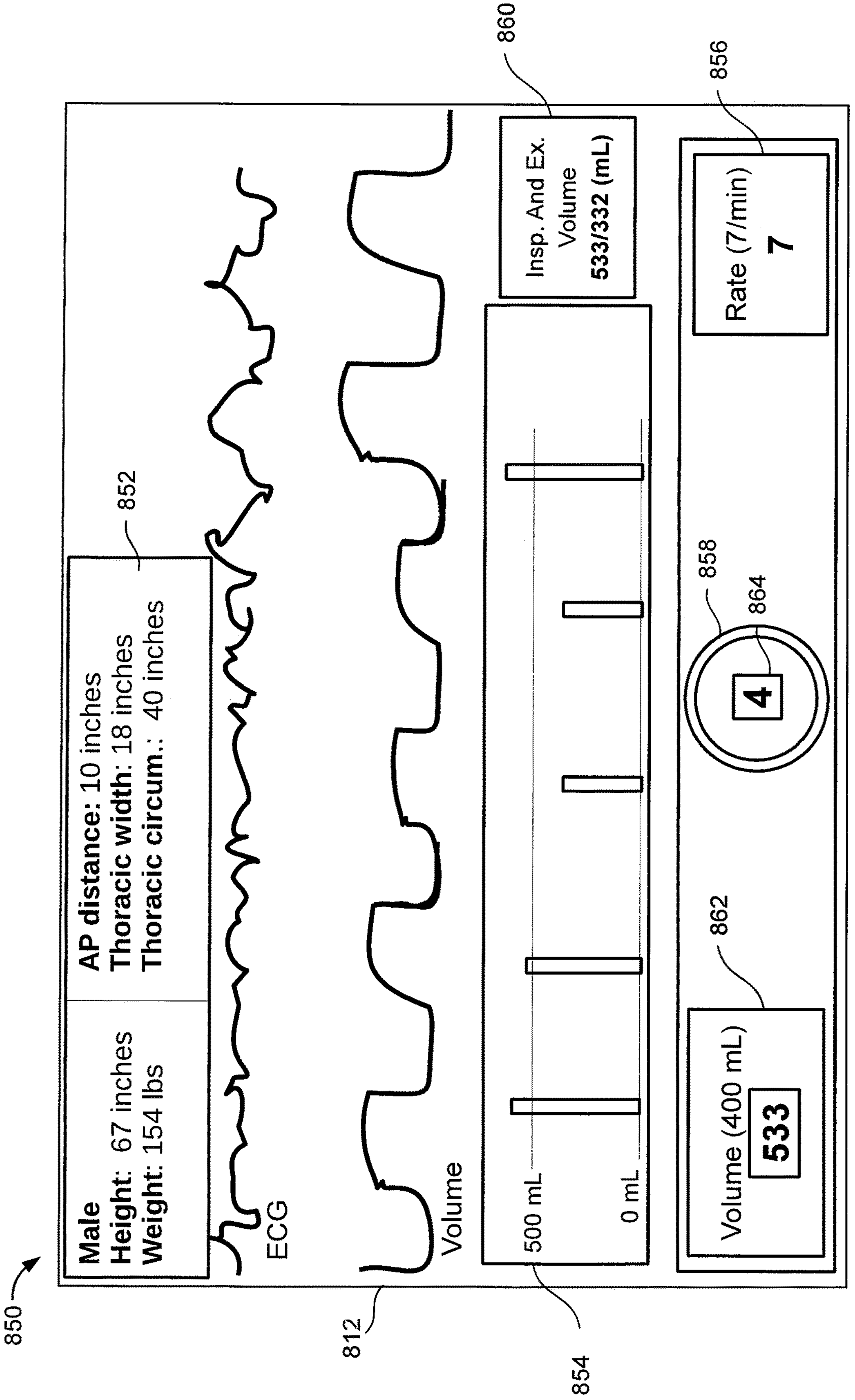
FIG. 8B is a display of a portable medical device including indicators providing ventilation guidance for an acute care provider according to an embodiment of the disclosure.

Another exemplary visual display 850 is shown in FIG. 8B, which provides ventilation guidance and feedback for an acute care provider. The display 850, which can be configured to appear on a display screen of a feedback device when airflow is detected passing through a patient's airflow path, includes, for example, patient information 852, ventilation history information 854, and numerical ventilation volume indicator(s), such as a ventilation rate indicator 856 and a ventilation volume indicator 862. The display 850 can also include numerical values 860 for inspiratory volume and/or expiratory volume for each positive pressure breath ventilation. The display 850 can also include a ventilation performance indicator 858, which is based on target ventilation criteria (e.g., target tidal volume, target ventilation rate).

As in previous exemplary display screens, the patient information 852 can include information about physical features of the patient including, for example, information about the patient's height, AP distance, chest (e.g., thoracic) width, chest circumference, or other measurements. Other non-physical features which are not able to be measured, such as age or gender may also be included, though as discussed herein, certain physical feature measurement(s) may be used as surrogate(s) to estimate non-physical features such as age or gender. The patient information 852 could be entered manually into the system 10 by one of the acute care providers at the rescue scene. In other examples, as described herein, physical features of the patient can be determined from information captured by the three-dimensional imaging system, such as camera(s) and/or three-dimensional scanner.

The ventilation volume indicator 962 includes a measured ventilation volume of 433 mL. The target ventilation volume of 400 mL is also displayed next to the measured value. Since the measured value of 533 mL overly exceeds (e.g., beyond 10% from the target) the target value, the measured value of 533 is highlighted or enclosed in a colored box to indicate to the acute care provider that the measured value is outside of the target range. The ventilation rate indicator 856 displays a measured ventilation rate of 7 breaths per minute. A target rate of 7 breaths per minute is also displayed next to the measured rate. Since the measured rate of 7 breaths per minute meets the target rate, the measured rate is displayed in normal text and is not highlighted or enclosed in a shaded box. If the measured rate were found to exceed the target rate or be insufficient, then the rate indicator 856 could be highlighted to indicate to the acute care provider that a measured value does not meet the target value.

The visual display 850 also includes the ventilation performance indicator 858 for providing feedback to the acute care provider about a quality and/or probable impact of ventilations provided to the patient. In some examples, the ventilation performance indicator 858 can comprise a graphic of a circular region that fills as inspiratory air is detected by an airflow sensor in the patient's airflow path. After the breath is over, the circular region may change color depending on whether a sensed ventilation rate and/or volume are within a target range for the respective ventilation parameter, such as a target range determined based on physical features of the patient as provided by the system 10 and processes disclosed herein. In some instances, the circular region may display a green color, or another appropriate color, if both the measured ventilation rate and volume fall within the target ranges. If either of the ventilation volume or ventilation rate falls outside of the target range, the circular region may display a different color, such as yellow, orange, red, or another color, indicating that one of more parameters are out of range. For example, if the patient is under-ventilated (e.g., given a volume lower than the lower bound of the target range) or over-ventilated (e.g., given a volume that exceeds the upper bound of the target range), then the circular region of the ventilation performance indicator 858 may depict a yellow warning color or other suitable color, and the numerical ventilation volume indicator 860 may also change to a similar color (e.g., yellow). Similarly, if the measured ventilation rate does not fall within the generated target range, then the circular region of the ventilation performance indicator 858 may illuminate a yellow warning color or other suitable color, and the numerical ventilation rate indicator 860 may also exhibit a similar change in color.

As shown in FIG. 8B, the ventilation performance indicator 858 may include a numerical countdown timer 864 located within the circular region. Once the numerical countdown timer counts down to 0 (e.g., counting down by seconds or another time period), the circular region empties and a "Ventilate" prompt may appear in place of the countdown timer 864. The prompt instructs the acute care provider to apply a positive pressure ventilation to the patient (e.g., by squeezing the ventilation bag). If no breath is detected after a period of time (e.g., 3-5 seconds), then the "Ventilate" prompt can begin to flash. If no breath is detected after a subsequent period of time (e.g., another 3-5 seconds), then the circular region itself may flash and optionally changes color to warn the user that a ventilation should be given. Alarms (e.g., audible, visual, tactile) may also be triggered to provide an additional warning for the user that a ventilation action should be taken.

Resuscitation Guidance System Using a Portable Computer Device

Figure 9:
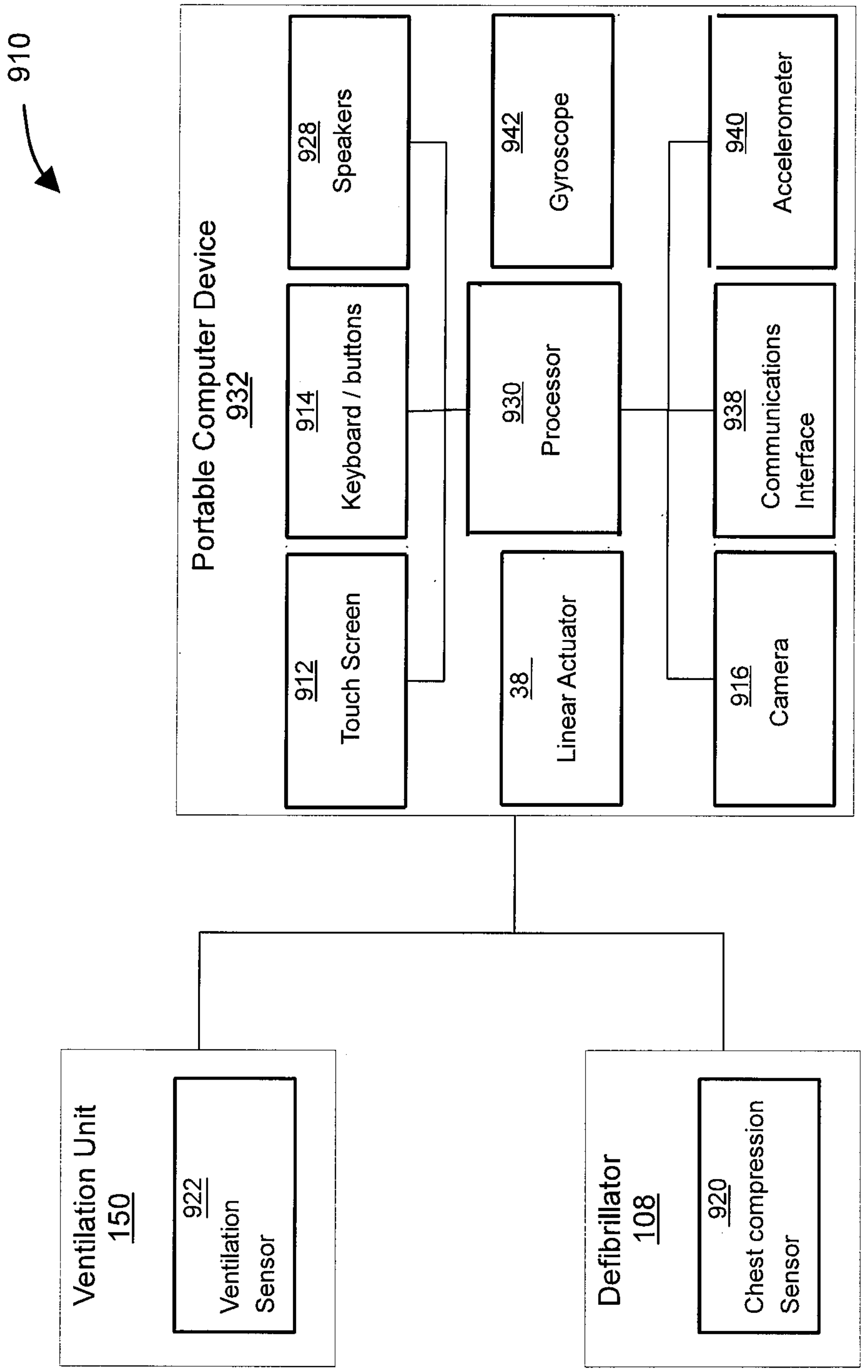
FIG. 9 is a schematic drawing of electrical components of another example of a resuscitation guidance system including a portable computer device according to an embodiment of the disclosure.

Another exemplary system 910 for providing resuscitation guidance based, at least in part, on physical features of a patient is shown in FIG. 9. As in previously described examples, the system 910 can be configured to obtain information about physical features of a patient and process the information to determine target resuscitation criteria for the patient based on the physical features. The system 910 can also be configured to determine resuscitation parameters for resuscitation activities performed for the patient and provide feedback about whether measured resuscitation parameters match the target resuscitation criteria. Advantageously, many of the electrical components of the system 910 can be contained in a single handheld electronic device 932, such as a smart phone, computer tablet, or personal digital assistant device, which can be easily carried to the rescue scene by the acute care provider.

The system 910 comprises at least one input component for providing information representative of at least one physical feature of the patient measured during the acute care event. For example, the input component can be a touch screen 912 or buttons 914 of the device 910, which allows the user to manually enter information about the rescue effort and patient including measurements of physical features of the patient. The input component 912 can further comprise a camera 916 of the portable electronic device 932. The camera 916 can be used to capture images of the rescue scene and patient. Captured images can be processed to determine information about physical features of the patient. In some instances, the portable electronic device 932 is configured to provide instructions for the acute care provider regarding how and when to capture images of the patient. For example, prior to commencing resuscitation activities, the acute care provider may be instructed or otherwise trained to hold the portable electronic device 932 a specified distance above the patient's chest and to capture images of the patient at the specified position. In other examples, the acute care provider may be instructed or trained to move the camera 916 along the patient's body maintaining a specified distance between the camera 916 and patient to obtain a video image of the patient.

The system 910 further comprises at least one processor 930 communicatively coupled with the camera 916 and touch screen 914. The at least one processor 930 can be a processor of the portable electronic device 932. In other examples, the at least one processor 930 is remote from the portable electronic device 932 and configured to send and receive data and/or signals from the remote electronic device 932. For example, the portable electronic device 932 can be configured to transmit data including information relevant for determining physical features of the patient, as well as resuscitation parameter information and patient physiological information to the remote processor. The remote processor can be configured to transmit resuscitation feedback and/or instructions for obtaining additional information to the portable electronic device 932.

In order to facilitate communication between the at least one processor 930 and other components of the system 910, the portable electronic device 932 can comprise a communications interface 938 configured to transmit patient information, physical feature information, and other data between the portable electronic device 932 and the other system components. The communications interface 938 can comprise short range and/or long range data communications features, such as a wireless data transceiver, for wireless communication between the device 932 and other components. Exemplary short range wireless data transmitters or transceivers that can be used with the system 910 include transceivers, such as BLUETOOTH® or ZigBee. The communications interface 938 can further comprise circuitry for long-range data transmission, using a long-range data transmitter or transceiver, for example, a WiFi transmitter or a cellular transmitter (e.g., 3G or 4G enabled systems). Data collected by the device 932 can be sent to external sources by the long-range data transmitter or transceiver. For example, data can be transmitted to an external electronic device, computer network, or database using the long-range data transmission capabilities of the portable electronic device 932.

The system 910 further comprises at least one resuscitation sensor, such as a chest compression sensor 920 or ventilation sensor 922, configured to obtain signals indicative of resuscitation activities performed for the patient during the rescue event. In some examples, the chest compression sensor 920 or ventilation sensor 922 are separate devices in wired or wireless communication with the portable electronic device 932 and the at least one processor 930 over, for example, a short range data transmission protocol, such as BLUETOOTH®. For example, the sensors 920, 922 can be part of a defibrillator 108 or ventilation unit 150. In that case, the chest compression sensors 920 and/or ventilation sensors 922 function in a similar manner to sensors described in connection with the previous embodiments.

In some examples, the resuscitation sensor can be a component of the portable electronic device 932. For example, the resuscitation sensor can be an accelerometer 940 or gyroscope 942 of the portable electronic device 932 contained within a housing of the device 932. The accelerometer 940 and gyroscope 942 can be configured to sense movement of the portable electronic device 932, which can be used to determine information about resuscitation activities being performed for the patient. For example, the portable electronic device 932 can be placed on the patient's chest and used to detect information representative of chest compressions performed for the patient. As described in previous examples, acceleration and direction information recorded by the accelerometer 940 and gyroscope 942 can be used to determine parameters for chest compressions including compression depth and rate.

With continued reference to FIG. 9, the system 910 further comprises the feedback device for providing guidance for how the resuscitation activity should be performed for the patient. In some examples, the feedback device can be any of the feedback devices described in previous examples, including computer tablets, smart phones, smart watches, medical devices, the CPR Puck, or ventilation feedback devices, in wired or wireless communication with the portable electronic device 932. In that case, the portable electronic device 932 can be configured to transmit instructions to the feedback device, causing the feedback device to provide an indication for the acute care provider of whether the at least one chest compression parameter meets the target chest compression criteria. The feedback device(s) can be configured to receive the transmitted signal and provide feedback regarding the performed resuscitation activity in accordance with instructions provided by the portable electronic device 932 and/or at least one processor 930.

In other examples, feedback can be provided on the portable electronic device 932 itself. For example, the at least one processor 930 can cause the portable electronic device 932 to provide visual feedback on, for example, the touch screen display 912 of the portable electronic device 932. The portable electronic device 932 can cause the touch screen 912 to display indications of whether measured resuscitation parameters match target resuscitation criteria. The portable electronic device 932 can also display instructions for the user to improve a quality of resuscitation activities being performed for the patient, such as an instruction to increase compression/ventilation rate, decrease compression/ventilation rate, or maintain a current compression/ventilation rate. Feedback can also be provided from other components of the portable electronic device 932. For example, audio feedback can be emitted from speakers 928 of the portable electronic device 932. Haptic or vibration feedback can be provided from a linear actuator 944 of the portable electronic device 932.

Processes for Determining Target Resuscitation Criteria and Providing Feedback

The at least one processor 30, 930 of the system 10, 910 can be configured to perform a number of different processes for receiving data from system sensors and input devices, processing received data to determine target resuscitation criteria, and providing feedback to a user, such as an acute care provider, about resuscitation activities performed for the patient. In some cases, the at least one processor 30, 930 can also be configured to periodically update resuscitation criteria or to provide recommendations for types of chest compressions to perform based on changes in physical features of the patient.

Figure 10:
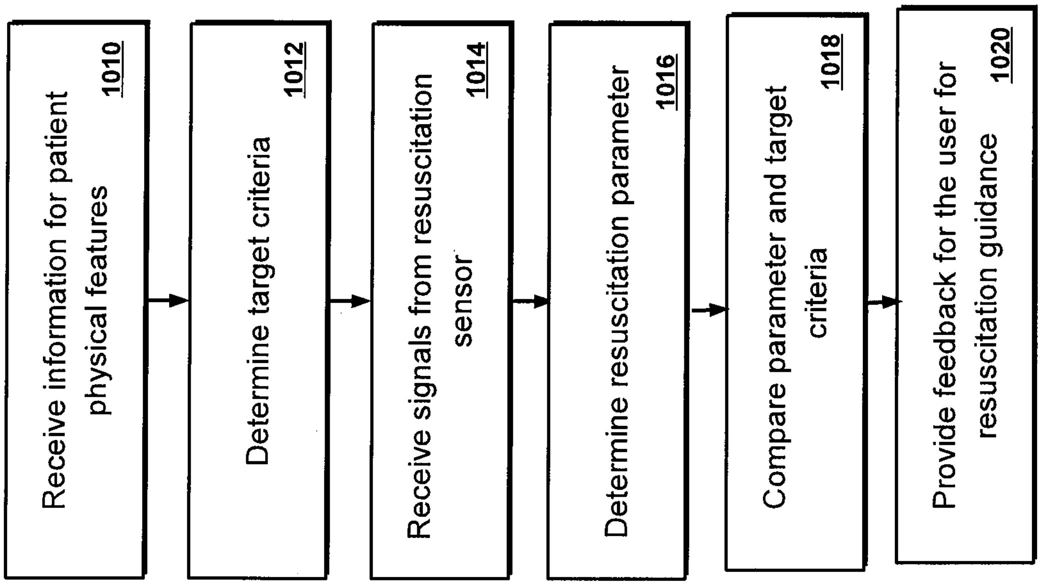
FIG. 10 is a flowchart illustrating steps for determining measurements for physical features of a patient and providing feedback and guidance for an acute care provider providing resuscitation activities for the patient according to an embodiment of the disclosure.

With reference to FIG. 10, according to one exemplary process performed by the at least one processor, at 1010, the at least one processor is configured to receive and process the information representative of the at least one physical feature of the patient from an input device. The type of physical feature received by the processor is generally dependent on the type of resuscitation activity being performed for the patient. For example, physical features relevant for providing feedback about chest compressions can include the anterior-posterior (AP) distance of the patient's cardiothoracic region, width of the patient's cardiothoracic region, and circumference of the patient's cardiothoracic region. Relevant physical features could also include a height of the patient, or other aspects of the patient. Physical characteristics, such as patient weight, age, or gender may also be received by the at least one processor and used to determine target resuscitation criteria (e.g., age may provide an indication or confirmation of whether the patient is adult or pediatric, gender may provide an indication or a target ventilation volume). Physical features relevant for providing feedback about a quality of ventilations provided to a patient can include patient height, weight, body-mass index (BMI), and ideal body weight (IBW). Relevant parameters and target criteria for ventilations can include tidal volume, minute volume, end-inspiratory pressure, maximum ventilation pressure, and ventilation rate during the acute care event. Some target criteria can be determined based on a single physical feature of the patient. In other examples, the target resuscitation criteria values are determined based on multiple patient parameters. For example, chest compression depth can be based on a combination of AP distance and at least one of cardiothoracic width or circumference.

Depending on the type of physical feature data being collected and the monitoring or recording devices present at the rescue scene, the input device for receiving the information representative of the at least one physical feature can be a manual data entry accessory or a three-dimensional imaging system, such as a camera or three-dimensional scanner. As described in connection with the various embodiments of the system 10, 910, the processor can be electrically connected to the input device(s) by a wired or wireless connection. Depending on processing capabilities of the system, a position of the input device or camera, and other factors, information can be sent from the input device to the at least one processor continually or on a periodic basis, which may allow for updating of the physical feature(s) and, hence, the target CPR criteria and/or suggested CPR technique. In some examples, information transfer is initiated by a user. For example, information may be transferred from the input device to the at least one processor each time that the user captures an image of the patient and/or acute care scene.

At 1012, the processor uses the received and processed information to determine a target resuscitation criteria based on the at least one physical feature of the patient. Target resuscitation criteria can include compression targets (e.g., compression depth, compression rate, or compression fraction) and/or ventilation targets (e.g., tidal volume and rate) as described previously. In some instances, determining the target CPR criteria comprises obtaining information from a lookup table, such as a lookup table organized based on AP distance and/or patient height and weight. An exemplary lookup table correlating AP distance, cardiothoracic width, and compression depth is shown in Table 5.

In other instances, resuscitation criteria values are calculated using equations for generating resuscitation criteria values based on physiological features of the patient as inputs. For example, an equation (e.g., a linear or non-linear regression equation) could be used to determine an optimal compression depth based on physical features, such as AP distance, thoracic circumference, and/or thoracic width. For example, the following equation may be used to determine a target compression depth for patients having heights in the range of 20-48 inches: Compression depth=0.75 AP−(H*AP)/96, where "H" is patient height, and "AP" is the AP distance. In some embodiments, additional non-physical characteristics may be used, such as patient gender, for instance by assigning binary values (e.g. '0'=male; '1'=female), or estimated or actual age.

In some instances, the received information about a physical feature of the patient is also used to make determinations about a type of patient being treated. For example, the at least one processor can be configured to recognize whether a patient is a pediatric patient or an adult patient based, for example, on a physical feature such as height, head circumference, hand or foot features, facial features or other anthropometric features or estimated or actual weight of the patient. In some instances, the at least one processor can also distinguish between types of pediatric patients. For example, a pediatric patient can be classified as at least one of a neonate, an infant, a small child, or a large child based on patient physical features determined by the at least one processor.

At 1014, the at least one processor is further configured to receive signals from the resuscitation sensor, such as the chest compression sensor and/or ventilation sensor. At 1016, the processor processes the received signals to identify resuscitation parameters for resuscitation activities being performed for the patient. The signals can comprise, for example, accelerometer data from a CPR Puck, as well as data from a sensor for determining whether release of the chest has occurred (e.g., proximity sensor), pressure sensor, or gyroscope to provide additional information regarding a quality of chest compressions provided to a patient. Data from the ventilation sensor can include, for example, pressure measurements indicating a pressure in the patient air path. The pressure data could be used to calculate a flow volume or flow rate of air through the airflow path. Data representing a pressure in the air path could also be used to calculate parameters, such as ventilation rate (e.g., number of ventilations per minute) and or maximum ventilation pressure, which may also be relevant in determining a quality of ventilations provided to a patient.

Once target resuscitation criteria and resuscitation parameters are known, at 1018, the at least one processor is configured to compare the measured resuscitation parameters to the target resuscitation criteria. Results of the comparison can be representative of a quality of treatment being provided to the patient. Results of the comparison can also be used to provide feedback or guidance to acute care providers encouraging the acute care providers to more closely match their performance to the target values. In some instances, the comparison between the measured resuscitation parameters and target criteria is a determination of whether the parameter matches the target. In other instances, the at least one processor can be configured to record information such as how often the measured parameter matches the target, a percentage of time during a rescue effort in which the acute care provider meets and/or does not meet the target, or an average difference between the measured parameter and target. For example, the at least one processor can be configured to determine a percentage of time during a rescue effort in which the measured chest compression parameter meets or does not meet the target chest compression criteria and to cause the feedback device to provide an indication to the user when the percentage of time exceeds a predetermined value. In some cases, the measured resuscitation parameter and the target resuscitation criteria do not substantially match when there is more than a 5% difference between the measured resuscitation parameter and the target resuscitation criteria.

In some examples, the at least one processor can be configured to provide recommendations to the user to improve chest compression quality when, for example, the acute care provider fails to match the target criteria on a regular basis. The at least one processor may be configured to cause the feedback device to recommend that the acute care provider begin applying chest compressions using a different technique. For example, if the acute care provider is providing single-palm chest compressions for a pediatric patient, but having trouble reaching the target compression depth, the at least one processor may cause the feedback device to provide an instruction to switch to two-palm chest compressions. In a similar manner, if an acute care provider performing two-palm chest compression for a patient regularly exceeds the target compression depth, the at least one processor may cause the feedback device to instruct the acute care provider to switch to single-palm compressions. In order to ensure that acute care providers see and appreciate instructions to switch techniques, the acute care provider may be required to select an acknowledgement button on the portable computer device or medical device to indicate that he/she has seen and appreciated the instruction to switch compression techniques.

The at least one processor is further configured to provide feedback for the acute care provider based on the comparison between the resuscitation parameter(s) and target resuscitation criteria, as shown at 1020. Feedback can include an instantaneous indication of whether a resuscitation activity matches the target criteria. For example, the system can display indicia, such as gauges, icons, or numerical values indicating to the acute care provider whether the resuscitation activities being performed match target values. In other examples, feedback can comprise summary reports provided either during the rescue effort or after cessation of resuscitation activities showing results of a comparison between measured resuscitation parameters and target values for a predetermined time interval or for the entire rescue effort.

Figure 11:
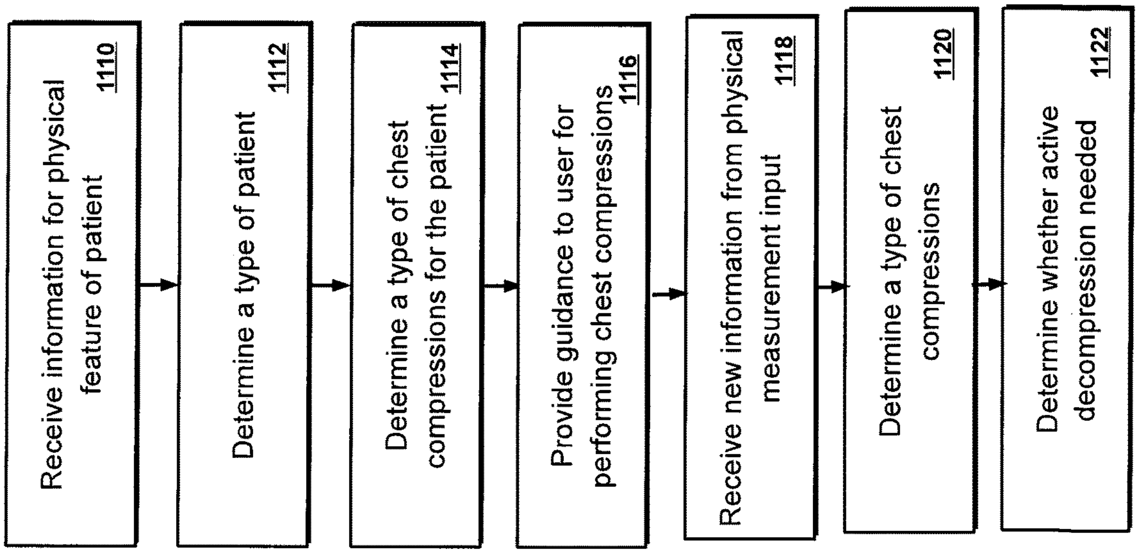
FIG. 11 is a flowchart illustrating steps for determining a type of patient and type of resuscitation activity to be performed for a patient based on measurements of physical features of the patient according to an embodiment of the disclosure.

Another exemplary process for providing guidance and feedback about resuscitation activities based on patient features is shown in FIG. 11. As shown at 1110, the at least one processor receives information representative of at least one physical feature of the patient, or a plurality of physical features. At 1112, the received information is processed, to determine a type of patient being treated. For example, the type of patient can be a pediatric patient or an adult patient, determined based on patient height or weight. In some examples, patients are further classified as a neonate, an infant, a small child, a large child, a small adult, an average size adult, or a large adult. At 1114, the at least one processor can be configured to select a recommended type of chest compressions or chest compression technique for the patient based on the physical features of the patient. As described above, two palm chest compressions are often performed for patients age 8 or older. One palm chest compressions are performed for patients between 1 year and 8 years old. Two finger or encircled thumb chest compressions are often performed for infants and neonates, less than 1 year old. Once a recommended chest compression type or technique is selected, at 1116, the at least one processor causes the feedback device to provide an indication to the user about the recommended chest compression type. In some instances, the guidance may comprise displayed text informing or suggesting the acute care provider of what chest compression technique to perform. In some cases, the at least one processor can cause the feedback device to provide more detailed instructions for how a chest compression technique should be performed. In some instances, the acute care provider may be required to affirmatively acknowledge the instruction. For example, the acute care provider may press a button on a portable computer device or medical device indicating that he/she has seen the instruction for the recommended chest compression technique and will begin performing the recommended technique. In some examples, the acute care provider may be able to reject the recommended technique or request that the system provide a new recommendation by pressing an appropriate button on the portable computer device or medical device.

Once the instruction is acknowledged, the acute care provider can begin providing chest compressions using the recommended technique, and can continue providing chest compressions for a predetermined or indefinite period of time. As chest compressions are being performed, the at least one processor can be configured to monitor a quality of chest compressions being provided to the patient based on signals received from resuscitation sensors associated with the patient and/or acute care provider. Following a predetermined time period, at 1118, the at least one processor can be configured to receive new information about the at least one, or a plurality of physical features of the patient. This new information about the physical feature of the patient may indicate that remodeling of the patient's chest has occurred as a result of the chest compressions. At 1120, the at least one processor can determine whether a different type of chest compressions would be more effective for providing treatment to the patient. Similarly, at 1122, the at least one processor determines whether active decompressions should be applied to the patient based on the received updated information representative of physical features of the patient. As previously described, an instruction to begin performing active decompressions may comprise an instruction to begin using a suction cup device, an adhesive device configured to be attached to the patient's chest, or a hook and loop fastener (e.g., Velcro®) device. In some instances, an instruction to perform active decompressions can comprise an instruction to perform compressions of the patient's sides or abdomen.

Figure 12A:
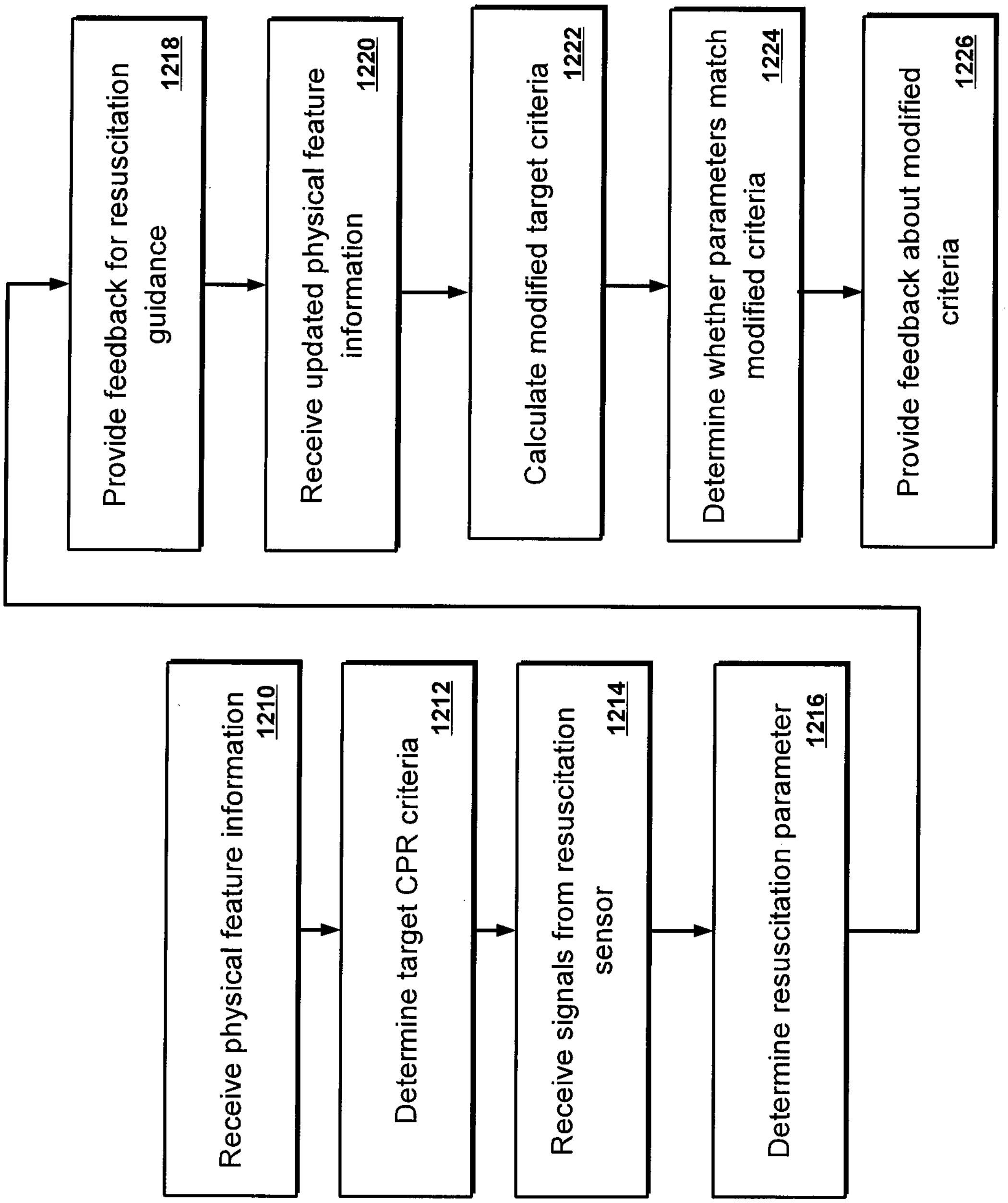
FIG. 12A is a flowchart illustrating steps for determining modified or updated target resuscitation criteria for resuscitation activities performed for a patient according to an embodiment of the disclosure.

With reference to FIG. 12A, a process for determining and updating target chest compression criteria based on updated information about the physical features or based on information about one or more new physical features of a patient is illustrated. At 1210, information representative of physical features of the patient is received from an input device of the system, as occurs in previously described exemplary processes. The at least one processor is configured to process the received information to determine target resuscitation criteria for the patient at 1212. As in previous examples, the target resuscitation criteria can be extracted from a lookup table populated with target resuscitation criteria values based on patient physical features. In other examples, target resuscitation criteria are calculated based on equations derived from experimental data. At 1214, the at least one processor receives signals from at least one resuscitation sensor, such as a chest compression sensor configured to measure signals representative of chest compressions performed for the patient. At 1216, the processor determines resuscitation parameters for chest compressions performed for the patient based on the signals received from the chest compression sensors.

As chest compressions are performed, the at least one processor can be configured to cause a feedback device to provide resuscitation guidance at 1218. In some instances, as described herein, the guidance informs the acute care provider whether or not chest compressions being performed match target criteria for chest compressions determined based on physical features of the patient. In other examples, feedback can comprise instructions (e.g., "BEGIN COMPRESSION", "FULLY RELEASE COMPRESSION", "SPEED UP COMPRESSIONS", "SLOW DOWN COMPRESSIONS") encouraging the acute care provider to more closely follow target criteria values.

After a predetermined time period, the at least one processor can be configured to receive updated physical feature information for the patient, as shown at 1220. In some instances, information representative of the updated physical features is received by the processor automatically. For example, three-dimensional imaging systems such as cameras or three-dimensional scanners at the rescue scene can be configured to automatically obtain an image of the patient according to a predetermined schedule. In other instances, an acute care provider may be instructed to manually obtain images of the patient after performing chest compressions for the predetermined period of time. The period of time can be a preselected value based, for example, on estimates about how long it takes for remodeling of the cardiothoracic region to occur, or simply the typical length of time of a chest compression interval. In other examples, the predetermined period of time can be a time period selected by the at least one processor. In some instances, a duration of the predetermined period may be based on physical features of the patient or the type of resuscitation activity being performed for the patient. For example, physical features relevant for determining ventilation parameters, such as ventilation volume and rate (e.g., patient height and weight) do not change during the rescue effort. Accordingly, when ventilations are being provided to the patient, it may not be necessary to obtain new physical feature information and recalculate target values on a regular basis. In contrast, performing chest compressions can cause remodeling of the thoracic cavity. As a result of such remodeling, target resuscitation criteria for chest compressions may need to be recalculated on a regular basis. A duration of the predetermined period between receiving updated physical feature information can also be based on physical features of the patient. For example, effects of remodeling caused by chest compressions may be more pronounced for smaller patients or lighter patients (e.g., a patient with low body weight relative to height, small AP distance, and/or small chest circumference). Remodeling may be less likely to occur for larger, heavier, or stronger patients, meaning that physical feature information needs to be updated less frequently (e.g., the predetermined period between updates can be longer).

At 1222, once the updated information representative of the patient's physical features is received, the at least one processor can be configured to calculate modified target chest compression criteria based on the received updated physical feature information for the patient. At 1224, the at least one processor is configured to determine whether chest compression parameters for compressions performed by the acute care provider meets the modified target chest compression criteria. At 1226, the at least one processor can be configured to cause the feedback device to provide an indication for the user of whether the at least one chest compression parameter meets the modified target chest compression criteria. The feedback device can also be configured to provide feedback to the acute care provider about changes in target chest compression parameters. For example, the processor may cause the feedback device to provide an indication for the acute care provider when the modified target chest compression criteria differs from the initial target chest compression criteria In other examples, the at least one processor can be configured to receive information for a new or different physical feature of the patient and use the new information to determine a modified chest compression target criteria. For example, upon initial set up of the system, the at least one processor may receive a physical feature of the patient such as height and/or weight. The at least one processor may determine a wide acceptable range for target chest compression criteria. Over the course of the rescue event, the at least one processor can receive information representative of other physical features of the patient (e.g., AP distance, thoracic circumference, lateral width of the chest) from the input device. When the additional information is received or existing measurements of physical features are updated, the at least one processor can determine modified target resuscitation criteria including, for example, a narrower range of acceptable target values, based on the combination of the initially received physical features and the other physical feature information received during the acute care event.

In some examples, the at least one processor can be configured to generate and maintain a record of past modified target chest compression criteria and recorded chest compression parameters corresponding to each of the past modified target chest compression criterion over the course of a rescue event. For example, modified target chest compression criteria and recorded chest compression parameter information could be stored on computer readable memory associated with the at least one processor. Recorded information could also be continuously or periodically transmitted to a remote computer device or server for further processing and/or long term storage. Information about past target chest compression criteria and/or comparisons between target criteria and measured parameters can be used to generate a visual summary of a performance of acute care providers during a rescue effort. For example, the summary may comprise graphs showing target criteria for different periods of time during the rescue effort and whether the acute care provider met the targets for the different time periods. Such graphs may help acute care providers to see which targets were met most often and which targets were more difficult to meet. The graph may also show effects of, for example, rescuer fatigue on a quality of care provided to the patient over the course of the rescue effort.

Figure 12B:
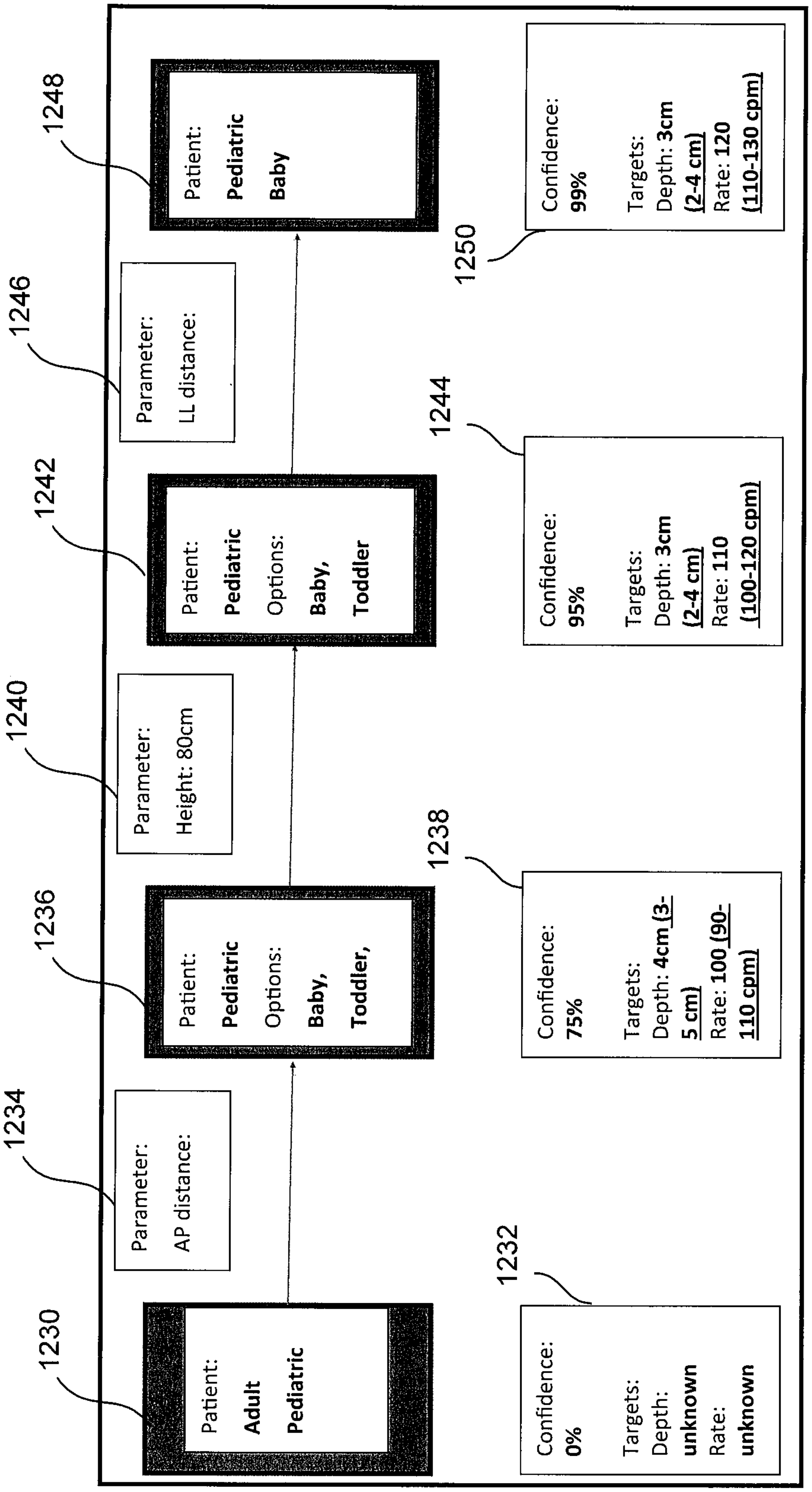
FIG. 12B is a flow chart of a process for determining target parameters for a patient and for refining the target parameters based on received additional information about physical features of the patient according to an embodiment of the disclosure.

A flow chart illustrating a process for determining, refining, or honing in on appropriate target parameters for a patient is illustrated in FIG. 12B. The process shown in FIG. 12B can be performed by at least one processor of a system for assisting a user in performing chest compressions, as described herein. Results of the process including target parameter values, confidence levels for the target parameter values, estimates of a type of patient (e.g., Pediatric or Adult), and physical feature measurements for the patient can be displayed to a user using a suitable user interface display or feedback device, as described herein. The displayed information can be updated over the course of a rescue event, as additional information about the patient becomes available. The user interface or feedback device can also be configured to provide alerts or warnings for an acute care provider when values for chest compressions performed by the acute care provider are out of or are substantially out of a target range (e.g., differ by more than 5% or more than 10% from the target range). It is noted, however, the values displayed in the flow chart in FIG. 12B are exemplary values for target chest compression parameters for an exemplary patient. The values shown in FIG. 12B are not meant to be limiting for the types of feedback or chest compression guidance that can be provided by the guidance systems described herein.

As shown in FIG. 12B, initially, as shown at 1230, the at least one processor has not yet been provided with sufficient information to distinguish between a Pediatric patient and an Adult patient. Further, as shown at 1232, target parameter values for depth and rate are unknown. In order to determine or estimate parameter values for chest compressions or other resuscitation activities, information about the patient's AP distance is provided. For example, information from sensors and/or from a generated three-dimensional representation of the patient can be processed to determine that the patient's AP distance is 12 cm, as shown at 1234. Based on the 12 cm AP distance, at 1236, the processor determines that the patient is a Pediatric patient and may be one of a Baby, Toddler, or Child. Further, at 1238, the processor estimates, with a confidence level of 75%, that target compression depth is from 3 cm to 5 cm, and preferably about 4 cm. The processor estimates that target compression rate is from 90 cpm to 110 cpm, preferably about 100 cpm. The information about the AP distance and target compression parameters can be displayed on the display screen of the feedback device or user interface. At 1240, a patient height (e.g., 80 cm) is received by the processor to further refine the target parameter values. Based on the received patient height, at 1242, the processor determines that the Pediatric patient is either a Baby or a Toddler, since a Child is generally taller than 80 cm. Based on the received patient height, at 1244, the processor determines, with a 95% confidence level, that the target depth is from 2 cm to 4 cm, preferably about 3 cm, and that the target rate is from 100 cpm to 120 cpm, preferably about 110 cpm. The display screen or user interface can be updated to include the received patient features and newly calculated parameter values. For example, the display screen or user interface can be updated to display patient type (e.g., Pediatric Baby or Toddler), physical features of the patient (e.g., AP distance and height), and target compression parameters. At 1246, a measurement for the patient's thoracic width (shown in FIG. 12B as LL distance) (15 cm) is received. Based on the received LL distance, at 1248, the processor determines that the patient is a Baby. Further, at box 1250, the processor determines, with a 99% confidence level, that the target compression depth is from 2 cm to 4 cm, preferably about 3 cm, and that the target compression rate is from 110 cpm to 130 cpm, preferably about 120 cpm. The display screen or user interface can be updated to display the newly calculated values and the patient LL distance, as described above.

Systems for Providing Ventilations for a Patient

According to another aspect of the present disclosure, the systems and methods described herein can be adapted to provide guidance for performing manual ventilations (e.g. rescue breathing) for a patient or to provide settings for operating an electromechanical patient ventilator device.

Figure 13:
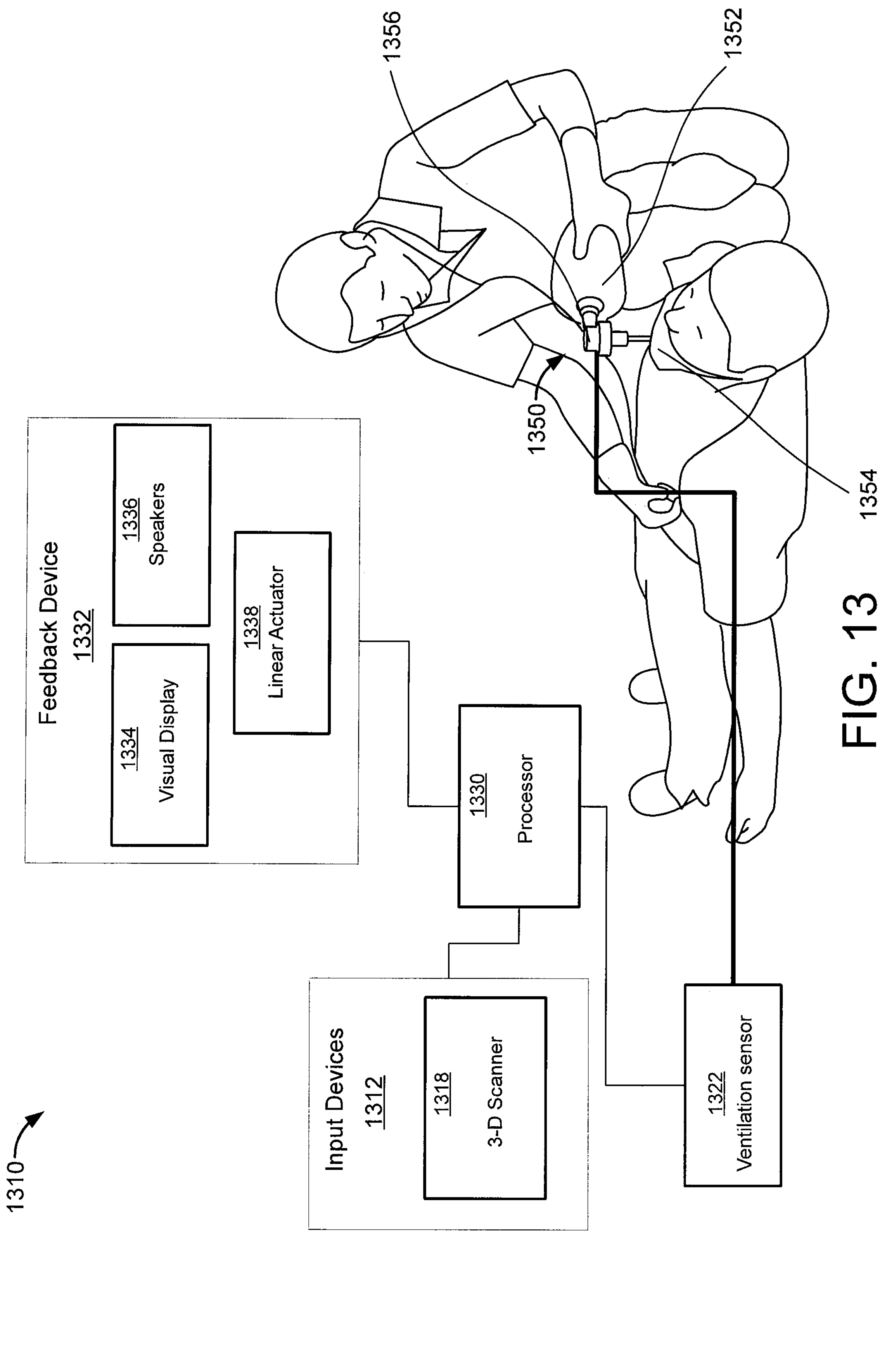
FIG. 13 is a schematic drawing of a patient ventilation system which determines ventilation criteria for delivering ventilations to the patient based on physical features of the patient according to an embodiment of the disclosure.

With reference to FIG. 13, a patient ventilation system 1310 configured to determine target patient ventilation criteria based on physical features of a patient measured at a rescue scene is illustrated. The system 1310 comprises at least one input device 1312, such as a three-dimensional imaging system 1318 or sensor, for obtaining information representative of at least one physical feature of the patient. For example, the physical feature can be a height of the patient, thoracic volume of the patient, or other physical features as described previously. Thoracic volume may be representative of lung volume and, accordingly, can be relevant for determining a target criteria for parameters such as tidal volume. Thoracic volume can be calculated based on AP distance of the patient's thoracic region, a length of the patient's thoracic region, and at least one of a width of the thoracic region and a circumference of the thoracic region. As noted herein, other non-physical characteristics such as age and gender may also be input to determine target criteria, or physical features may be input as estimates or determinations thereof. In other examples, target criteria for tidal volume can be calculated based on the patient's ideal body weight (IBW) using Equation 3 described above. As previously described, Equation 3 estimates a patient's useable tidal volume based on IBW. IBW for men or women is calculated from Equation 2 based on the patient's height. The target ventilation tidal volume may vary depending on whether ventilations are given in a cardiac arrest or non-cardiac arrest context. For example, for resuscitation (CPR) given in a cardiac arrest context, the target ventilation tidal volume may be in range of 6-10 mL/kg, whereas in a non-cardiac arrest context, the target ventilation tidal volume may be in the range of 6-8 mL/kg). The feedback system may include an input for determining whether the patient is suffering from cardiac arrest or not, and depending on such input, the target ventilation tidal volume may be adjusted accordingly.

The system 1310 can further comprise a ventilation device 1350 for providing ventilation treatment to the patient. As shown in FIG. 13, the ventilation device 1350 is a manual ventilation unit comprising a ventilation bag 1352 connected to a patient ventilation mask 1354 through an airflow pathway 1356. In order to provide manual ventilation to the patient, in some examples, the acute care provider grasps the ventilation bag 1352 with his or her hand(s), such that his/her thumb(s) are positioned near a top portion of the bag 1350 and his/her fingers are positioned below the bag 1352. The acute care provider compresses the bag 1352 by moving his/her thumb(s) and finger(s) together.

In other examples, the ventilation device 1350 comprises an electromechanical and/or automatic mechanical ventilator (not shown in the figures) configured to deliver a plurality of ventilations to a patient according to at least one ventilation criteria. An electromechanical and/or automatic mechanical ventilation device, as is known in the art, is a mechanical device which delivers positive pressure forced air ventilations to the patient through an airflow pathway, such as the airway path 1356 described above, in fluid communication with the patient's airway. Since mechanical ventilation devices may require a period of time to set up, upon arrival at a rescue scene, acute care providers may provide rescue breathing to the patient manually while the mechanical ventilator is being set up. Once the mechanical ventilator is available, the acute care provider can attach the patient's airflow path 1356 to the mechanical ventilator so that automated ventilations can be provided to the patient.

With continued reference to FIG. 13, the system 1310 further comprises at least one processor 1330 communicatively coupled with the at least one three-dimensional sensor 1318 and with the ventilation device 1350. In some instances, the at least one processor 1330 is an electronic component of a medical device at the rescue scene, such as the mechanical ventilator. In other examples, the at least one processor 1330 can be a component of a portable computer device at the rescue scene, as was the case in previously described systems. In other examples, the at least one processor 1330 can be remote from the rescue scene and in wired or wireless communication with devices at the scene. The at least one processor 1330 can be configured to receive and process the information representative of the at least one physical feature of the patient to generate a three-dimensional representation of the patient. As in previously described examples, the three-dimensional representation of the patient can be processed to determine measurements for physical features of the patient. The at least one processor 1330 can be further configured to determine at least one ventilation criteria for the ventilation device 1350 based on the generated three-dimensional representation.

The at least one processor is further configured to cause the ventilation device 1350 to provide ventilations to the patient based on the at least one ventilation criteria. In the case of an automatic mechanical ventilator, causing the ventilation device to provide ventilations in accordance with calculated target ventilation criteria can comprise automatically adjusting ventilator settings so that a desired ventilation is provided to the patient.

For systems in which the ventilation device 1350 is a manual ventilation unit, as shown in FIG. 13, causing the ventilation device 1350 to provide ventilations to the patient according to target criteria may comprise causing a feedback device associated with the ventilation device 1350 at the rescue scene to provide feedback to the acute care provider(s) instructing the acute care providers to provide ventilations in accordance with the target values. For example, feedback can be provided on a visual display 1334, speakers 1336, or a linear actuator 1338 of a feedback device 1332, such as a portable computer device or medical device, as described in connection with previous examples. Alternatively or in addition, feedback could be provided by a ventilation feedback device mounted to the ventilation bag 1352 or airflow path 1356. For example, the ventilation feedback device could comprise a linear actuator or vibrating motor which signals the user when to begin compressing the ventilation bag and when to release the ventilation bag. Alternatively or in addition, the feedback provided by the ventilation feedback device could be audio feedback (e.g., an instruction to COMPRESS, SQUEEZE or RELEASE emitted from a speaker of the feedback device) or visual feedback (e.g., LED indicators on the feedback device may flash or turn on to signal to the acute care provider to compress or release the bag 1352).

In some examples, the system 1310 further comprises a sensor, such as a ventilation sensor 1322, for measuring airflow provided to the patient to confirm that ventilations are being provided according to the determined ventilation criteria. For systems 1310 using a mechanical ventilator, a sensor 1322 generally is not needed since ventilation parameters can be determined from settings of the ventilator. However, in some circumstances, a ventilation sensor 1322 could be positioned in the patient's airflow path 1356 as a way to confirm that ventilations provided to the patient by the mechanical ventilator match the ventilator settings.

For systems 1310 including the manual patient ventilation unit, measurements from the ventilation sensor 1322 may be used to confirm that the ventilations being provided to the patient using the manual ventilation unit match the determined ventilation criteria. If the at least one processor 1330 determines that ventilation parameters for ventilations provided to the patient do not match the ventilation criteria, the at least one processor 1330 may cause feedback to be provided to the acute care provider about differences between the measured parameters and target criteria values. Further, in some examples, if the at least one processor 1330 determines that ventilations being provided are resulting in flow rates and pressures substantially above target ventilation criteria, the at least one processor 1330 can cause a feedback device 1332 of the system 1310 to provide an indication to the acute care provider alerting the acute care provider of potential danger of over-ventilating the patient. In particular, ventilations which are provided at a high flow rate and/or pressure may not be suitable for smaller or younger patients.

Another use for the ventilation system 1310 disclosed herein is to assist a user in placement of an endotracheal or breathing tube. A challenge in inserting an endotracheal or breathing tube for a patient is determining a correct insertion depth. Desirably, a distal end of the endotracheal or breathing tube should be inserted below the vocal cords to avoid a risk of laryngeal trauma. However, the distal end of the endotracheal tube should be spaced apart from the carina of the trachea by a distance of at least 2.0 cm to avoid risk of endobronchial intubation. Physical features of the patient determined by the system 1310 can be used to determine a correct insertion distance of the endotracheal tube. For example, the insertion depth can be based on a physical feature of the patient, such as the patient's height or chest length. The at least one processor 1330 can be configured to receive information about the patient's height and determine an estimated tube insertion distance. The at least one processor can also cause a feedback device, such as a display screen of an automatic ventilator to display the determined estimated endotracheal tube insertion depth. In an exemplary implementation, the system 1310 can provide the following initial recommendations for endotracheal tube depth based on patient height. As used herein, endotracheal tube depth can refer to an insertion depth for the endotracheal tube measured between the patient's mouth and a tip of the endotracheal tube. For a patient (e.g., an infant/neonate) having a height of less than 20 inches, the recommended tube insertion depth can be 4.0 inches to 5.0 inches. For a patient (e.g., a small child) having a height of 20 inches to 40 inches, the recommended tube insertion depth can be 5.0 inches to 6.0 inches. For a patient (e.g., a large child or small adult female) having a height of 40 inches to 60 inches, the recommended tube insertion depth can be 6.0 inches to 7.5 inches. For a patient (e.g., an average adult female or small adult male) having a height of 60 inches to 68 inches, the recommended tube insertion depth can be 7.5 inches to 8.25 inches. For a patient (e.g., a large adult female or average adult male) having a height of 68 inches to 75 inches, the recommended tube insertion depth can be 8.25 inches to 9.0 inches. For a patient (e.g., a large adult male) having a height of 75 inches or greater, the recommended tube insertion depth can be 9.0 inches to 10.0 inches.

Figure 14:
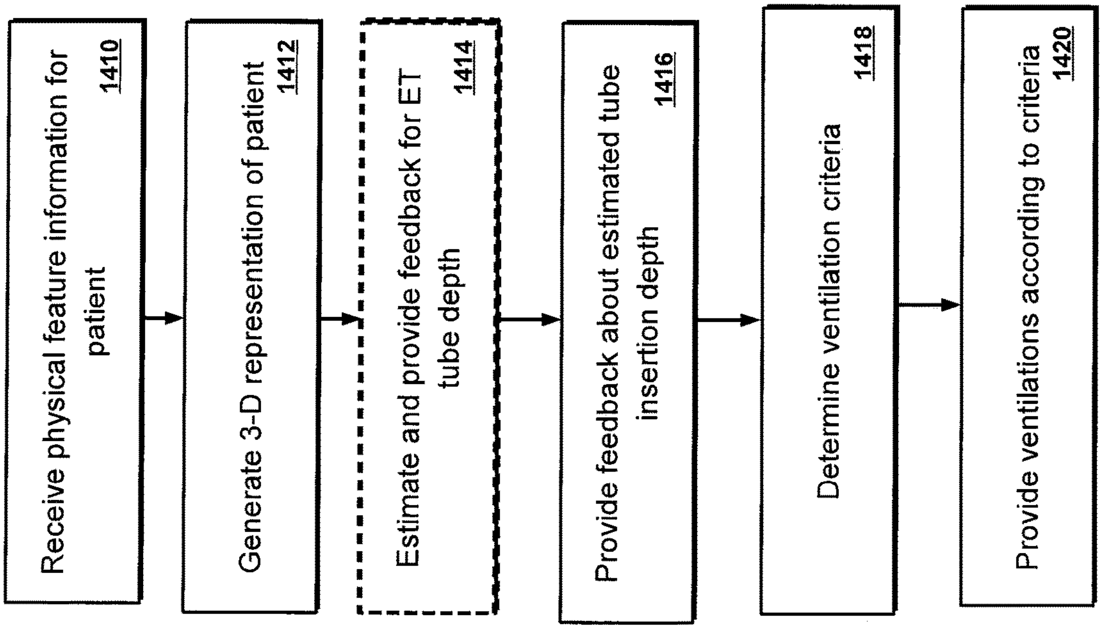
FIG. 14 is a flow chart of a process for providing ventilations to a patient according to ventilation criteria based on measurements of physical features of the patient obtained using the system of FIG. 123 according to an embodiment of the disclosure.

FIG. 14 shows a flow chart illustrating a process performed by the at least one processor for providing ventilations to a patient using the system 1310. At 1410, the processor is configured to receive information representative of at least one physical feature of the patient from an input device, such as a three-dimensional imaging system. At box 1412, the at least one processor is configured to generate a three-dimensional representation of the patient from three-dimensional scans of the patient recorded by the three-dimensional imaging system. As discussed herein, the three-dimensional representation can be for a portion of the patient's body, such as a generated three-dimensional representation of a patient's cardiothoracic region. In that case, the three-dimensional representation could be processed to identify cardiothoracic measurements such as the AP distance or cardiothoracic width. In other examples, the three-dimensional representation is of the patient's entire body. In that case, the three-dimensional representation can be processed to determine both the cardiothoracic measurement, as well as overall physical feature information, such as patient height, thoracic volume, amongst others.

At 1414, optionally, the at least one processor can provide recommendations for placement of an endotracheal tube (or other feedback instructions, such as target CPR criteria and CPR technique) based on physical features of the patient determined or extracted from the generated three-dimensional representation of the patient. For example, the at least one processor can be configured to provide a recommended endotracheal tube placement depth based on a patient's physical features, such as patient height. Studies have shown a correlation between patient height and tube insertion depth. Desirably, the tube should be inserted for the patient such that the distal end of the tube is at least 2 cm above the carina and at least 2 cm below the vocal cords. In some instances, the at least one processor can be configured to obtain the optimal endotracheal tube depth from a lookup table organized based on patient height and gender.

At 1416, the at least one processor can be configured to cause a feedback device to provide an indication to the acute care provider about the recommended tube placement depth. For example, a recommended depth could be displayed on a screen of the feedback device. In some instances, the acute care provider may be required to press a button or perform another action to confirm that he/she has seen the estimated tube depth value. The acute care provider can then insert the tube for the patient to the recommended depth. Conventionally, the acute care provider can monitor tube depth based on graduations or markings on the tube itself. In other examples, the endotracheal tube can comprise sensors or monitors to provide information to the acute care provider about tube insertion depth. In that case, the acute care provider can monitor sensed information about insertion of the tube to determine when the desired depth has been obtained.

At 1418, the at least one processor is configured to determine at least one ventilation criteria for the ventilation device based on the generated three-dimensional representation and/or based on physical features of the patient extracted from the generated three-dimensional representation. As described herein, ventilation parameters which can be calculated from physical features and/or generated three-dimensional representations comprise, for example, tidal volume, minute volume, end-inspiratory pressure, maximum ventilation pressure, and ventilation rate during the acute care event. For example, as described above, useable tidal volume can be calculated based on a patient's ideal body weight (IBW) according to Equation 3.

At 1420, the at least one processor is configured to cause the ventilation device to provide ventilations based on the at least one ventilation criteria. As discussed herein, for an electro-mechanical ventilator, causing the ventilation device to provide ventilations according to the determined criteria may comprise automatically adjusting settings of the mechanical ventilator to provide proper ventilations. For manual ventilation units, causing the ventilation device to provide ventilations according to the determined criteria can comprise providing feedback and guidance to the acute care provider for performing manual ventilations according to the determined ventilation criteria. The feedback can also include instructions or guidance about whether ventilations being performed for the patient match or substantially match the determined criteria.

As in previously described examples, ventilations can continue to be provided to the patient over the course of the rescue effort according to the determined ventilation criteria. If physiological evaluation of the patient indicates that continued ventilations are no longer needed, the ventilations can be stopped. Further, the at least one processor can be configured to periodically receive updated information about physical features of the patient over the course of the rescue effort and generate updated three-dimensional representations of the patient. Modified ventilation criteria can be determined from the updated three-dimensional representation and used to adjust settings of the mechanical ventilator or to change feedback being provided to the acute care provider so that the patient receives ventilations according to the modified ventilation criteria.

Although systems, methods, and techniques for providing resuscitation guidance based on physical features of patients have been described in detail for the purpose of illustration based on what is currently considered to be the most practical examples, it is to be understood that such detail is solely for that purpose and that the disclosure is not limited to the disclosed examples, but, on the contrary, is intended to cover modifications and equivalent arrangements. For example, it is to be understood that this disclosure contemplates that, to the extent possible, one or more features of any example can be combined with one or more features of any other example.

What is claimed is:

1. A system for assisting a user in performing chest compressions for a patient during an acute care event, the system comprising:

at least one input device comprising at least one camera configured to obtain images of the patient, which are analyzed to provide measurements of a plurality of physical features of the patient prior to commencement of and during performance of the chest compressions, wherein the plurality of physical features comprises a sternal anterior-posterior (AP) distance, and at least one additional physical feature selected from a lateral width of the thorax, thoracic circumference, thoracic volume, waist circumference, shoulder width, or thoracic shape;

at least one chest compression sensor configured to obtain signals indicative of the chest compressions performed for the patient during the acute care event;

a feedback device for providing chest compression feedback for the user comprising a visual display; and at least one processor communicatively coupled with the at least one input device for providing the measurements of the plurality of physical features and with the at least one chest compression sensor, the at least one processor comprising non-transitory computer readable memory comprising instructions that, when executed by the at least one processor, cause the at least one processor to:

periodically obtain at least one first image with the at least one camera showing a view of the patient from a first direction, periodically obtain at least one second image with the at least one camera showing a view of the patient from a second direction, receive and analyze the periodically-obtained at least one first images to determine the measurements of the sternal AP distance of the patient and the periodically-obtained at least one second images to determine measurements for the at least one additional physical feature of the patient prior to commencement of and during performance of the chest compressions, store in computer memory associated with the at least one processor, the measurements for the sternal AP distance and the measurements for the at least one additional physical feature of the patient;

determine a target chest compression depth range for chest compression feedback during cardiopulmonary resuscitation (CPR) tailored for the patient based on the measurements of the plurality of physical features for different times during the acute care event, wherein the target chest compression depth range for the chest compression feedback is:

(i) calculated based on the sternal anterior-posterior (AP) distance and the at least one additional physical feature of the plurality of physical features selected from a lateral width of the thorax, thoracic circumference, thoracic volume, waist circumference, shoulder width, or thoracic shape; and/or (ii) obtained from a lookup table using the sternal anterior-posterior (AP) distance and the at least one additional physical feature of the plurality of physical features as inputs for the lookup table, receive and process the signals indicative of the chest compressions from the at least one chest compression sensor to calculate chest compression depth for the chest compressions performed for the patient, determine whether the calculated depth of a particular chest compression is within or outside of the target chest compression depth range for the chest compression feedback, cause the feedback device to provide on the visual display a visual indication of the determined target chest compression depth range for the chest compression feedback tailored for the patient and a visual indication for the user of whether the calculated depth of the particular chest compression is within or outside of the target chest compression depth range for the chest compression feedback, and following completion of treatment of the patient during the acute care event, generate a summary report from data stored in the computer memory, the summary report comprising (i) a first visual indication showing changes in the measured sternal AP distance, (ii) a second visual indication showing changes in the measured at least one additional physical feature of the patient prior to commencement of and during performance of the chest compressions and (iii) one or more third visual indications showing changes in the determined target chest compression depth range for predetermined or selected time intervals.

2. The system of claim 1, wherein the at least one camera comprises at least one of a two-dimensional camera, a stereoscopic camera, a three-dimensional sensor, or a light-field camera.

3. The system of claim 1, comprising a three-dimensional imaging system comprising the at least one camera for obtaining images of the patient, and wherein the instructions, when executed by the at least one processor, cause the at least one processor to:

generate a three-dimensional representation of at least a portion of the patient's body based on the images obtained from the at least one camera of the three-dimensional imaging system; and analyze the three-dimensional representation to determine the measurements of the plurality of physical features of the patient.

4. The system of claim 1, wherein the at least one camera is configured to be mounted to at least one of the patient, the feedback device, or the user.

5. The system of claim 1, further comprising a smart phone or computer tablet, wherein the at least one camera comprises a camera of the smart phone or computer tablet, and the at least one processor comprises a processor of the smartphone or computer tablet.

6. The system of claim 5, wherein the feedback device comprises a visual display of the smart phone or computer tablet.

7. The system of claim 1, wherein the measurements of the plurality of physical features are measured during inhalation or during exhalation.

8. The system of claim 1, wherein the at least one chest compression sensor comprises at least one of a single axis accelerometer, a multi-axis accelerometer, and a gyroscope.

9. The system of claim 1, wherein the feedback device comprises at least one of a computer tablet, a smart phone, a personal digital assistant, a patient monitor device, a defibrillator, and a chest compression guidance device configured to be placed on the patient's chest.

10. The system of claim 1, wherein the feedback device is configured to provide visual feedback via the visual display and at least one of audio feedback or haptic feedback.

11. The system of claim 1, wherein the target chest compression depth range for the chest compression feedback tailored for the patient comprises a minimum value of at least 0.2 inch and a maximum value of less than or equal to 3.5 inches.

12. The system of claim 1, wherein the target chest compression depth range for the chest compression feedback comprises at least one of the following ranges: 0.2 inches to 0.75 inches for a patient having an AP distance less than 3 inches; 0.75 inches to 1.25 inches for a patient having an AP distance of 4.0 inches to 5.0 inches; 1.25 inches to 1.75 inches for a patient having an AP distance of 6.0 inches to 8.0 inches; 1.75 inches to 2.25 inches for a patient having an AP distance of 9.0 inches to 11.0 inches; 2.25 inches to 2.75 inches for a patient having an AP distance of 10 inches to 12 inches; or 2.75 inches to 3.5 inches for a patient having an AP distance of 13 inches or greater.

13. The system of claim 1, wherein the visual indication of whether the calculated depth of the particular chest compression is within or outside of the target chest compression depth range for the chest compression feedback provided on the visual display comprises a visual instruction to increase chest compression depth, to decrease chest compression depth, or to maintain chest compression depth determined based on the determination of whether the calculated depth of the particular chest compression is within or outside of the target chest compression depth range for the chest compression feedback.

14. The system of claim 1, wherein the instructions, when executed by the at least one processor, cause the at least one processor to calculate the target chest compression depth range for the chest compression feedback by a linear regression formula using the sternal anterior-posterior (AP) distance and the at least one additional physical feature of the plurality of physical features as inputs.

15. The system of claim 1, wherein the instructions, when executed by the at least one processor, cause the at least one processor to determine a type of patient based on the plurality of physical features, and cause the visual display of the feedback device to provide a visual indication of the type of patient to the user.

16. The system of claim 15, wherein the type of patient comprises a pediatric patient or an adult patient.

17. The system of claim 15, wherein the type of patient comprises a neonate, an infant, a small child, a large child, a small adult, an average-sized adult, or a large adult.

18. The system of claim 1, wherein the instructions, when executed by the at least one processor, cause the at least one processor to determine a suggested chest compression technique for the patient based on the measurements of the plurality of physical features of the patient and cause the feedback device to provide an indication for the user to perform the suggested chest compression technique.

19. The system of claim 18, wherein the suggested chest compression technique is based on a change in the measurements of the plurality of physical features of the patient over a predetermined period of time.

20. The system of claim 18, wherein the suggested chest compression technique comprises at least one of two palm chest compressions, one palm chest compressions, encircled thumb chest compressions, and two finger chest compressions.

21. The system of claim 18, wherein the suggested chest compression technique comprises active chest decompressions.

22. The system of claim 21, wherein the determination of active chest decompressions as the suggested chest compression technique is based on a reduction in the sternal anterior-posterior distance.

23. The system of claim 21, wherein the indication to perform active chest decompressions comprises an indication to perform chest decompressions using at least one of a suction cup device, an adhesive device, a hook and loop fastener device, and/an instruction to perform compressions of the patient's sides or abdomen.

24. The system of claim 1, wherein the instructions, when executed by the at least one processor, cause the at least one processor to determine a percentage of time during a rescue effort in which the calculated chest compression depth is not within the target chest compression depth range for the chest compression feedback, and to cause the feedback device to provide an indication to the user when the percentage of time exceeds a predetermined value.

25. The system of claim 24, wherein the indication to the user when the percentage of time exceeds the predetermined value comprises an instruction to begin performing a second chest compression technique different from an initial chest compression technique performed during the predetermined period of time.

26. The system of claim 25, wherein the initial chest compression technique comprises two palm chest compressions, and the second chest compression technique comprises performing chest compressions with active chest decompressions.

27. The system of claim 25, wherein the initial chest compression technique comprises one palm chest compressions and the second chest compression technique comprises two finger chest compressions.

28. The system of claim 25, wherein the instructions, when executed by the at least one processor, cause the at least one processor to receive an acknowledgement from the user when the user commences the second chest compression technique.

29. The system of claim 1, further comprising at least one ventilation sensor configured to measure at least one of tidal volume, minute volume, end-inspiratory pressure, maximum ventilation pressure, and ventilation rate during the acute care event.

30. The system of claim 29, wherein the ventilation sensor comprises an airflow sensor and/or a pressure sensor positioned in an airflow path of a ventilation unit configure to be in fluid communication with the patient's airway.

31. The system of claim 29, wherein the ventilation sensor comprises at least a first absolute pressure sensors and a second absolute pressure sensor separated by a flow restrictor, for measuring rate of airflow and pressure in the airflow path.

32. The system of claim 1, wherein the target chest compression depth range for the chest compression feedback comprises an initial range for acceptable chest compressions, and wherein the instructions, when executed by the at least one processor, cause the at least one processor to:

after a predetermined period of time, receive and process measurements of a second physical feature of the patient, different from a first physical feature of the plurality of physical features, and determine an updated target chest compression depth range for chest compression feedback based on the first physical feature and the second physical feature.

33. The system of claim 32, wherein the instructions, when executed by the at least one processor, cause the at least one processor to:

determine whether the calculated depth is within the updated target chest compression depth range, and cause the feedback device to provide an indication for the user of whether the calculated chest compression depth is within the updated target chest compression depth range.

34. The system of claim 1, wherein the at least one input device for providing the measurements of the plurality of physical features of the patient further provides an age or gender of the patient, and wherein the target chest compression depth range for chest compression depth is determined based at least in part on the plurality of physical features and the age or gender of the patient.

35. The system of claim 1, wherein the feedback device comprises a defibrillator, and wherein the instructions, when executed by the at least one processor, cause the at least one processor to, as a defibrillation shock is being provided to the patient by the defibrillator, receive and process updated measurements of the plurality of physical features of the patient from the at least one input device to determine a modified target chest compression depth range for the chest compression feedback.

36. The system of claim 35, wherein the instructions, when executed by the at least one processor, cause the at least one processor to:

cause the visual display of the feedback device to provide a visual instruction to the user to recommence chest compressions after the defibrillator shock is provided;

receive and process signals indicative of the recommenced chest compressions from the at least one chest compression sensor to calculate chest compression depth for the recommenced chest compressions;

determine whether the calculated chest compression depth for the recommenced chest compressions meets the modified target chest compression depth range for the chest compression feedback; and cause the visual display of the feedback device to provide a visual indication for the user of whether the calculated depth for the recommenced chest compressions meets the modified target chest compression depth range for chest compression feedback.

37. The system of claim 1, wherein the instructions, when executed by the at least one processor, cause the at least one processor to determine an estimated weight of the patient based on the anterior-posterior (AP) distance and the at least one additional physical feature of the plurality of physical features.

38. The system of claim 37, wherein the instructions when executed by the at least one processor, cause the at least one processor to determine a treatment parameter for the patient based, at least in part, on the estimated weight of the patient.

39. The system of claim 1, wherein the instructions, when executed by the at least one processor, cause the at least one processor to provide a notification on the feedback device instructing the user to begin performing chest compressions after the target chest compression depth range for the chest compression feedback tailored for the patient is determined.

40. The system of claim 1, further comprising a wireless transceiver in electrical communication with the at least one processor, wherein the instructions, when executed by the at least one processor, cause the wireless transceiver to transmit the generated summary report to at least one of a portable electronic device, remote computer device, or remote computer server.

41. The system of claim 1, wherein the instructions, when executed by the at least one processor, cause the at least one processor to obtain the at least one first images and the at least one second images periodically at the predetermined or selected time intervals.

42. The system of claim 41, wherein the instructions, when executed by the at least one processor, cause the at least one processor to store in the computer memory the determined target chest compression depth range for the patient during each predetermined or selected time interval, and wherein the generated summary report further comprises one or more visual indications showing changes in the determined target chest compression depth range for the predetermined or selected time intervals.

43. The system of claim 41, wherein the visual indications showing changes in the measured sternal AP distance and the measured at least one additional physical feature of the patient during the predetermined or selected intervals comprise one or more graphs showing changes in measurements of the patient during performance of the chest compressions.

44. The system of claim 41, wherein the predetermined or selected time intervals comprise at least one of an estimated amount of time required for chest remodeling to occur during chest compressions or a typical length of a chest compression cycle.

45. The system of claim 41, wherein the predetermined or selected time intervals comprise an amount of time selected based, at least in part, on one or more of the measurements of the plurality of physical features of the patient.

46. The system of claim 41, wherein the predetermined or selected time intervals comprise an amount of time selected based, at least in part, on a type of chest compressions being performed for the patient.

47. A system for assisting a user in performing chest compressions for a patient during an acute care event, the system comprising:

at least one input device comprising at least one camera configured to obtain images of the patient, which are analyzed to provide measurements of a plurality of physical features of the patient, wherein the plurality of physical features comprises a sternal anterior-posterior (AP) distance and at least one additional physical feature;

at least one chest compression sensor configured to obtain signals indicative of the chest compressions performed for the patient during the acute care event;

a feedback device for providing chest compression feedback for the user; and at least one processor communicatively coupled with the at least one input device for providing the measurements of the plurality of physical features and with the at least one chest compression sensor, the at least one processor comprising non-transitory computer readable memory comprising instructions that, when executed by the at least one processor, cause the at least one processor to:

obtain at least one first image with the at least one camera showing a view of the patient from a first direction prior to commencement of the chest compressions, obtain at least one second image with the at least one camera showing a view of the patient from a second direction prior to commencement of the chest compressions, receive and analyze the at least one first image to determine initial measurements of the sternal AP distance of the patient and the at least one second image to determine the at least one additional physical feature of the patient, store in computer memory associated with the at least one processor, the initial measurements of the sternal AP distance of the patient and the at least one additional physical feature of the patient;

determine an initial target chest compression depth range for chest compression feedback during cardiopulmonary resuscitation (CPR) tailored for the patient based on the sternal anterior-posterior (AP) distance, receive and process the signals indicative of the chest compressions from the at least one chest compression sensor to calculate depth of a particular chest compression, determine whether the calculated chest compression depth is within or outside of the initial target chest compression depth range for the chest compression feedback, cause the feedback device to provide an indication for the user of whether the calculated chest compression depth is within or outside of the initial target chest compression depth range for the chest compression feedback, as the chest compressions are being performed, periodically obtain at least one updated first image with the at least one camera showing the view of the patient from the first direction and obtain at least one updated second image with the at least one camera showing the view of the patient from a second direction, receive and analyze the periodically-obtained at least one updated first images and the periodically-obtained at least one updated one second images to determine updated measurements of the plurality of physical features of the patient, the updated measurements comprising updated measurements for the sternal anterior-posterior (AP) distance and the at least one additional physical feature of the patient during the during performance of the chest compressions, store in the computer memory associated with the at least one processor, the updated measurements for the sternal AP distance and the at least one additional physical feature of the patient during performance of the chest compressions, determine a modified target chest compression depth range for the chest compression feedback during CPR tailored for the patient based on the updated sternal anterior-posterior (AP) distance and the updated value for the at least one additional physical feature, determine whether depth for another particular chest compression being performed for the patient is within or outside of the modified target chest compression depth range for the chest compression feedback, cause the feedback device to provide an indication for the user of whether the depth for the another particular chest compression is within or outside of the modified target chest compression depth range for the chest compression feedback, and following completion of treatment of the patient during the acute care event, generate a summary report from data stored in the computer memory, the summary report comprising (i) a first visual indication showing changes in the measurements for the sternal AP distance, (ii) a second visual indication showing changes in the at least one additional physical feature of the patient prior to commencement of the chest compressions and during performance of the chest compressions and (iii) one or more third visual indications showing changes in the determined target chest compression depth range for predetermined or selected time intervals.

48. The system of claim 47, wherein the instructions, when executed by the at least one processor, cause the at least one processor to provide a notification on the feedback device instructing the user to begin performing chest compressions after the initial target chest compression depth range for the chest compression feedback tailored for the patient is determined.

* * * * *